United States Patent
Tomita et al.

(10) Patent No.: US 6,900,275 B2
(45) Date of Patent: May 31, 2005

(54) (METH) ACRYLIC ACID (SALT) POLYMER AND ITS PRODUCTION PROCESS

(75) Inventors: Takashi Tomita, Toyonaka (JP); Tsutomu Yuasa, Osaka (JP); Hirokatsu Kawakami, Izumiotsu (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/281,971

(22) Filed: Oct. 29, 2002

(65) Prior Publication Data

US 2003/0149206 A1 Aug. 7, 2003

(30) Foreign Application Priority Data

Nov. 6, 2001 (JP) ........................................ 2001-340301

(51) Int. Cl.⁷ ............................................. C08F 283/06
(52) U.S. Cl. .................. 525/404; 525/451; 526/318.41; 526/317.1
(58) Field of Search .................. 525/404, 451, 525/327.7, 339, 384; 526/317.1, 318.41, 240; 524/556, 4, 558

(56) References Cited

U.S. PATENT DOCUMENTS

| | | | |
|---|---|---|---|
| 6,130,304 A | 10/2000 | Sumiya et al. | |
| 6,166,112 A | 12/2000 | Hirata et al. | |
| 6,187,841 B1 | 2/2001 | Tanaka et al. | |
| 6,258,162 B1 * | 7/2001 | Kawakami et al. | 106/810 |
| 6,265,495 B1 | 7/2001 | Hirata et al. | |
| 6,486,260 B1 * | 11/2002 | Yuasa et al. | 525/327.7 |
| 6,545,083 B1 * | 4/2003 | Hirata et al. | 524/556 |
| 2002/0058110 A1 | 5/2002 | Even | |
| 2002/0090459 A1 | 7/2002 | Even | |

FOREIGN PATENT DOCUMENTS

| | | |
|---|---|---|
| JP | 59-18338 | 4/1984 |
| JP | 4-331205 | 11/1992 |
| JP | 7-25650 | 1/1995 |
| JP | 9-86990 | 3/1997 |
| JP | 10-128108 | 5/1998 |
| JP | 11-60302 | 3/1999 |
| JP | 11-71151 | 3/1999 |
| JP | 11-71152 | 3/1999 |
| JP | 2000-159882 | 6/2000 |
| JP | 2000-212128 | 8/2000 |
| JP | 2001-2734 | 1/2001 |
| JP | 2002-12459 | 1/2002 |
| JP | 2002-121225 | 4/2002 |
| WO | WO 01/14438 A1 | 3/2001 |

* cited by examiner

Primary Examiner—Tatyana Zalukaeva
(74) Attorney, Agent, or Firm—Roylance, Abrams, Berdo & Goodman, L.L.P.

(57) ABSTRACT

There is provided: a (meth)acrylic acid (salt) polymer which has high properties and is little colored; and a process which can produce this polymer with a high polymerization conversion without causing the corrosion of the reaction vessel. When a (meth)acrylic acid (salt) polymer is obtained by carrying out polymerization of an unsaturated monocarboxylic monomer (a) and an unsaturated polyalkylene glycolic monomer (b) with a polymerization initiator, either a redox polymerization initiator including hydrogen peroxide and a reducing agent is used as the polymerization initiator in a specific amount, or the unsaturated polyalkylene glycolic monomer is subjected to the polymerization in the form of an esterification reaction product as obtained by a process including the steps of: esterifying the unsaturated monocarboxylic monomer and a polyalkylene glycol in a specific charging ratio in the presence of an acid catalyst in a manner for a portion of the residual unsaturated monocarboxylic monomer as a starting raw material to remain; and then neutralizing the acid catalyst and the residual unsaturated monocarboxylic monomer (a) with a basic substance after the esterification; and the polymerization is carried out under conditions where the pH during the polymerization is in the range of 3.2 to 7.0.

29 Claims, 3 Drawing Sheets

(METH)ACRYLIC ACID (SALT) POLYMER AND ITS PRODUCTION PROCESS

BACKGROUND OF THE INVENTION

A. Technical Field

The present invention relates to: a (meth)acrylic acid (salt) polymer which is used favorably for such as cement dispersants and pigment dispersants; and its production process.

B. Background Art

Poly(carboxylic acids), which are obtained by a process including the step of copolymerization of a monomer component including an unsaturated monocarboxylic monomer (a) and an unsaturated polyalkylene glycolic monomer (b) as essential components, have hitherto been used favorably for cement dispersants and pigment dispersants, and besides, various other dispersants.

For example, in JP-A-018338/1984, the poly(carboxylic acids) are produced from a polyalkylene glycol mono(meth)acrylate ester monomer, a (meth)acrylic monomer, and another monomer, copolymerizable with these monomers, using a peroxide (e.g. benzoyl peroxide, lauroyl peroxide), a hydroperoxide (e.g. cumene hydroperoxide), or an aliphatic azo compound (e.g. azobisisobutyronitrile) as a polymerization initiator.

However, as to such a reaction system between the unsaturated monocarboxylic monomer (a) and the unsaturated polyalkylene glycolic monomer (b), in the case where this reaction is carried out at a high temperature, the polymerization conversion of the monomers is high. However, there occur problems such that: the amount of an oligomer having a low molecular weight as formed tends to increase so much as to decrease an effective polymer portion having such a high molecular weight as to be able to display performance as a dispersant. On the other hand, in the case where the reaction is carried out at a low temperature, the chain transfer of the monomers can be suppressed, and therefore there is obtained a (meth)acrylic acid (salt) polymer in which the amount of oligomer portions is small and the amount of effective polymer portions is large. However, the polymerization conversion of the monomers tends to be low.

In order to solve such problems, there may be conceived an idea of, in a process for production of the aforementioned (meth)acrylic acid (salt) polymer, carrying out the reaction at a low temperature, and prolonging the reaction time in order to raise the polymerization conversion of the monomers. However, a long time is needed for the reaction, and therefore the productivity and workability are lowered and costs are problematic when the reaction is industrially carried out.

Thus, as to the aforementioned reaction system, it is desirable to use a polymerization initiator having high reactivity even at a low temperature.

Examples of polymerization initiators for meeting such a demand include persulfate salts, such as ammonium persulfate and sodium persulfate.

As one of publicly known techniques in which the persulfate salt is used as an initiator in the aforementioned reaction system, there is a method as disclosed in WO 01/14438. In this method, arrangements are made to obtain a (meth)acrylic acid (salt) polymer having a good property (paste flow value which indicates cement dispersibility) by adjusting the pH of the polymerization reaction liquid into the range of 1.5 to 3.5. In addition, in this prior technique, arrangements are made to produce the unsaturated polyalkylene glycolic monomer (b) (which is one of the monomers) by carrying out esterification of a polyalkylene glycol monoalkyl ether and (meth)acrylic acid as raw materials with an acid catalyst, and to deactivate the above acid catalyst with an alkali agent after the end of the esterification, thus smoothing the polymerization.

However, according to the present inventors' study, the above prior method as disclosed in WO 01/14438 causes the following problems because of using the persulfate salts (e.g. ammonium persulfate) as the initiators without devising anything. That is to say, in the cases of these initiators, sulfuric acid is generated during the polymerization. Therefore, a stainless-steel-made reaction vessel may be corroded, so it is necessary to use a glass-lined reaction vessel. The glass-lined reaction vessel has a lower thermal conductivity than the stainless-steel-made reaction vessel, and is low efficient in heating and cooling, and besides, it is weak against impact, and its repair is also difficult in the case where the lining layer has cracked. Therefore, there is a problem such that much expense is necessary for the maintenance of facilities. In the case where the poly(carboxylic acids) are used as cement dispersants, it is usually desirable, for their easy handling, to neutralize them after the polymerization. However, as to the (meth)acrylic acid (salt) polymer as obtained by using the persulfate salt as the initiator, a salt easily forms during the neutralization, so there is a possibility that various troubles may be caused by deposit of this salt as its crystals. In addition, as to an aqueous solution of the (meth)acrylic acid (salt) polymer as obtained by using the persulfate salt as the initiator, there are cases where this aqueous solution is colored dark brown. Therefore, this aqueous solution is unsuitable for use as a pigment dispersant in which there is a high demand for dispersants which are little colored.

According to the present inventors' study, the above prior method as disclosed in WO 01/14438 is also a method such that the polymerization conversion of the monomers is still not sufficient, so a portion of the monomers easily remains unreacted. Therefore, as to the (meth)acrylic acid (salt) polymer as produced by the above prior method, there are problems such that its high combining ratio is involved in composing a dispersant.

SUMMARY OF THE INVENTION

A. Object of the Invention

Thus, an object of the present invention is to provide: a (meth)acrylic acid (salt) polymer which has high properties and is little colored; and a production process which can give such a high-quality (meth)acrylic acid (salt) polymer with a high polymerization conversion notwithstanding a low temperature and further does not cause the corrosion of the reaction vessel.

B. Disclosure of the Invention

In order to solve the above-mentioned problems, the present inventors made various contrivance and study, and repeated experiments. As a result, they have completed the present invention by finding out that: one of means for solution is to use a redox system as a polymerization initiator in a specific amount only, where the redox system includes hydrogen peroxide and a reducing agent; and another means is to use a product, as obtained by esterification between a polyalkylene glycol and an unsaturated monocarboxylic acid, as the unsaturated polyalkylene glycolic monomer (b) which is one of monomers, wherein the polyalkylene glycol as used has a specific molar-number-average degree "n" of addition polymerization, and further wherein the ratio of raw materials as charged for the esterification is selected in a specific range, and further to set the pH during the polymerization at higher than the pH range in the aforementioned prior method as disclosed in WO 01/14438.

Accordingly, the process for producing a (meth)acrylic acid (salt) polymer, according to the present invention, is firstly a process for producing a (meth)acrylic acid (salt) polymer which comprises the step of carrying out polymerization of an unsaturated monocarboxylic monomer (a) of a general formula (1) below and an unsaturated polyalkylene glycolic monomer (b) of a general formula (2) below with a polymerization initiator, and is characterized by using a redox polymerization initiator including hydrogen peroxide and a reducing agent as the polymerization initiator, and further characterized in that the amount of the hydrogen peroxide as used is in the range of 0.01 to 30 mol % relative to the total of the monomers, wherein the general formula (1) is:

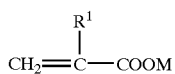

(1)

where: $R^1$ denotes a hydrogen atom or a methyl group; and M denotes a hydrogen atom, a monovalent metal, a divalent metal, an ammonium group, or an organic amine group; and wherein the general formula (2) is:

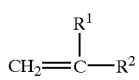

(2)

where: $R^1$ denotes hydrogen or a methyl group; $R^2$ denotes $-COO(R^3O)_mR^4$ wherein $R^3O$ denotes at least one kind of oxyalkylene group having 2 to 18 carbon atoms and, in the case of at least two kinds, their form of addition may be either block addition or random addition, and wherein $R^4$ denotes hydrogen or an alkyl group having 1 to 22 carbon atoms; and m is a molar-number-average degree of addition polymerization of the oxyalkylene group and denotes an integer of 1 to 300.

The process for producing a (meth)acrylic acid (salt) polymer, according to the present invention, is secondly a process for producing a (meth)acrylic acid (salt) polymer which comprises the step of carrying out polymerization of the unsaturated monocarboxylic monomer (a) of the aforementioned general formula (1) and the unsaturated polyalkylene glycolic monomer (b) of the aforementioned general formula (2) with a polymerization initiator, and is characterized in that:

the unsaturated polyalkylene glycolic monomer (b) is subjected to the polymerization in the form of an esterification reaction product as obtained by a process including the steps of: carrying out an esterification reaction of "p" parts by weight of an alkoxypolyalkylene glycol of a general formula (3) below and "q" parts by weight of the unsaturated monocarboxylic monomer (a) of the aforementioned general formula (1) in the presence of an acid catalyst under conditions satisfying such a relationship of $[(p/n^{1/2})/q] \times 100 \leq 200$ (where n is a molar-number-average degree of addition polymerization of the oxyalkylene group and is an integer of 1 to 110) as allows a portion of the unsaturated monocarboxylic monomer (a) as a starting raw material to remain; and then neutralizing the acid catalyst and 0 to 60 mol % of the residual unsaturated monocarboxylic monomer (a) with a basic substance after the esterification reaction; and the polymerization is carried out under conditions where the pH of the polymerization reaction liquid is in the range of 3.2 to 7.0;

wherein the general formula (3) is:

(3)

where: $R^3$ denotes an alkylene group having 2 to 18 carbon atoms; $R^4$ denotes a hydrocarbon group having 1 to 30 carbon atoms; n denotes a molar-number-average degree of addition polymerization of the oxyalkylene group $R^3O$ and is an integer of 1 to 300; and the repeating units $R^3O$ may be either identical with or different from each other and, in the case where the repeating units $R^3O$ are different from each other, their form of addition may be either block addition or random addition.

A (meth)acrylic acid (salt) polymer, according to the present invention, is obtained by the above production process according to the present invention, or is a polymer comprising a constitutional unit (I) as derived from the unsaturated monocarboxylic monomer (a) of the aforementioned general formula (1) and a constitutional unit (II) as derived from the unsaturated polyalkylene glycolic monomer (b) of the aforementioned general formula (2) and is characterized by containing L-ascorbic acid in an amount of not smaller than 0.001 mass % relative to the polymer.

DETAILED DESCRIPTION OF THE INVENTION (Polymerization)

Figure 1:
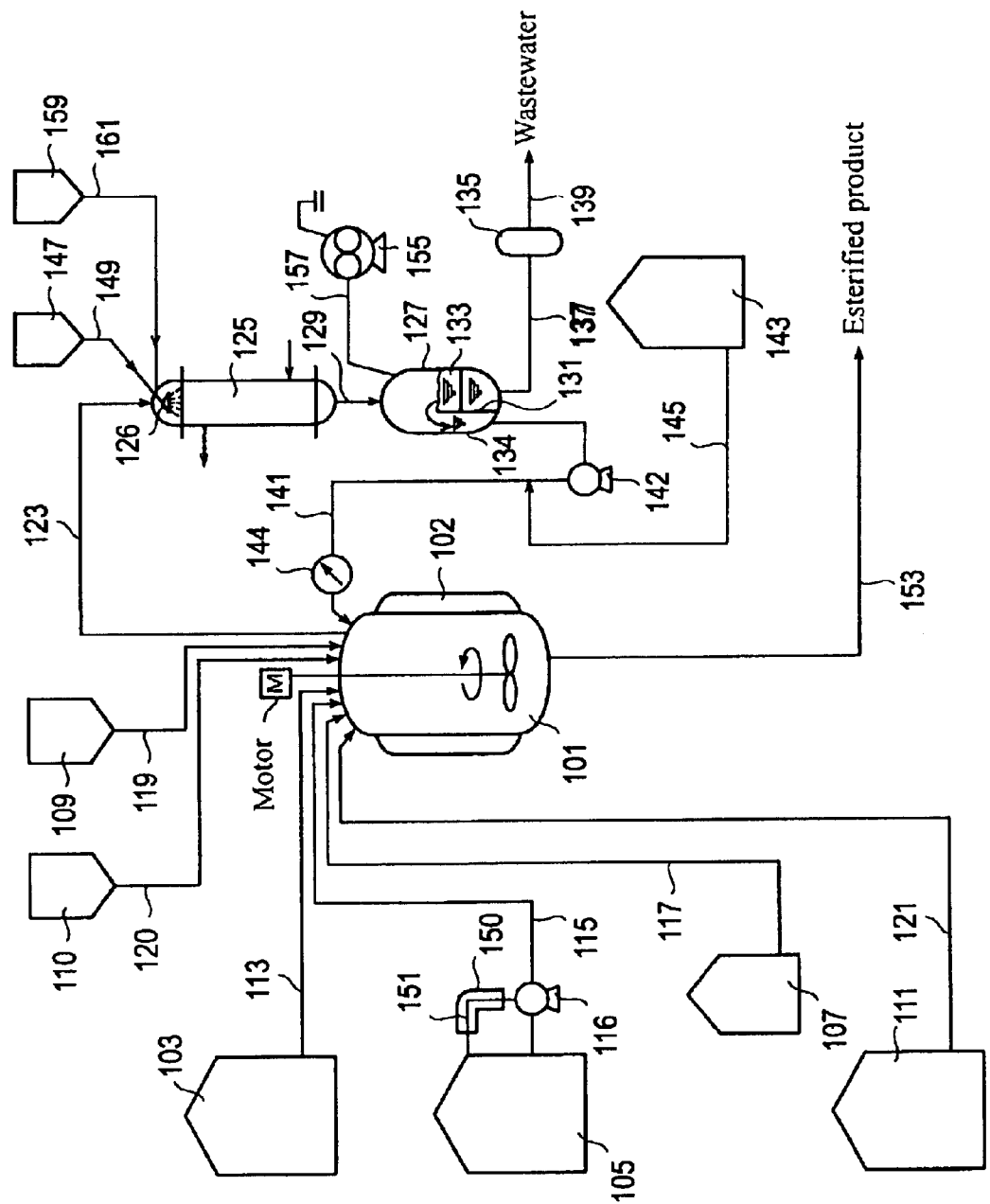
FIG. 1 is a schematic view of a representative apparatus constitution used for a process for producing an esterified product as used in the present invention.

In the present invention process for producing a (meth) acrylic acid (salt) polymer, the unsaturated monocarboxylic monomer (a) of the aforementioned general formula (1) and the unsaturated polyalkylene glycolic monomer (b) of the aforementioned general formula (2) are polymerized with the polymerization initiator.

Examples of the unsaturated monocarboxylic monomer (a) of the above general formula (1) as used in the present invention include acrylic acid, methacrylic acid, and monovalent metal salts, divalent metal salts, ammonium salts, and organic amine salts of these acids. These can be used either alone respectively or in combinations with each other. In the present invention, as to the unsaturated monocarboxylic monomer (a), one of the above can be used alone, and besides, at least two of the above may be used in the form of their mixture.

Examples of the unsaturated polyalkylene glycolic monomer (b) of the above general formula (2) include hydroxyethyl (meth)acrylate, hydroxypropyl (meth)acrylate, polyethylene glycol mono(meth)acrylate, polypropylene glycol mono(meth)acrylate, polybutylene glycol mono(meth)acrylate, polyethylene glycol polypropylene glycol mono(meth)acrylate, polyethylene glycol polybutylene glycol mono(meth)acrylate, polypropylene glycol polybutylene glycol mono(meth)acrylate, polyethylene glycol polypropylene glycol polybutylene glycol mono(meth)acrylate, methoxypolyethylene glycol mono(meth)acrylate, methoxypolypropylene glycol mono(meth)acrylate, methoxypolybutylene glycol mono(meth)acrylate, methoxypolyethylene glycol polypropylene glycol mono(meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono(meth)acrylate, ethoxypolypropylene glycol mono(meth)acrylate, ethoxypolybutylene glycol mono(meth)acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth)acrylate, and ethoxypolyethylene glycol polypropylene glycol polybutylene glycol mono(meth)acrylate. In the present invention, as to the unsaturated polyalkylene glycolic monomer (b), one of the above can be used alone, and besides, at least two of the above may be used in the form of their mixture. The molar-number-average degree "m" of addition polymerization of the oxyalkylene group in the unsaturated polyalkylene glycolic monomer (b) is an integer of 1 to 300, favorably an integer of 1 to 200, more favorably an integer of 1 to 110, still more favorably an integer of 1 to 100, yet still more favorably an integer of 2 to 100, yet still more favorably an integer of 2 to 50, yet still more favorably an integer of 2 to 20.

The polymerizable monomers as used in the polymerization may further include another monomer (III) copolymerizable with the above unsaturated monocarboxylic monomer (a) and unsaturated polyalkylene glycolic monomer (b) in addition to these monomers. Examples of such another monomer (III) include: dicarboxylic acids, such as maleic acid, fumaric acid, citraconic acid, mesaconic acid, and itaconic acid; monoesters or diesters as obtained from these dicarboxylic acids and alcohols represented by $HO(R^5O)_rR^6$ (where: $R^5O$ denotes one kind of oxyalkylene group having 2 to 4 carbon atoms or a mixture of at least two kinds of such oxyalkylene groups and, in the case of at least two kinds, their form of addition may be either block addition or random addition; r is a molar-number-average degree of addition polymerization of the oxyalkylene group and denotes an integer of 1 to 300; and $R^6$ denotes hydrogen or an alkyl group having 1 to 22 carbon atoms, favorably 1 to 15 carbon atoms.); unsaturated amides, such as (meth) acrylamide and (meth)acrylalkylamides; vinyl esters, such as vinyl acetate and vinyl propionate; unsaturated sulfonic acids (e.g. vinylsulfonic acid, (meth)allylsulfonic acid, sulfoethyl (meth)acrylate, 2-methylpropanesulfonic acid (meth)acrylamide, and styrenesulfonic acid) and their monovalent metal salts, divalent metal salts, ammonium salts, and organic amine salts; aromatic vinyl compounds, such as styrene and α-methylstyrene; esters of aliphatic alcohols having 1 to 18 carbon atoms (favorably 1 to 15 carbon atoms) or phenyl-group-containing alcohols (e.g. benzyl alcohol) with (meth)acrylic acid; polyalkylene glycol mono(meth)acrylates; and polyalkylene glycol mono(meth) allyl ethers. These can be used either alone respectively or in combinations with each other.

Although there is no especial limitation on the weight ratio among the monomers (a), (b) and (III) being copolymerized ((a)/(b)/(III)), yet this weight ratio is favorably in the range of (1 to 99)/(99 to 1)/(0 to 50), more favorably (50 to 99)/(50 to 1)/(0 to 49), still more favorably (60 to 95)/(40 to 5)/(0 to 30), particularly particularly favorably (70 to 95)/(30 to 5)/(0 to 10).

In the present invention production process, as to the usable unsaturated polyalkylene glycolic monomer (b), one of the above-mentioned monomers may be used alone, or at least two of them may be used in the form of their mixture. However, in the case where at least two are used in the form of their mixture, it is desirable that such kinds of monomers as display different properties should be used in such a fitting combination as can display properties according to purposes of the use, and a combination of the following two kinds is advantageous.

That is to say, advantageous as the unsaturated polyalkylene glycolic monomer (b) is a mixture of: a first esterified product ($a_1$) in which the molar-number-average degree "m" of addition polymerization of the oxyalkylene group in the formula (2) is favorably an integer of 1 to 297, more favorably an integer of 1 to 97, still more favorably an integer of 1 to 10; and a second esterified product ($a_2$) in which the molar-number-average degree "m" of addition polymerization of the oxyalkylene group in the formula (2) is favorably an integer of 4 to 300, more favorably an integer of 4 to 100, still more favorably an integer of 11 to 100 (wherein the molar-number-average degree of addition polymerization in the second esterified product ($a_2$) is larger than that in the first esterified product ($a_1$) by not less than 3).

In order to use such a mixture of the first esterified product ($a_1$) and the second esterified product ($a_2$), these first esterified product ($a_1$) and second esterified product ($a_2$) may be produced separately by their respective esterification reactions, or may be produced by an esterification reaction between a mixture of their respective corresponding alcohols and (meth)acrylic acid. Particularly, the latter method can provide an industrially inexpensive production process. In this case, the mass ratio between the first esterified product ($a_1$) and the second esterified product ($a_2$) is favorably in the range of (5:95) to (95:5), more favorably (10:90) to (90:10).

Examples of the first esterified product ($a_1$) include methoxy(poly)ethylene glycol mono(meth)acrylate, methoxy(poly)propylene glycol mono(meth)acrylate, methoxy(poly)butylene glycol mono(meth)acrylate, methoxy(poly)ethylene glycol (poly)propylene glycol mono(meth)acrylate, methoxy(poly)ethylene glycol (poly)butylene glycol mono(meth)acrylate, methoxy(poly)propylene glycol (poly)butylene glycol mono(meth)acrylate, methoxy(poly)ethylene glycol (poly)propylene glycol (poly)butylene glycol mono(meth)acrylate, ethoxy(poly)ethylene glycol mono(meth)acrylate, ethoxy(poly)propylene glycol mono(meth)acrylate, ethoxy(poly)butylene glycol mono(meth)acrylate, ethoxy(poly)ethylene glycol (poly)propylene glycol mono(meth)acrylate, ethoxy(poly)ethylene glycol (poly)butylene glycol mono(meth)acrylate, ethoxy(poly)propylene glycol (poly)butylene glycol mono(meth)acrylate, and ethoxy(poly)ethylene glycol (poly)propylene glycol (poly)butylene glycol mono(meth)acrylate. It is important for the first esterified product ($a_1$) that the short-chain alcohol in its side chain has hydrophobicity. Incidentally, the side chain includes many ethylene glycol units favorably from the viewpoint of the easiness of the copolymerization. Therefore, favorable as the esterified product ($a_1$) are (alkoxy)(poly)ethylene glycol mono(meth) acrylates having a molar-number-average degree of addition polymerization of favorably an integer of 1 to 297, more favorably an integer of 1 to 97, still more favorably an integer of 1 to 10.

Examples of the second esterified product ($a_2$) include methoxypolyethylene glycol mono(meth)acrylate, methoxypolyethylene glycol (poly)propylene glycol mono(meth) acrylate, methoxypolyethylene glycol (poly)butylene glycol mono(meth)acrylate, methoxypolyethylene glycol (poly) propylene glycol (poly)butylene glycol mono(meth) acrylate, ethoxypolyethylene glycol mono(meth)acrylate, ethoxypolyethylene glycol (poly)propylene glycol mono (meth)acrylate, ethoxypolyethylene glycol (poly)butylene glycol mono(meth)acrylate, and ethoxypolyethylene glycol (poly)propylene glycol (poly)butylene glycol mono(meth) acrylate. For obtaining high water reducibility, it is important and favorable to disperse cement particles by steric repulsion and hydrophilicity of an alcohol chain having a molar-number-average degree of addition polymerization of an integer of 4 to 300 in the second esterified product ($a_2$). Therefore, it is favorable that many oxyethylene groups are introduced into the polyalkylene glycol chain, and the most favorable is a polyethylene glycol chain. Accordingly, the molar-number-average degree "n" of addition polymerization in the alkylene glycol chain of the second esterified product ($a_2$) is favorably an integer of 4 to 300, more favorably an integer of 4 to 100, still more favorably an integer of 11 to 100.

In the present invention process for producing a (meth) acrylic acid (salt) polymer, there is no especial limitation on the polymerization method, but publicly known methods such as solution polymerization and bulk polymerization are adoptable. Particularly, the solution polymerization is favorable in consideration of the control of the reaction and the easiness of handling of the resultant polymerized product.

The polymerization in a solvent can be carried out either in a batchwise manner or in a continuous manner. Examples of the solvent as used hereupon include: water; lower alcohols, such as methyl alcohol, ethyl alcohol, and isopropyl alcohol; aromatic or aliphatic hydrocarbons, such as benzene, toluene, xylene, cyclohexane, and n-hexane; ester compounds such as ethyl acetate; ketone compounds, such as acetone and methyl ethyl ketone; and cyclic ether compounds, such as tetrahydrofuran and dioxane. From the viewpoint of the solubility of the raw monomer component as the esterified products, the solubility of the resultant copolymer, and the convenience in using this copolymer, it is favorable to use at least one member selected from the group consisting of water and lower alcohols having 1 to 4 carbon atoms. In such a case, of the lower alcohols having 1 to 4 carbon atoms, for example, methyl alcohol, ethyl alcohol, and isopropyl alcohol are particularly effective. Hereupon, the combining ratio of the water is favorably not more than 20 mass %, more favorably not more than 10 mass %, still more favorably not more than 5 mass %, most favorably not more than 1 mass %. In the case where this ratio is more than 20 mass %, there is a possibility that the above polymer may separate and/or precipitate.

There is no especial limitation on the polymerization initiator usable in the present invention process for producing a (meth)acrylic acid (salt) polymer. Usable are, for example, conventional publicly known ones, specifically, such as peroxides (e.g. benzoyl peroxide and lauroyl peroxide), hydroperoxides (e.g. cumene hydroperoxide), aliphatic azo compounds (e.g. azobisisobutyronitrile), and persulfate salts (e.g. ammonium persulfate and sodium persulfate). However, in the present invention, a redox polymerization initiator including hydrogen peroxide and a reducing agent is particularly favorably used as the aforementioned polymerization initiator.

That is to say, a favorable mode of the present invention process for producing a (meth)acrylic acid (salt) polymer is the process for producing a (meth)acrylic acid (salt) polymer which comprises the step of carrying out polymerization of the unsaturated monocarboxylic monomer (a) of the general formula (1) and the unsaturated polyalkylene glycolic monomer (b) of the general formula (2) with the polymerization initiator, and is characterized by using the redox polymerization initiator including hydrogen peroxide and the reducing agent as the polymerization initiator, and further characterized in that the amount of the hydrogen peroxide as used is in the range of 0.01 to 30 mol % relative to the total of the monomers.

The use of the redox polymerization initiator can rapidly promote the polymerization reaction even if the polymerization temperature is low. In addition, the use of the hydrogen peroxide and the limitation of the amount of the hydrogen peroxide as used into the range of 0.01 to 30 mol % relative to the total of the aforementioned monomers can lessen the oligomer content and inhibit the coloring.

As to the polymerization initiator as used when the (meth)acrylic acid (salt) polymer is produced, hitherto, the peroxide has been generally used alone, and the redox polymerization initiator has not been used. In the case where a combination of ammonium persulfate/sodium hydrogensulfite is used as the redox polymerization initiator, salts (e.g. sodium sulfate) are deposited in products after the polymerization, and therefore the purity is lowered. On the other hand, in the case where the peroxide is used, it is necessary, for the enhancement of the reaction efficiency, to make the polymerization temperature higher than that in the case where the redox polymerization initiator is used. Therefore, impurities due to the high-temperature reaction are easily formed and, as the case may be, the resultant products are colored. However, as to the above favorable mode of the present invention process for producing a (meth)acrylic acid (salt) polymer, it has been found out that: because the redox polymerization initiator including hydrogen peroxide and the reducing agent is used and particularly because the amount of the hydrogen peroxide as used is limited into the range of 0.01 to 30 mol %, more favorably 0.1 to 20 mol %, most favorably 0.5 to 10 mol %, relative to the total of the polymerizable monomers, the polymerization can be carried out in a short time even at a low temperature, and further there can be produced a (meth) acrylic acid (salt) polymer which is little colored and also simultaneously has a low oligomer content. In the case where the amount of the hydrogen peroxide as used is smaller than 0.01 mol % relative to the total of the polymerizable monomers, there are disadvantages in that a large amount of monomers remains unreacted. On the other hand, in the case where the amount of the hydrogen peroxide as used exceeds 30 mol %, there are disadvantages in that such a case results in obtaining a (meth)acrylic acid (salt) polymer containing a large amount of oligomer portions.

Examples of the reducing agent include: salts of metals being in a lower-valence state (e.g. iron (II), tin (II), titanium (III), chromium (II), V (II), and Cu (II)), which are represented by Mohr's salt; amine compounds or their salts, such as monoethanolamine, diethanolamine, triethanolamine, hydroxylamine, hydroxylamine hydrochloride, and hydrazine; alkaline-metal sulfite salts, such as sodium sulfite, sodium hydrogensulfite, and metadisulfite salts; lower oxides or their salts, such as hypophosphorous acid, sodium hypophosphite, sodium hydrosulfite, and sodium dithionite; organic compounds having a group (e.g. an —SH group, an —SO$_2$H group, an —NHNH$_2$ group, and a —COCH(OH)— group) or their salts, such as sodium formaldehydesulfoxylate and sodium hydroxymethanesulfinate dihydrate; invert sugars, such as D-fructose and D-glucose; thiourea compounds, such as thiourea and thiourea dioxide; and L-ascorbic acid, sodium L-ascorbate, L-ascorbate esters, erysorbic acid, sodium erysorbate, and erysorbate esters. In the present invention, it is particularly favorable to use organic reducing agents and, of them, the L-ascorbic acid is particularly favorable. Incidentally, when the above reducing agent is used, it is also permissible to use promoters (e.g. amine compounds) jointly therewith.

In the above favorable mode of the present invention process for producing a (meth)acrylic acid (salt) polymer, the amount of the hydrogen peroxide as used is in the range of 0.01 to 30 mol % relative to the polymerizable monomers, but the amount of the aforementioned reducing agent as used is favorably in the range of 0.1 to 500 mol %, more favorably 1 to 200 mol %, most favorably 10 to 100 mol %, relative to the hydrogen peroxide. In the case where the amount of the aforementioned reducing agent is smaller than 0.1 mol %, there are disadvantages in that active radicals are not sufficiently generated, so a large amount of monomers remains unreacted. On the other hand, in the case where the amount of the aforementioned reducing agent exceeds 500 mol %, there are disadvantages in that a large amount of the reducing agent remains, and further in that crystals derived from the reducing agent may be deposited when the resultant (meth)acrylic acid (salt) polymer is preserved in a high concentration after being neutralized.

The polymerization temperature is fittingly determined according to the solvent or polymerization initiator as used, but it is favorably in the range of 0 to 95° C., more favorably 30 to 90° C., particularly favorably 50 to 85° C. In the case where the temperature exceeds 95° C., there is a possibility that: impurities due to heat may be formed to color the resultant product. On the other hand, in the case where the temperature is lower than 0° C., there are disadvantages in that a long time is needed for carrying out the polymerization reaction. The present invention is characterized in that, even in the above temperature range, there can be obtained a (meth)acrylic acid (salt) polymer containing only a small amount of oligomer portions and a large amount of effective polymer portions.

There is no especial limitation on the polymerization pressure in the present invention process for producing a (meth)acrylic acid (salt) polymer. The polymerization pressure may be selected from any of increased pressure, ordinary pressure (atmospheric pressure), and reduced pressure, and may be set fittingly according to occasions. However, the ordinary pressure is favorable.

In the present invention, it is also permissible to further use thiol chain transfer agents in order to adjust the molecular weight of the resultant polymer. The thiol chain transfer agent as used hereupon is represented by the following general formula: HS—R$^7$—Eg (where: R$^7$ denotes an alkyl group having 1 to 2 carbon atoms; E denotes an —OH group, a —COOM$^2$ group, a —COOR$^8$ group, or an —SO$_3$M$^2$ group wherein M$^2$ denotes hydrogen, a monovalent metal, a divalent metal, an ammonium group, or an organic amine group, and wherein R$^8$ denotes an alkyl group having 1 to 10 carbon atoms; and g denotes an integer of 1 to 2). Examples thereof include mercaptoethanol, thioglycerol, thioglycolic acid, 2-mercaptopropionic acid, 3-mercaptopropionic acid, thiomalic acid, octyl thioglycolate, and octyl 3-mercaptopropionate. These can be used either alone respectively or in combinations with each other.

(Esterification Step)

Next, explanations are made about favorable modes for carrying out a process for producing the unsaturated polyalkylene glycolic monomer (b) of the aforementioned general formula (2) as used in the present invention.

Favorable as the process for producing the unsaturated polyalkylene glycolic monomer (b) is a process including the step of carrying out an esterification reaction of an alkoxypolyalkylene glycol of a general formula (3) and the unsaturated monocarboxylic monomer (a).

The above esterification reaction (esterification step) is carried out by a process including the steps of: charging a reaction system (reaction tank) with the alkoxypolyalkylene glycol of the general formula (3) and the unsaturated monocarboxylic monomer (a) as raw materials, and an acid catalyst (and further, if necessary, a dehydrating solvent and a polymerization inhibitor); and carrying out an esterification reaction of the resultant mixture at a definite temperature until reaching a predetermined esterification conversion.

The alkoxypolyalkylene glycol that is used as a raw material in the above esterification reaction is a compound of the general formula (3) below.

$$R^4O(R^3O)_nH \tag{3}$$

In the above general formula (3), R$^4$ denotes a hydrocarbon group having 1 to 30 carbon atoms, favorably a hydrocarbon group having 1 to 25 carbon atoms, more favorably a hydrocarbon group having 1 to 20 carbon atoms, still more favorably a hydrocarbon group having 1 to 15 carbon atoms. In the case where R$^4$ is a hydrocarbon group having more than 30 carbon atoms, the water solubility of a copolymer is so low as to provide inferior results with regard to performance for use such as cement dispersibility wherein the copolymer is obtained by carrying out copolymerization of an esterified product with such as (meth)acrylic acid wherein the esterified product is obtained from the alkoxypolyalkylene glycol of the formula (3) and the unsaturated monocarboxylic monomer (a). The favorable range of R$^4$ is different according to purposes of the use. For example, in the case of the use as a raw material of cement dispersants, a saturated or unsaturated alkyl group having 1 to 18 carbon atoms in the form a straight or branched chain and an aryl group are favorable as R$^4$. Specific examples of R$^4$ include: alkyl groups, such as a methyl group, an ethyl group, a n-propyl group, an isopropyl group, a n-butyl group, a tert-butyl group, a pentyl group, a hexyl group, an octyl group, a nonyl group, a 2-ethylhexyl group, a decyl group, a dodecyl group, an undecyl group, a tridecyl, a tetradecyl group, a pentadecyl group, a hexadecyl group, a heptadecyl group, an octadecyl group, a nonadecyl group, an icosyl group, a heincosyl group, and a docosyl group; aryl groups such as a phenyl group; alkylphenyl groups, such as a benzyl group and a nonylphenyl group; cycloalkyl groups such as a cyclohexyl group; alkenyl groups; and alkynyl groups. Of these groups, the methyl group, ethyl group, propyl group, butyl group, and phenyl group are, as mentioned above, favorable in the case of the use as a raw material of cement dispersants.

In the above general formula (3), R$^3$O is an oxyalkylene group having 2 to 18 carbon atoms, favorably 2 to 8 carbon atoms, more favorably 2 to 4 carbon atoms. In the case where $R^3O$ is an oxyalkylene group having more than 18 carbon atoms, the water solubility of a copolymer is so low as to provide inferior results with regard to performance for use such as cement dispersibility wherein the copolymer is obtained by carrying out copolymerization of an esterified product with such as (meth)acrylic acid wherein the esterified product is obtained from the alkoxypolyalkylene glycol of the formula (3) and the unsaturated monocarboxylic monomer (a). Examples of $R^3O$ include an oxyethylene group, an oxypropylene group, an oxybutylene group, and an oxystyrene group. Of these groups, the oxyethylene group, oxypropylene group, and oxybutylene group are favorable. In addition, the repeating units $R^3O$ may be either identical with or different from each other. In the case where the aforementioned repeating units $R^3O$ are different from each other (in other words, in the case where at least two kinds of different repeating units are included), their form of addition may be either block addition or random addition.

In the above general formula (3), n is an integer of 1 to 300, favorably an integer of 1 to 200, more favorably an integer of 1 to 110, still more favorably an integer of 1 to 100, yet still more favorably an integer of 2 to 50, yet still more favorably an integer of 2 to 20, and n denotes a molar-number-average degree of addition polymerization of the repeating units of $R^3O$ (the oxyalkylene group). In the case where n exceeds 300, the polymerizability is lowered as to the esterified product as obtained from the alkoxypolyalkylene glycol of the formula (3) and the unsaturated monocarboxylic monomer (a). In the case where n exceeds 110, this lowering of the polymerizability is great. Also as to this molar-number-average degree "n" of addition polymerization, its optimum range differs according to purposes of the use of the esterified product as obtained by the esterification reaction. For example, in the case of the use as a raw material of cement dispersants, the molar-number-average degree "n" of addition polymerization is favorably an integer of 2 to 100, more favorably an integer of 5 to 90, most favorably an integer of 8 to 80. In addition, in the case of the use as such as thickeners, the molar-number-average degree "n" of addition polymerization is favorably an integer of 10 to 100, more favorably an integer of 50 to 90.

In the process for producing the ester, the alkoxypolyalkylene glycol of the above general formula (3) may be used either in the form of one kind thereof alone or in the form of a mixture of at least two kinds thereof. There is no especial limitation on the mode in which the raw alkoxypolyalkylene glycol of the formula (3) is used in the form of a mixture of at least two kinds thereof, but that will do if it is a mode of the use in the form of a mixture of at least two kinds which are different from each other as to at least any one of $R^4$, $R^3O$ and n. However, favorable examples include: (1) a case where the above mixture comprises two kinds such that $R^4$ is a methyl group as to one of them and is a butyl group as to the other; (2) a case where the above mixture comprises two kinds such that $R^3O$ is an oxyethylene group as to one of them and is an oxypropylene group as to the other; (3) a case where the above mixture comprises two kinds such that n is in the range of 1 to 10 as to one of them and is in the range of 11 to 100 as to the other; and a fitting combination selected from among these (1) to (3).

As to the unsaturated monocarboxylic monomer (a) usable in the above esterification reaction, acrylic acid and methacrylic acid may be used either alone respectively or in the form of their mixture. Also as to their mixing ratio, any range can be adopted.

The mixing ratio of the above raw materials as used in the above esterification reaction is stoichiometrically 1:1 (mol ratio), but, as a matter of fact, there is no especial limitation if it is in a range where the esterification reaction between the alkoxypolyalkylene glycol and the unsaturated monocarboxylic monomer (a) can efficiently proceed. Usually, it is favorable to accelerate the esterification reaction by using either one of the raw materials in excess of the other, or, from the viewpoint of purification of the aimed esterified product, it is favorable to use either one of the raw materials in excess of the other wherein the either one has such a lower boiling point as to be easier to distil off than the other. In addition, in the present invention, when the azeotropic distillation of water (as a reaction product) with a dehydrating solvent is carried out during the esterification reaction, a portion of the unsaturated monocarboxylic monomer (a) having a low boiling point is also distilled off and thus discharged out of the reaction system. Therefore, it is favorable to add the unsaturated monocarboxylic monomer (a) of which the amount as used (amount as charged) is in excess of its stoichiometrically calculated amount relative to the amount of the alkoxypolyalkylene glycol as used (as charged). Specifically, the amount of the unsaturated monocarboxylic monomer (a) as used is usually in the range of favorably 1.0 to 30 mol, more favorably 1.2 to 10 mol, still more favorably 1.5 to 10 mol, most favorably 2 to 10 mol, per 1 mol of the alkoxypolyalkylene glycol. In the case where the amount of the unsaturated monocarboxylic monomer (a) as used is smaller than 1.0 mol per 1 mol of the alkoxypolyalkylene glycol, the esterification reaction does not smoothly proceed, so the yield of the aimed esterified product is insufficient. Or otherwise the case where the amount exceeds 30 mol is uneconomical, therefore still unfavorable, in that the enhancement of the yield rewarding the addition is not seen.

In the above esterification reaction, for causing the reaction to proceed rapidly, it is desirable to carry out the reaction in the presence of an acid catalyst. Examples of the acid catalyst usable hereupon include sulfuric acid, methanesulfonic acid, p-toluenesulfonic acid, p-toluenesulfonic acid hydrate, xylenesulfonic acid, xylenesulfonic acid hydrate, naphthalenesulfonic acid, naphthalenesulfonic acid hydrate, trifluoromethanesulfonic acid, "Nafion" resin, "Amberlyst 15" resin, phosphotungstic acid, phosphotungstic acid hydrate, and hydrochloric acid. Hereupon, the acid catalyst may be used either alone or in the form of a mixture of at least two kinds thereof.

Of these acid catalysts, those which have a high boiling point under ordinary pressure are favorable in consideration of such as temperature of azeotropic distillation of water with the dehydrating solvent and the temperature of the esterification reaction which are explained in detail below. Specifically, the boiling point of the acid catalyst, as favorably used in the present invention, under ordinary pressure is not lower than 150° C., more favorably not lower than 200° C. Therefore favorably used are such as sulfuric acid (boiling point under ordinary pressure: 317° C.), p-toluenesulfonic acid (boiling point: 185 to 187° C./13.3 Pa (0.1 mmHg)), p-toluenesulfonic acid hydrate, and methanesulfonic acid (boiling point: 167° C./1,333.2 Pa (10 mmHg)). Furthermore, the present inventors have got to know that: one of causes of forming a diester (which is an impurity) that causes the deterioration of the quality and performance of the esterified product is cleavage of the alkoxypolyalkylene glycol, and further there is a possibility that this cleavage may be caused also by the acid catalyst. On the basis of such findings, the present inventors have found out that such an acid catalyst as little causes the above cleavage is more desirable. In consideration of the above points, examples of acid catalysts as particularly favorably used in the present invention include the p-toluenesulfonic acid and the methanesulfonic acid. As to the amount of the acid catalyst as used, there is no especial limitation if it is in a range where the catalysis can effectively be displayed. However, this amount is favorably not larger than 0.4 meq/g, more favorably in the range of 0.36 to 0.01 meq/g, particularly favorably 0.32 to 0.05 meq/g. In the case where the amount of the acid catalyst as used exceeds 0.4 meq/g, the amount of the diester as formed in the reaction system during the esterification reaction increases, resulting in such as deterioration of cement dispersibility of cement dispersants that are synthesized from the esterified product (alkoxypolyalkylene glycol mono(meth)acrylate) as obtained by the esterification reaction. Hereupon, the amount (meq/g) of the acid catalyst as used is represented by a value as obtained by dividing the equivalents (meq) of $H^+$ of the acid catalyst as used in the reaction by the total amount (g) of the alkoxypolyalkylene glycol and the unsaturated monocarboxylic monomer (a) (which are raw materials) as charged. More specifically, it is a value as calculated in accordance with the following equation:

> Amount (meq/g) of acid catalyst as used=equivalents (meq) of $H^+$ of acid catalyst/(weight (g) of alkoxypolyalkylene glycol as charged+weight (g) of unsaturated monocarboxylic monomer as charged)

As to how to add the acid catalyst to the reaction system in the above esterification reaction, the addition may be carried out in a lump, continuously, or in order. However, from the viewpoint of workability, it is favorable to charge a reaction tank with the acid catalyst in a lump together with the raw materials.

When the esterification reaction is carried out in the presence of the acid catalyst in the above esterification reaction, the acid catalyst may be used in the form of its hydrate and/or aqueous solution.

Examples of the acid catalyst usable in the above mode include such that such as sulfuric acid, methanesulfonic acid, p-toluenesulfonic acid, xylenesulfonic acid, naphthalenesulfonic acid, trifluoromethanesulfonic acid, "Nafion" resin, "Amberlyst 15" resin, phosphotungstic acid, or hydrochloric acid is used in the form of its hydrate and/or aqueous solution. Of them, there are favorably used such that such as sulfuric acid, p-toluenesulfonic acid, or methanesulfonic acid is used in the form of its hydrate and/or aqueous solution. These may be used either alone respectively or in combinations with each other. Furthermore, as is mentioned above, the present inventors have got to know that: one of causes of forming a diester (which is an impurity) that causes the deterioration of the quality and performance of the esterified product is cleavage of the raw alkoxypolyalkylene glycol, and further there is a possibility that this cleavage may be caused also by the acid catalyst. On the basis of such findings, the present inventors have found out that such an acid catalyst as little causes the above cleavage is more desirable. As such an acid catalyst, specifically, there is used the p-toluenesulfonic acid in the form of its hydrate and/or aqueous solution.

As to the amount of the acid catalyst as used in the above mode, there is no especial limitation if it is in a range where the desired catalysis can effectively be displayed. However, considering the suppression of the cleaving action on the raw alcohol, the usability as the esterified product which is a raw material for polymer components as used for various uses (e.g. cement dispersants; pigment dispersants for such as calcium carbonate, carbon black, and ink; scale inhibitors; dispersants for gypsum and water slurry; dispersants for CWM; and thickeners), and the prevention and suppression of formation of a gel which causes formation of a high-molecular crosslinked polymer having such poor dispersibility as to cause a bad influence on such as dispersibility which is a fundamental performance as demanded for the above uses, then it is favorable that the amount of the acid catalyst as used satisfies the following relationship:

$$0<Y<1.81X-1.62$$

wherein: X (mass %) denotes a ratio of the mass of an acid in the acid catalyst to the total mass of the raw alkoxypolyalkylene glycol and the raw unsaturated monocarboxylic monomer (a); and Y (mass %) denotes a ratio of the mass of water, being present as the hydrate and/or aqueous solution in the acid catalyst, to the total mass of the raw alkoxypolyalkylene glycol and the raw unsaturated monocarboxylic monomer (a).

Incidentally, if explanations are made by citing specific examples to exclude misunderstanding, for example, if p-toluenesulfonic acid monohydrate is cited as an example, then the ratio of the mass of this p-toluenesulfonic acid to the total mass of the raw materials is X (mass %), and the ratio of the mass of water, being present as the monohydrate, to the total mass of the raw materials is Y (mass %). Therefore, acid components (e.g. the raw (meth)acrylic acid) other than the acid catalyst, and water (e.g. water as a product formed by the esterification reaction), can never be intended for X and Y as herein referred to.

Hereupon, in the case where the amount of the acid catalyst as used does not satisfy the relationship of the above expression, there occur the following problems. That is to say, in the case of Y=0, it follows that, in the acid catalyst, there is no water that should be present as the hydrate and/or aqueous solution, therefore the amount of a gel as formed in the reaction system during the esterification reaction increases, resulting in deterioration of performances, such as cement dispersibility, for uses such as cement dispersants that are synthesized from the esterified product as obtained by the esterification reaction. In addition, in the case of $Y \geq 1.81X-1.62$, it follows that the amount of a gel as formed in the reaction system during the esterification reaction increases, resulting in deterioration of performances, such as cement dispersibility, for uses such as cement dispersants that are synthesized from the esterified product as obtained by the esterification reaction.

As to how to add the acid catalyst to the reaction system in the above mode, the addition may be carried out in a lump, continuously, or in order. However, from the viewpoint of workability, it is favorable to charge a reaction tank with the acid catalyst in a lump together with the raw materials.

The above esterification reaction is carried out in the presence of a polymerization inhibitor desirably for inhibiting the polymerization of the raw alkoxypolyalkylene glycol, the raw unsaturated monocarboxylic monomer (a), or their mixture. As usable polymerization inhibitors, there can be cited such as publicly known ones, and there is no especial limitation, and examples thereof include phenothiazine, tri-p-nitrophenylmethyl, di-p-fluorophenylamine, diphenylpicrylhydrazyl, N-(3-N-oxyanilino-1,3-dimethylbutylidene)aniline oxide, benzoquinone, hydroquinone, methoquinone, butylcatechol, nitrosobenzene, picric acid, dithiobenzoyl disulfide, cupferron, and copper (II) chloride. Of these, phenothiazine, hydroquinone, and methoquinone are used favorably for the reason of their solubility in the dehydrating solvent and the formed water. These polymerization inhibitors may be used either alone respectively or in combinations with each other.

In addition, in the case where the acid catalyst is, as mentioned above, used in the form of its hydrate and/or aqueous solution, the phenothiazine is extremely useful in point of being able to: function effectively also to a gel-forming substance in an aqueous solution being present in the reaction system; and besides, as is mentioned below, extremely effectively display the polymerization inhibitability to effectively inhibit the formation of the high-molecular polymer also in a step of distilling off the dehydrating solvent by azeotropic distillation with water after the end of the esterification reaction, even if there is used no water-soluble polymerization inhibitor having polymerization activity (though it is weak), such as hydroquinone and methoquinone.

In the case where the polymerization inhibitor is used, its amount is favorably in the range of 0.001 to 1 mass %, more favorably 0.001 to 0.1 mass %, relative to the total amount of the raw alkoxypolyalkylene glycol and the raw unsaturated monocarboxylic monomer (a) as charged. In the case where the polymerization inhibitor as used is smaller than 0.001 mass %, there are disadvantages in that: the polymerization inhibitability is not sufficiently displayed, and it is therefore difficult to effectively inhibit the polymerization of the raw alkoxypolyalkylene glycol, the raw unsaturated monocarboxylic monomer (a), the resultant esterified product, or their mixture. In the case where the polymerization inhibitor as used is larger than 1 mass %, there are disadvantages from the viewpoint of the quality and performance in that the residual polymerization inhibitor content of the resultant esterified product increases, and further there are disadvantages also from the economical viewpoint in that there is not obtained any further effect rewarding the excessive addition, either.

As to the above esterification reaction, it is favorable to carry out this reaction in the dehydrating solvent. Herein the dehydrating solvent is defined as a solvent which does azeotropic distillation with water that is a reaction product. That is to say, the use of the dehydrating solvent enables efficient azeotropic distillation of water as a reaction product formed by the esterification reaction.

Examples of the dehydrating solvent include benzene, toluene, xylene, cyclohexane, dioxane, pentane, hexane, heptane, chlorobenzene, and isopropyl ether. These can be used either alone respectively or in combinations with each other. Favorable of these are those of which the temperature of azeotropic distillation with water is not higher than 150° C., more favorably in the range of 60 to 90° C., and specific examples thereof include cyclohexane, toluene, dioxane, benzene, isopropyl ether, hexane, and heptane. In the case where the temperature of azeotropic distillation with water is higher than 150° C., there are disadvantages from the viewpoint of handling (including such as management of temperature within the reaction tank during the reaction and the control of such as condensation liquefaction treatment of the azeotrope).

The above dehydrating solvent is desired to be refluxed while there are carried out operations of azeotropically distilling it off out of the reaction system together with water as a reaction product and then separating and thus removing the distilled-off water as a reaction product by its condensation liquefaction. Hereupon, the amount of the dehydrating solvent as used is in the range of 1 to 100 mass %, favorably 2 to 50 mass %, relative to the total amount of the raw alkoxypolyalkylene glycol and the raw unsaturated monocarboxylic monomer (a) as charged. In the case where the dehydrating solvent as used is smaller than 1 mass %, there are disadvantages in that: the water as a reaction product formed during the esterification reaction cannot sufficiently be removed out of the reaction system by azeotropic distillation, and it is therefore difficult for the equilibrium reaction of the esterification to proceed. In the case where the dehydrating solvent as used is larger than 100 mass %, there are disadvantages from the economical viewpoint in that there is not obtained any effect rewarding the excessive addition, and further in that a large quantity of heat is needed for keeping the reaction temperature constant.

When the dehydrating solvent is used in the above esterification reaction, it is desirable that the reaction temperature during the esterification reaction is set favorably in the range of 30 to 150° C., more favorably 60 to 140° C., and that the solvent-circulating rate during the esterification reaction is set favorably at not less than 0.5 cycle/hour, more favorably at not less than 1 to 100 cycles/hour. Thereby, it becomes unnecessary to carry out the reaction at a reaction temperature as raised to an impurities-forming temperature region (exceeding 130° C.), and it is therefore possible to prevent impurities from forming in the reaction tank. In addition, if the solvent-circulating rate is accelerated, then the water as a reaction product can efficiently be distillated from the reaction tank by the azeotropic distillation without allowing this water to reside in the reaction tank for a long period of time, so that the equilibrium reaction inclines toward the esterification, therefore the reaction time can be shortened, too.

Herein the "solvent-circulating rate during the esterification reaction" means what is defined as follows. That is to say, as to the entire quantity (volumetric quantity) of the dehydrating solvent as charged into the reaction tank, the one cycle is defined as a circulation of the quantity (volumetric quantity) corresponding to the entire quantity of the dehydrating solvent as charged into the reaction tank in circulating the dehydrating solvent (as contained in the reaction tank) during the esterification reaction in a manner such that the dehydrating solvent is discharged from the reaction tank and then passed through a circulation route and then returned to the reaction tank again. Then, the "solvent-circulating rate during the esterification reaction" is represented by such cycles per unit time (1 hour), so its unit is "cycles/hour". Accordingly, for example, as to the entire quantity of the dehydrating solvent as charged into the reaction tank, when 15 times the quantity corresponding to this entire quantity has been circulated in 5 hours, the solvent-circulating rate is 3 cycles/hour. Similarly, as to the entire quantity of the dehydrating solvent as charged into the reaction system, when half (0.5 times) the quantity corresponding to this entire quantity has been circulated in 2 hours, the solvent-circulating rate is 0.25 cycle/hour.

Incidentally, when the dehydrating solvent (as contained in the reaction system) is circulated in a manner such that the dehydrating solvent is distillated from the reaction system and then liquefied by condensation and then returned to the reaction system, there can be a case where what is circulated (an object being circulated) may contain, besides the dehydrating solvent, depending on modes for carrying out this circulation, low-boiling-point raw materials (being distillated: mainly, the unsaturated monocarboxylic monomer (a)) and various additives such as gelation inhibitors (e.g. polymerization inhibitors or solvents containing them) as added to inhibit these distillated raw materials from gelling to form harmful impurities, though the quantities of these other components are small. Therefore, in the case where the additives such as gelation inhibitors are used, it is desirable to fittingly adjust the set conditions in consideration that the variation of the solvent-circulating rate with the progress of the esterification reaction is caused by the use of the additives.

The above reaction temperature and the solvent-circulating rate can be adjusted into desired ranges by selecting such as: method (means) for heating the reaction tank; temperature (quantity of heat) as applied to the reaction tank with an apparatus as the above heating means; and amount of the dehydrating solvent as used relative to the raw materials as charged into the reaction tank. Incidentally, the reaction temperature is the maximum temperature in the reaction tank. That is to say, depending on modes of apparatuses as used as the heating means (e.g. external jackets, internal heaters), the temperature in the reaction tank (reaction temperature) differs according to positions therein, and also rises with the progress of the esterification reaction, and also varies with the passage of time. However, because the rise of the reaction temperature brings about formation of impurities, it is necessary for the reaction temperature not to exceed the above-defined upper limit temperature, regardless of conditions as to the position and time, wherever the position may be and whenever the time may be. Thus, herein the reaction temperature has bee decided to be defined as the maximum temperature.

In the present invention, the esterification reaction can be carried out either in a batchwise manner or in a continuous manner, but favorably in a batchwise manner.

In addition, the reaction conditions in the esterification reaction will do if they are those under which the esterification reaction smoothly proceeds. The reaction temperature is favorably in the range of 30 to 150° C., more favorably 60 to 140° C., still more favorably 90 to 135° C., particularly favorably 100 to 130° C. Incidentally, the above reaction temperature is included in the general esterification reaction conditions according to the present invention, and one example thereof is the case where the dehydrating solvent is refluxed while there are carried out operations of azeotropically distilling it off out of the reaction system together with water as a reaction product and then separating and thus removing the distilled-off water as a reaction product by its condensation liquefaction, and such a case is included in the above ranges, but does not entirely conform thereto. In the case where the reaction temperature is lower than 30° C., there are disadvantages in that: it is difficult for the esterification reaction to proceed, and also it takes much time to dehydrate (distillate) the water as a reaction product, and further the reflux of the dehydrating solvent is so slow that it takes much time to carry out the dehydration, therefore a long time is needed for the esterification reaction. Or otherwise in the case where the reaction temperature is higher than 150° C., there are disadvantages in that too large an amount of diester is formed due to the cleavage of the raw alkoxypolyalkylene glycol, so, besides the cement dispersibility, the other dispersibility and the thickening property in various uses are deteriorated, and further there still are disadvantages, for example, in that there occurs the deterioration in the performance and quality of the resultant esterified product due to such as polymerization of the raw materials or increase of the amount of the raw materials mingling into the distillate. In addition, the reaction time is, as mentioned below, favorably that of until reaching an esterification conversion of at least 70%, more favorably at least 80%, but is usually favorably in the range of 1 to 50 hours, more favorably 3 to 40 hours. Furthermore, the above esterification reaction may be carried out either under ordinary pressure or under reduced pressure, but under ordinary pressure desirably from the viewpoint of facilities.

The esterification conversion in the above esterification reaction is favorably not less than 70%, more favorably in the range of 70 to 99%, most favorably 80 to 98%. In the case where the esterification conversion is less than 70%, the yield of the esterified product as produced is so insufficient as to result in deterioration of performance for uses such as cement dispersants, for example, cement dispersibility. Incidentally, the term "esterification conversion", as used herein, is defined as a value calculated in accordance with the following equation by measuring the decrease of the alcohol (which is a starting substance for the esterification) under the following esterification measurement conditions:

<Esterification conversion measurement conditions>:

| | |
|---|---|
| Analyzer: | Millennium Chromatography Manager, produced by Waters Co., Ltd. |
| Detector: | 410 RI Detector, produced by Waters Co., Ltd. |
| Columns used: | Inertsil ODS-2 (3 columns), produced by GL Science |
| Column temperature: | 40° C. |
| Eluent: | as prepared by mixing 8,946 g of water, 6,000 g of acetonitrile, and 54 g of acetic acid together and then adjusting the pH of the resultant mixture to 4.0 with a 30 mass % aqueous sodium hydroxide solution. |
| Flow rate: | 0.6 ml/min |

Incidentally, the esterification conversion is determined in accordance with the above equation, and does therefore not exceed 100%. Accordingly, when the esterification conversion has reached not less than a prescribed value is regarded as the end of the esterification reaction.

In the present invention, it is favorable that the unsaturated polyalkylene glycolic monomer (b) of the aforementioned general formula (2) is subjected to the polymerization in the form of an esterification reaction product as obtained by a process including the step of carrying out an esterification reaction of "p" parts by weight of the alkoxypolyalkylene glycol of the aforementioned general formula (3) and "q" parts by weight of the unsaturated monocarboxylic monomer (a) under conditions satisfying a relationship of $[(p/n^{1/2})/q] \times 100 \leq 200$ (where n is a molar-number-average degree of addition polymerization of the oxyalkylene group).

If the esterification reaction is carried out in the presence of the unsaturated monocarboxylic monomer (a) in excess of the alkoxypolyalkylene glycol in the above way, the resultant alkoxypolyalkylene glycol mono(meth)acrylate monomer is present in the form of a mixture containing the unsaturated monocarboxylic monomer (a), therefore there are advantages in that the polycarboxylic copolymer can be produced by subjecting to the copolymerization reaction either this mixture as it is without isolating it, or, if necessary, a mixture (favorably, as it is without isolating it) as formed by further adding to the preceding mixture the unsaturated monocarboxylic monomer (a) and/or another monomer copolymerizable with these monomers. That is to say, if the amounts of the alkoxypolyalkylene glycol and the unsaturated monocarboxylic monomer (a) as used are adjusted into the above range, there are industrial advantages in that the step of isolating the alkoxypolyalkylene glycol mono(meth)acrylate can be omitted appropriately for the mass production.

The value of the above expression $[(p/n^{1/2})/q] \times 100$ is referred to also as "K value", and this K value is an index of the average number of polyalkylene glycol chains per mass of the carboxylic acid. In the present invention, the K value is favorably in the range of 42 to 190 (42 ≦ K value ≦ 190), more favorably 45 to 160 (45 ≦ K value ≦ 160). Hereupon, in the case where the K value is smaller than 40, there are disadvantages in that the cement dispersibility of the resultant cement dispersant is not sufficient. Or otherwise in the case where the K value is larger than 200, there are disadvantages in that: the cement dispersibility of the resultant cement dispersant is still low, and further the esterification reaction time increases so much as to result in greatly low productivity.

In the above expression $[(p/n^{1/2})/q] \times 100 \leq 200$, n is a molar-number-average degree of addition polymerization of the oxyalkylene group and is an integer of 1 to 300, but is favorably an integer of 1 to 200, more favorably an integer of 1 to 110, still more favorably an integer of 1 to 100, yet still more favorably an integer of 2 to 100, yet still more favorably an integer of 2 to 50, yet still more favorably an integer of 2 to 20. In the case where n is larger than 300, there are disadvantages in that the polymerizability of the esterified product from the alkoxypolyalkylene glycol of the formula (3) and the unsaturated monocarboxylic monomer (a) is low, and particularly in the case where n is larger than 110, there are greater disadvantages in that the above lowering of the polymerizability is greater.

That is to say, in the present invention, it is favorable that the unsaturated polyalkylene glycolic monomer (b) of the aforementioned general formula (2) is an esterification reaction product as obtained by a process including the step of carrying out an esterification reaction of "p" parts by weight of the alkoxypolyalkylene glycol of the aforementioned general formula (3) and "q" parts by weight of the unsaturated monocarboxylic monomer (a) in the presence of an acid catalyst under conditions satisfying such a relationship of $[(p/n^{1/2})/q] \times 100 \leq 200$ (where n is a molar-number-average degree of addition polymerization of the oxyalkylene group and is an integer of 1 to 110, more favorably an integer of 1 to 100, still more favorably an integer of 2 to 100, yet still more favorably an integer of 2 to 50, yet still more favorably an integer of 2 to 20) as allows a portion of the unsaturated monocarboxylic monomer (a) as a starting raw material to remain.

(Production of Alkoxypolyalkylene Glycol (alkylene oxide addition product))

An explanation is hereinafter made about the production of the alkoxypolyalkylene glycol which is a raw material for the above esterification step. Incidentally, in the following explanation, the alkoxypolyalkylene glycol is referred to as alkylene oxide addition product.

A favorable process for producing the alkylene oxide addition product usable in the present invention is a process for obtaining the alkylene oxide addition product by carrying out an addition reaction of an alkylene oxide to a hydroxyl-group-containing saturated compound and comprises: an initial step in which the alkylene oxide is caused to add to the hydroxyl-group-containing saturated compound to obtain an alkylene oxide-low mols addition product; and a step of adjusting the degree in molar number of addition polymerization in which the alkylene oxide is caused to further add to the alkylene oxide-low mols addition product as obtained in the aforementioned initial step.

Incidentally, the above "degree in molar number of addition polymerization" means the molar-number-average degree of addition polymerization and is specifically a molar-number-average degree of addition polymerization per 1 mol of hydroxyl groups.

In the aforementioned initial step, it is important that the amount of the alkylene oxide as used is set at not larger than 20 mols on average per 1 mol of the hydroxyl-group-containing saturated compound. This amount of the alkylene oxide as used is favorably not larger than 18 mols on average, more favorably not larger than 15 mols on average, still more favorably not larger than 12 mols on average.

Thereby the change in volume between before and after the reaction in the initial step can be suppressed into such a range as can be coped with by conventional production facilities (e.g. favorably not more than 28 times, more favorably not more than 22 times, still more favorably not more than 16 times, yet still more favorably not more than 10 times).

In the case where the amount of the alkylene oxide as used in the initial step is larger than 20 mols on average per 1 mol of the hydroxyl-group-containing saturated compound, the change in volume between before and after the reaction is so much that it becomes necessary to use a special reactor shape and/or a special stirrer. In addition, it may be thought out saving the amount of the charged hydroxyl-group-containing saturated compound to use conventional facilities, but such a case is unfavorable, because water mingles from apparatuses in so large an amount as to result in the increase of by-products such as poly(alkylene oxides).

There is no especial restriction on the lower limit value of the amount of the alkylene oxide as used in the aforementioned initial step, if it is within such a range as does not damage the effects of the present invention. However, the lower limit value is favorably not smaller than 1 mol on average, more favorably not smaller than 2 mols on average, still more favorably not smaller than 3 mols on average, yet still more favorably not smaller than 5 mols on average, per 1 mol of the hydroxyl-group-containing saturated compound.

There is no especial restriction on the hydroxyl-group-containing saturated compound as used in the aforementioned initial step, if it is a saturated compound containing a hydroxyl group. However, a hydrocarbon type of hydroxyl-group-containing saturated compounds are favorable for displaying the effects of the present invention enough. Hereupon, the "hydrocarbon type" means a compound of which not less than 70 weight %, favorably not less than 80 weight %, more favorably not less than 90 weight %, based on the weight of this compound, is composed of the following three kinds of atoms: carbon, hydrogen, and oxygen. Furthermore, saturated alcohols having 1 to 30 carbon atoms are favorable for displaying the effects of the present invention more enough. The number of carbon atoms of the saturated alcohol is favorably in the range of 1 to 20, more favorably 1 to 15, still more favorably 1 to 9, yet still more favorably 1 to 6. In the case where the number of carbon atoms of the saturated alcohol is larger than 30, there are disadvantages in that, for example, when a copolymer is produced via the alkylene oxide addition reaction, the esterification reaction or transesterification reaction, and the polymerization reaction, the resultant copolymer may have so low water-solubility as to result in deterioration of performance for uses, such as cement dispersibility.

When the saturated alcohols having 1 to 30 carbon atoms are used as the hydroxyl-group-containing saturated compound as used in the aforementioned initial step, specific examples thereof include saturated alcohols having 1 to 30 carbon atoms containing: alkyl groups such as methyl, ethyl, n-propyl, isopropyl, n-butyl, octyl, 2-ethylhexyl, dodecyl, hexadecyl, and octadecyl; aryl groups such as phenyl; alkylphenyl groups such as benzyl and nonylphenyl; and cycloalkyl groups such as cyclohexyl. Of these, methanol, ethanol, propanol, butanol, and phenol, particularly, methanol, are favorable for displaying the effects of the present invention enough.

In the aforementioned initial step, it is favorable to use a hydroxyl-group-containing saturated compound having a water content of not more than 6,000 ppm, more favorably not more than 4,000 ppm, still more favorably not more than 2,000 ppm, yet still more favorably not more than 1,000 ppm, particularly favorably not more than 500 ppm. If the water content is suppressed to not more than 6,000 ppm in this way, the formation of the by-products such as poly(alkylene oxides) can be more inhibited not only in the initial step but also in the subsequent step of adjusting the degree in molar number of addition polymerization. In the case where the water content is more than 6,000 ppm, the by-products such as poly(alkylene oxides) increase in the initial step, so that the resultant alkylene oxide-low mols addition product contains the poly(alkylene oxides) in a large amount. Furthermore, in the subsequent step of adjusting the degree in molar number of addition polymerization, the alkylene oxide further adds to the poly(alkylene oxides), as contained in impurities, to form high-molecular poly(alkylene oxides) by-products. Therefore, there are disadvantages in that, for example, in the case where the resultant alkylene oxide addition product is used as a raw material for polymers for cement additives, the performance as cement dispersants is deteriorated.

As to the aforementioned alkylene oxide usable in the present invention, though not being especially limited, alkylene oxides having 2 to 4 carbon atoms are favorable, and specific examples thereof include ethylene oxide, propylene oxide, and butylene oxide, and these can be used either alone respectively or in combinations with each other.

In the aforementioned step of adjusting the degree in molar number of addition polymerization, the alkylene oxide is caused to add to the alkylene oxide-low mols addition product as obtained in the aforementioned initial step, therefore the change in volume between before and after the reaction is less than that in the case of carrying out a direct addition reaction of the alkylene oxide, in the same mols as the total, to the hydroxyl-group-containing saturated compound, so that the alkylene oxide can be caused to add to a desired degree in molar number of addition polymerization with conventional facilities as provided with neither special reactor shape nor special stirrer.

In the present invention, it is favorable that, in the aforementioned step of adjusting the degree in molar number of addition polymerization, there is used a portion of the entire quantity of the alkylene oxide-low mols addition product as obtained in the aforementioned initial step. If, in this way, not the entire quantity but a partial quantity of the alkylene oxide-low mols addition product as obtained in the aforementioned initial step is used in the aforementioned step of adjusting the degree in molar number of addition polymerization, then an alkylene oxide addition product having a high degree in molar number of addition polymerization of the alkylene oxide can be produced with conventional facilities without considering the increase in volume from the charged raw materials to the formed products. Furthermore, if the above way is carried out, it is unnecessary to lessen the amount of the charged raw materials considering the volume of the formed products, therefore the amount of water mingling from apparatuses relative to that of the charged raw materials can be inhibited from increasing, so that the increase of the by-products such as poly(alkylene oxides) can be suppressed.

In the case where, as mentioned above, a portion of the entire quantity of the alkylene oxide-low mols addition product as obtained in the aforementioned initial step is used in the aforementioned step of adjusting the degree in molar number of addition polymerization, the rest as unused may be used in a further step of adjusting the degree in molar number of addition polymerization. In this case, all the rest is permitted not to be used.

For sufficiently displaying the effects of the present invention, it is favorable that: the aforementioned step of adjusting the degree in molar number of addition polymerization is carried out with a portion of the entire quantity of the alkylene oxide-low mols addition product as obtained in the aforementioned initial step, and then a further step of adjusting the degree in molar number of addition polymerization is carried out with at least a portion of the rest either at once or at more times divided. More favorably, the number of times of the aforementioned step of adjusting the degree in molar number of addition polymerization, as carried out with at least a portion of the rest, is 1 or 2, particularly favorably 1.

The amount of the alkylene oxide-low mols addition product, as used in the aforementioned step of adjusting the degree in molar number of addition polymerization, is favorably not larger than 60%, more favorably not larger than 55%, still more favorably not larger than 50%, yet still more favorably not larger than 45%, particularly favorably not larger than 40%, relative to the total volume of the reactor as used in this step. In such a step of adjusting the degree in molar number of addition polymerization, the change in volume between before and after the reaction is so small that the degree in molar number of addition polymerization of the alkylene oxide can be enhanced with conventional facilities. However, in the case where the amount of the alkylene oxide-low mols addition product as used is larger than 60% relative to the total volume of the reactor, the amount of the alkylene oxide as used may be restricted in conventional facilities so much that it is difficult to cause the alkylene oxide to add to a desired degree in molar number of addition polymerization.

In the case of trying to obtain an alkylene oxide addition product having a very high degree in molar number of addition polymerization, it is favorable that the aforementioned step of adjusting the degree in molar number of addition polymerization is carried out at not less than two times divided. Citing specific examples, in the case where, for example, an alkylene oxide addition product having a degree in molar number of addition polymerization of not smaller than 50 is desired, there may be included one example in which: an alkylene oxide-10 mols addition product is produced in the first-time step of adjusting the degree in molar number of addition polymerization, and then 40 mols of alkylene oxide is caused to further add to the above alkylene oxide-10 mols addition product.

As to the aforementioned step of adjusting the degree in molar number of addition polymerization, it is permitted that: after the aforementioned initial step, a portion of the resultant alkylene oxide-low mols addition product is extracted and then moved into such as storage tank, and then the aforementioned step of adjusting the degree in molar number of addition polymerization is carried out with the same reactor as that used in the aforementioned initial step; or a portion of the alkylene oxide-low mols addition product as obtained in the aforementioned initial step is moved into another reactor, and then the aforementioned step of adjusting the degree in molar number of addition polymerization is carried out with this reactor different from that used in the aforementioned initial step.

In the aforementioned step of adjusting the degree in molar number of addition polymerization, it is favorable that the amount of the alkylene oxide as used is set at not larger than 20 mols on average per 1 mol of the alkylene oxide-low mols addition product. This amount of the alkylene oxide as used is more favorably not larger than 18 mols on average, still more favorably not larger than 15 mols on average, yet still more favorably not larger than 12 mols on average.

Thereby the change in volume between before and after the reaction in the step of adjusting the degree in molar number of addition polymerization can be suppressed into such a range as can be coped with by conventional production facilities (e.g. favorably not more than 28 times, more favorably not more than 22 times, still more favorably not more than 16 times, yet still more favorably not more than 10 times).

In the case where the amount of the alkylene oxide as used in the step of adjusting the degree in molar number of addition polymerization is larger than 20 mols on average per 1 mol of the alkylene oxide-low mols addition product, the change in volume between before and after the reaction is so much that it becomes necessary to use a special reactor shape and/or a special stirrer. In addition, it may be thought out saving the amount of the charged alkylene oxide-low mols addition product to use conventional facilities, but such a case is unfavorable, because water mingles from apparatuses in so large an amount as to result in the increase of by-products such as poly(alkylene oxides).

There is no especial restriction on the lower limit value of the amount of the alkylene oxide as used in the aforementioned step of adjusting the degree in molar number of addition polymerization, if it is within such a range as does not damage the effects of the present invention. However, the lower limit value is favorably not smaller than 1 mol on average, more favorably not smaller than 2 mols on average, still more favorably not smaller than 3 mols on average, yet still more favorably not smaller than 5 mols on average, per 1 mol of the alkylene oxide-low mols addition product.

When the alkylene oxide is caused to add, what can favorably be used as the catalyst are, for example, alkaline metals, alkaline earth metals, and their hydroxides, and more favorably, sodium, sodium amalgam, sodium halides, sodium hydroxide, potassium, potassium amalgam, potassium halides, and potassium hydroxide. These can be used either alone respectively or in combinations with each other. These catalysts may be added only in the initial step, because the catalysts which remain in the products as obtained in the initial step acts in the step of adjusting the degree in molar number of addition polymerization. However, favorably they are added both in the initial step and in the step of adjusting the degree in molar number of addition polymerization. Although there is no especial limitation on the amount of the catalyst as used, yet it is favorably in the range of 10 to 5,000 ppm relative to the alkylene oxide addition product.

Although there is no especial limitation on the reaction temperature in the aforementioned initial step, yet it is favorably in the range of 60 to 180° C., more favorably 60 to 160° C., still more favorably 70 to 150° C. In the case where the reaction temperature is higher than 180° C., the by-products such as poly(alkylene oxides) tend to increase, so that, for example, in the case where the resultant alkylene oxide addition product is used to obtain a polymer for cement dispersants, the performance such as water reducibility tends to be deteriorated. On the other hand in the case where the reaction temperature is lower than 60° C., there are disadvantages in that the addition rate is so slow as to result in low productivity.

Although there is no especial limitation on the reaction temperature in the aforementioned step of adjusting the degree in molar number of addition polymerization, yet it is favorably in the range of 80 to 180° C., more favorably 90 to 170° C., still more favorably 100 to 160° C. In the case where the reaction temperature is higher than 180° C., the by-products such as poly(alkylene oxides) tend to increase, so that, for example, in the case where the resultant alkylene oxide addition product is used to obtain a polymer for cement dispersants, the performance such as water reducibility tends to be deteriorated. On the other hand in the case where the reaction temperature is lower than 80° C., there are disadvantages in that the addition rate is so slow as to result in low productivity.

The addition reactions in the aforementioned initial step and in the aforementioned step of adjusting the degree in molar number of addition polymerization may be carried out either in a batchwise manner or in a continuous manner, but usually in a manner such that the alkylene oxide is continuously added to the hydroxyl-group-containing saturated compound or the alkylene oxide-low mols addition product, and, if necessary, into the aforementioned catalyst. Moreover, the aforementioned addition reactions are favorably carried out under an inert gas atmosphere such as nitrogen, argon, and helium, particular favorably under a nitrogen atmosphere. Furthermore, the aforementioned addition reactions are favorably carried out under an increased pressure.

There is no especial limitation on the size of the reactor in the case of producing the alkylene oxide addition product by the process for producing the alkylene oxide addition product. However, as the volume of the reactor becomes larger, the effects of the present invention can be displayed more and more enough. Therefore the effective production scale is favorably not smaller than 100 liters, more favorably not smaller than 500 liters, still more favorably not smaller than 1 m$^3$, yet still more favorably not smaller than 5 m$^3$.

(Partial Neutralization)

In the present invention, furthermore, it is favorable to neutralize the acid catalyst and 0 to 60 mol % of the residual unsaturated monocarboxylic monomer (a) with a basic substance after the esterification reaction.

In the case where, after the esterification reaction, the azeotropic distillation with water as added is carried out in the step of distilling off the dehydrating solvent, or in the case where, after the esterification reaction, adjustment water is added to prepare an aqueous solution of the resultant esterified product in order to further carry out the polymerization with the esterified product, the hydrolysis of the esterified product is caused by the acid catalyst to thus bring about the deterioration of the quality and performance of the esterified product. Furthermore, products formed by the above hydrolysis (which may hereinafter be referred to simply as hydrolyzed products) reside in the esterified product and, when a polymer as used for such as various dispersants (e.g. cement dispersants) and thickeners is synthesized from this esterified product, the above hydrolyzed products become impurities which do not participate in the polymerization, thus lowering the polymerization conversion (also the productivity) and also leading to the deterioration of the quality and performance of the polymer. As a result of diligent study to solve such problems, the present inventors have found out that a means for the solution is to neutralize the acid catalyst and 0 to 60 mol % of the residual unsaturated monocarboxylic monomer (a) with a basic substance after the esterification reaction. Thereby an esterified product of high purity and high quality can be obtained without the formation of the hydrolyzed products in the treatment step after the esterification reaction.

Hereupon, explanations are hereinafter made about favorable modes for carrying out the partial neutralization step.

In the partial neutralization step favorable for the present invention, the acid catalyst and 0 to 60 mol % of the residual unsaturated monocarboxylic monomer (a) are neutralized with a basic substance, favorably at not higher than 90° C., more favorably in the range of 50 to 0° C., after the end of the esterification reaction.

In the case where the neutralization temperature (liquid temperature of the reaction system) in the above partial neutralization step is higher than 90° C., there are disadvantages in that the basic substance as added acts as a catalyst of the hydrolysis to form the hydrolyzed products in large quantities. Furthermore, at not higher than 50° C., the basic substance does not act as the catalyst of the hydrolysis, but the formation of the hydrolyzed products can perfectly be inhibited. On the other hand, the case of lower than 0° C. is not very desirable in that: the esterification reaction liquid is so viscous that the stirring during the neutralization is difficult, and further a long time is needed for lowering the temperature to a predetermined temperature after the esterification reaction, and further the use of a cooling means (apparatus) is newly needed for lowering the temperature to lower than room temperature, so that the costs increase.

In addition, there is no especial limitation on the basic substance (neutralizing agent) usable in the above partial neutralization step, but that will do if it is a substance which is in the form of a hydroxide $M(OH)_n$, and dissolves in water, and displays the basicity, wherein M denotes such as an alkaline metal, an alkaline earth metal, and an ammonium group. Furthermore, such as alkaline metal carbonates, alkaline metal phosphates, ammonia, and amines are also included in the basic substances as herein referred to. Thus, specific examples of the basic substances include: alkaline metal hydroxides such as sodium hydroxide and potassium hydroxide; alkaline earth metal hydroxides such as magnesium hydroxide and calcium hydroxide; ammonia; and amines. However, such as hydroxides, carbonates, and phosphates of alkaline metals and alkaline earth metals are favorable for the reason that no stench is given out when they are added to cement. Furthermore, in the present invention, these basic substances may be used either alone respectively or in combinations with each other in appropriate ratios.

The acids being neutralized with the above basic substance are the acid catalyst and 0 to 60 mol % of the residual unsaturated monocarboxylic monomer (a). Hereupon, the unsaturated monocarboxylic monomer (a) being neutralized is 0 to 60 mol %, favorably 0 to 55 mol %, more favorably 1 to 55 mol %, still more favorably 1 to 50 mol %, yet still more favorably 5 to 50 mol %, particularly favorably 5 to 40 mol %, of the residual unsaturated monocarboxylic monomer (a). In addition, the unsaturated monocarboxylic monomer (a) being neutralized is favorably not more than 10 mass %, more favorably in the range of 0.01 to 5 mass %, of the unsaturated monocarboxylic monomer (a) as used in the esterification reaction. Accordingly, the amount of the basic substance (neutralizing agent) as added is favorably in the range of 1.0 to 100 equivalents, more favorably 1.0 to 10 equivalents, still more favorably 1.01 to 2 equivalents, per 1 equivalent of the acid catalyst.

In the case where the unsaturated monocarboxylic monomer (a) being neutralized is more than 10 mass % of the unsaturated monocarboxylic monomer (a) as used in the esterification reaction, there are disadvantages in that probably because the polymerization rate of the unsaturated monocarboxylic monomer (a) in the form of salt is slower than that not in the form of salt, the polymerization conversion in the polymerization with the resultant esterified product is low. Furthermore, in the case where the amount of the basic substance (neutralizing agent) as added is smaller than 1.0 equivalent per 1 equivalent of the acid catalyst, there are disadvantages in that: the acid catalyst cannot wholly be neutralized and, as a result, the hydrolyzed products are formed in large quantities. Or otherwise, also in the case where the amount of the basic substance (neutralizing agent) as added is larger than 100 equivalents per 1 equivalent of the acid catalyst, there are disadvantages in that: a large quantity of the unsaturated monocarboxylic monomer (a) is neutralized and, as a result, still because the polymerization rate of the unsaturated monocarboxylic monomer (a) in the form of salt is slower than that not in the form of salt, the polymerization conversion in the polymerization with the resultant esterified product is low.

The reason why an acid to be neutralized is the acid catalyst that, since, as mentioned above, the acid catalyst strongly reacts with water, which is added after the esterification reaction, to form the hydrolyzed products, it is necessary to inactivate the acid catalyst. Incidentally, as to acid components, there can exist the residual unsaturated monocarboxylic monomer (a) besides the acid catalyst, but the acid catalyst has greater acid strength than the monomer (a) and therefore becomes neutralized prior to the monomer (a).

Incidentally, although there is no especial limitation on the form of the basic substance being added, the form of aqueous alkali solution can be said to be favorable from the viewpoint of the prevention of the hydrolysis of the esterified product.

Particularly, in the case where the esterification reaction is carried out in the dehydrating solvent, the addition of a large amount of water to the reaction system together with the basic substance is favorable for the prevention of the hydrolysis of the esterified product. That is to say, in a reaction system which does not contain a large amount of water, the basic substance is so difficult to dissolve into the dehydrating solvent as to float in the system in a concentrated state, and this floating of the basic substance in a high concentration does not disappear over a long period of time until being consumed by the neutralization, but causes the hydrolysis of the esterified product. Though depending on the form of the basic substance as used, the amount of the above water as added is usually favorably in the range of 5 to 1,000 mass parts, more favorably 10 to 100 mass parts, apart from the aqueous alkali solution, per 1 mass part of the aqueous alkali solution, for example, in the case where the aqueous alkali solution is added as the neutralizing agent in an amount of 40 to 60%. Hereupon, in the case where the amount of the above water as added is smaller than 5 mass parts, there are disadvantages in that: the basic substance exists heterogeneously in the reaction system for the above reason, therefore the basic substance in a high concentration causes the hydrolysis of the esterified product. In the case where the amount of the above water as added is larger than 1,000 mass parts, there are disadvantages in that: costs become high, for example, because a neutralization tank becomes separately needed for securing the productivity.

(Adjustment of pH)

In the present invention, it is favorable that the polymerization reaction is carried out under conditions where the pH of the reaction liquid of the polymerization reaction is in the range of 3.2 to 7.0, favorably by carrying out the above partial neutralization. If the pH of the reaction liquid of the polymerization reaction is put in the range of 3.2 to 7.0, there are advantages in that the polymerization conversion of the polymerization reaction can be enhanced. In addition, if the pH of the reaction liquid of the polymerization reaction is put in the range of 3.2 to 7.0, there are advantages in that the corrosion of the polymerization apparatus (vessel) can be prevented.

The range of the above pH is more favorably pH 3.3 to 7.0, still more favorably pH 3.5 to 6.5, particularly favorably pH 4.0 to 5.2.

In the case of deviation from the above pH range, the polymerization conversion of the polymerization reaction is low, and further the corrosion of the polymerization apparatus (vessel) is so much as to cost a lot uneconomically.

A polymer as produced in the above pH range has an extremely low yellowness index, and its $M_w$–$M_p$, which is a difference between the weight-average molecular weight $M_w$ and the peak top average molecular weight $M_p$ also comes in the range of 0 to 9,000. Therefore, when this polymer is used as a cement dispersant, no coloring takes place, and also the dispersibility is extremely good, and further the water-reducing effect is extremely high.

From the above, a particularly favorable mode of the process for producing a (meth)acrylic acid (salt) polymer, according to the present invention, is a process for producing a (meth)acrylic acid (salt) polymer which comprises the step of carrying out polymerization of the unsaturated monocarboxylic monomer (a) of the aforementioned general formula (1) and the unsaturated polyalkylene glycolic monomer (b) of the aforementioned general formula (2) with a polymerization initiator, wherein:

the unsaturated polyalkylene glycolic monomer (b) of the aforementioned general formula (2) is subjected to the polymerization in the form of an esterification reaction product as obtained by a process including the steps of: carrying out an esterification reaction of "p" parts by weight of the alkoxypolyalkylene glycol of the aforementioned general formula (3) and "q" parts by weight of the unsaturated monocarboxylic monomer (a) in the presence of an acid catalyst under conditions satisfying such a relationship of $[(p/n^{1/2})/q] \times 100 \leq 200$ (where n is a molar-number-average degree of addition polymerization of the oxyalkylene group and is an integer of 1 to 110, more favorably an integer of 1 to 100, still more favorably an integer of 2 to 100, yet still more favorably an integer of 2 to 50, yet still more favorably an integer of 2 to 20) as allows a portion of the unsaturated monocarboxylic monomer (a) as a starting raw material to remain; and then neutralizing the acid catalyst and 0 to 60 mol % of the residual unsaturated monocarboxylic monomer (a) with a basic substance after the esterification reaction; and the polymerization is carried out under conditions where the pH of the polymerization reaction liquid is in the range of 3.2 to 7.0.

(Step of Distilling Off Solvent: gelation inhibition)

In the production process according to the present invention, it is favorable that the gelation inhibition is carried out in the step of distilling off the solvent.

Centering two modes for carrying out the present invention, explanations are hereinafter made about the gelation inhibition which is favorably applicable to the present invention.

The present inventors have found out that it is desirable to distillate water as a reaction product formed during the esterification reaction, and to cause a gelation inhibitor to act on the distillates containing this water as a reaction product. For explanatory convenience' sake, hereinafter, such a mode may be referred to as implementation mode (A).

The implementation mode (A) can effectively inhibit the generation itself of gelled substances (e.g. poly((meth) acrylic acid)) as formed from such as (meth)acrylic acid which are low-boiling-point raw materials being distilled out of the reaction system together with water as a reaction product while this water as a reaction product in the reaction system is distilled out of the reaction system and then separated and thus removed by its condensation liquefaction. In other words, the implementation mode (A) can inhibit the formation of the gelled substances which cause such as quality deterioration of the product and clogging of apparatus.

As to the above gelation inhibitor as used to be caused to act on the distillates such as water as a reaction product formed during the esterification reaction, there is no especial limitation if it can inhibit the polymerization reaction in the distillation stage, particularly the condensation stage, of the low-boiling-point raw materials being distilled together with water as a reaction product, and can therefore inhibit the gel formation occurring in such as a flange portion of a tube rising from the reaction tank to the condenser, in other words, the clogging of a tube of the condenser and of a connecting tube between the reaction tank and the condenser. The above gelation inhibitor is not at all different from a polymerization inhibitor as used for the same purpose as the above in the reaction system, but can be used in the same way as explained above, and further there can be used those which are selected appropriately from among various conventional already-known gelation inhibitors. Specific examples of the above gelation inhibitor include phenothiazine, tri-p-nitrophenylmethyl, di-p-fluorophenylamine, diphenylpicrylhydrazyl, N-(3-N-oxyanilino-1,3-dimethylbutylidene)aniline oxide, benzoquinone, hydroquinone, methoquinone, butylcatechol, nitrosobenzene, picric acid, dithiobenzoyl disulfide, cupferron, and copper (II) chloride. Of these, phenothiazine, hydroquinone, and methoquinone are used favorably for the reason of their solubility in the dehydrating solvent and the formed water. These gelation inhibitors may be used either alone respectively or in combinations with each other.

As to the amount of the above gelation inhibitor as added, it is enough to fittingly add such an amount as is appropriate for the amount of the low-boiling-point raw materials as distilled according to the esterification reaction conditions particularly such as quantity of heat as applied to the reaction system and amount of the dehydrating solvent as charged into the reaction system, in other words, it is enough to fittingly add such an amount as can constantly effectively inhibit the gel from forming from the low-boiling-point raw materials being distilled one by one from the distillation initiation of the azeotrope till the end of the esterification reaction. The above object can be achieved by adding the gelation inhibitor in the range of favorably 0.1 to 1,000 mass ppm, more favorably 1 to 500 mass ppm, relative to the total of the alkoxypolyalkylene glycol and the unsaturated monocarboxylic monomer (a) which are charged as raw materials. In the case where the amount of the gelation inhibitor as added is smaller than 0.1 mass ppm relative to the total of the raw materials as charged, the gelled substances may form, therefore such a small amount can be said to be an amount insufficient to cause the polymerization inhibitability to constantly effectively work on the low-boiling-point raw materials being distilled one by one from the distillation initiation of the azeotrope till the end of the esterification reaction. On the other hand, the case where the amount of the gelation inhibitor as added is larger than 1,000 mass ppm relative to the total of the raw materials as charged is uneconomical in that: such a large amount is too sufficient an amount to cause the gel formation inhibitability (polymerization inhibitability) to effectively work, and it cannot be expected that any further effect rewarding such an excessive addition is displayed. Incidentally, in the case where the amount of the gelation inhibitor to be added is added all at once, it is difficult to effectively inhibit the gel from forming from the low-boiling-point raw materials being distillated one by one from the distillation initiation of the azeotrope till the end of the esterification reaction. Therefore, it is desirable to add the gelation inhibitor one by one (continuously) in a definite amount every addition in the form responding to the distillation of the azeotrope from the distillation initiation of the azeotrope till the end of the esterification reaction, thus adjusting the final total amount of the added gelation inhibitor into the above range.

As to how to cause the above gelation inhibitor to act (e.g. form of action, region where action is made), there is no especial limitation if it is possible to cause the gelation inhibitor to effectively act on (contact with) the low-boiling-point raw materials (fluid materials) as distillated out of the reaction system. For example, the above gelation inhibitor may be caused to act either on a gaseous distillate before it is liquefied by condensation or on a liquid distillate as liquefied by condensation liquefaction. In addition, both the above action methods may be made good use of.

Hereafter favorable methods for causing the above gelation inhibitor to act are explained by citing examples every form of the action. In the present invention, these can appropriately be combined with each other, and besides, conventional already-known other action methods can appropriately be utilized. Incidentally, the below-exemplified action methods illustratively show representative ones in order to enable a skilled person in the art to easily understand the present invention, and it is of course that the present invention is not limited to these examples.

(1) A method for causing the gelation inhibitor to act in a liquefied (dissolved) state in which: the gelation inhibitor is dissolved into an appropriate solvent, favorably the same kind of solvent as the dehydrating solvent charged into the reaction system; and then the resultant liquefied product is dropped or sprayed to a region where the distillate containing water as a reaction product (favorably, solvent-water azeotrope) is condensed, specifically a condensation portion inside the condenser where the condensation liquefaction of the distillate containing water as a reaction product is carried out, favorably from an upper portion (above all, the neighborhood of a column top portion) of the condenser into the condenser in a manner for the above liquid to contact with the above distillate in a parallel flow. In addition, depending on such as type of the condenser, it may be arranged that a solution containing the gelation inhibitor is beforehand charged into the condenser, and then the gaseous distillate is blown into it or the liquefied distillate is injected into it, thus carrying out the contact (phase dissolution or dispersion). Furthermore, in the above mode, as the portion where the gelation inhibitor is caused to act, there is adopted the condensation portion inside the condenser, but in addition to this portion, there may also be adopted other portions where a gel tends to be formed, such as: a joint portion (flange portion) between the reaction tank and a vapor-rising line; a flange portion (e.g. a flange portion between the vapor line and the column top portion of the condenser); a thermometer as set in such as the reaction tank; and a projecting portion as provided to an observation hatch. Of these, the condensation portion (above all, the neighborhood of the column top portion) inside the condenser, the flange portion between the reaction tank and the vapor-rising line, and the flange portion between the vapor line and the column top portion of the condenser are favorable portions where the gelation inhibitor is caused to act. In addition, the above action portion is not limited to one place, but at least two places may be provided at the same time, if necessary.

(2) A method for causing the gelation inhibitor to act in a solidified state in which: a powdery gelation inhibitor is caused to fall, by dropping or spreading, to a region where the distillate containing water as a reaction product is condensed, specifically a condensation portion inside the condenser where the condensation liquefaction of the distillate containing water as a reaction product is carried out, favorably from an upper portion (above all, the neighborhood of a column top portion) of the condenser into the condenser in a manner for the above liquid to contact with the above distillate in a parallel flow. In addition, depending on such as type of the condenser, it may be arranged that the gelation inhibitor having a definite particle diameter is beforehand charged, by such as piling or filling, into the condenser, and then is caused to contact with the distillate. Furthermore, in the above mode, as the portion where the gelation inhibitor is caused to act, there is adopted the condensation portion inside the condenser, but in addition to this portion, there may also be adopted other portions where a gel tends to be formed, such as: a joint portion (flange portion) between the reaction tank and a vapor-rising line; a flange portion (e.g. a flange portion between the vapor line and the column top portion of the condenser); a thermometer as set in such as the reaction tank; and a projecting portion as provided to an observation hatch. Of these, the condensation portion (above all, the neighborhood of the column top portion) inside the condenser, the flange portion between the reaction tank and the vapor-rising line, and the flange portion between the vapor line and the column top portion of the condenser are favorable portions where the gelation inhibitor is caused to act. In addition, the above action portion is not limited to one place, but at least two places may be provided at the same time, if necessary.

(3) A method for causing the gelation inhibitor to act in a gasified state in which: the gelation inhibitor is gasified (including a sublimed one) and then, before the condensation liquefaction of the gaseous distillate containing water as a reaction product (including the low-boiling-point raw materials), the gasified gelation inhibitor is supplied into a piping route through which the reaction system (reactor) and the condenser are connected with each other, for example, portions where a gel tends to be formed, such as: the condensation portion (above all, the neighborhood of the column top portion) inside the condenser; a joint portion (flange portion) between the reaction tank and a vapor-rising line; a flange portion (e.g. a flange portion between the vapor line and the column top portion of the condenser); a thermometer as set in such as the reaction tank; and a projecting portion as provided to an observation hatch; favorably, the condensation portion (above all, the neighborhood of the column top portion) inside the condenser, the flange portion between the reaction tank and the vapor-rising line, and the flange portion between the vapor line and the column top portion of the condenser; thus mixing the gelation inhibitor and the distillate together.

In the present invention, in the case where it is an object to inhibit the gel formation in the flange portion between the reaction tank and the vapor-rising line, the above object may be achieved by supplying only the dehydrating solvent (without causing it to contain the gelation inhibitor) to the above flange portion. Incidentally, in the above, specific examples of the dehydrating solvent include the same as are previously explained. In the case where the above mode is applied during the esterification reaction, an identical kind of dehydrating solvent may be used, or different kinds of dehydrating solvents may be used. Or, though being explained hereinafter in detail, a condensed liquid (or a portion thereof) may be used in a manner to circulate it. In addition, when the esterification reaction is carried out in the absence of the dehydrating solvent, a dehydrating-solvent-supplying mechanism may separately be provided favorably near the flange portion to supply the dehydrating solvent to the flange portion.

Incidentally, of the above (1) to (3), the above (1) is favorably adopted for the below-explained reason. That is to say, from the economical viewpoint and the handling respect, it is desirable to remove the dehydrating solvent by distillation at a temperature as low as possible. Examples of effective means therefor include a method in which an appropriate amount of water is used to distillate the dehydrating solvent (particularly in the case where an aqueous alkali solution having a low concentration is used to carry out the treatment in the above partial neutralization step, a large amount of water is already present in the system, and this water may be used). If an appropriate amount of water is used to distillate it together with the dehydrating solvent (azeotropic distillation), the low-boiling-point raw materials transfer also to the water phase side and is thereby distillated together with water, and besides, there decreases the ratio of the dehydrating solvent in the distillate being azeotropically distilled by degrees with the gradual progress of the distillation of the dehydrating solvent, and finally, what is distilled becomes limited to almost nothing but water (containing the low-boiling-point raw materials), so no sufficient effect becomes obtained even if the gelation inhibitor is dissolved into the solvent. Thus, it is desirable to cause the gelation inhibitor to act in the form of a mixture with water by the above method (1), and particularly, it is more desirable to use a water-soluble gelation inhibitor to cause it to act in the form dissolved in water. Furthermore, it is desirable to cause the gelation inhibitor to act in the form dissolved in water and/or a solvent, according to the component composition of the distillate, by the above method (1) so that the gelation inhibitor can effectively act on a distillate containing unreacted low-boiling-point raw materials (specifically, when the distillate containing the low-boiling-point raw materials is condensed (liquefied), the gelation inhibitor can rapidly contact with the resultant liquefied materials to phase-dissolve or disperse into the liquefied materials (water and the organic solvent) containing the low-boiling-point raw materials becoming gelled). For example, while a compositional change of the distillate with the passage of time is monitored with such as a sensor, the composition of gelation inhibitors being caused to act (for example, when several kinds of gelation inhibitors are used, the mixing ratio between compositions of gelation inhibitors which are soluble in a solvent, favorably the dehydrating solvent, and of gelation inhibitors which are soluble in water) may be changed, and it is desirable that, as to the gelation inhibitor soluble in the dehydrating solvent, its solution in the dehydrating solvent and, as to the gelation inhibitor soluble in water, its solution in water should be caused to act by such as dropping or spraying them from their respective spray nozzles (as set in apparatus such as condenser) via separate routes. In addition, as a reason for adopting the above method (1), there can also be cited a merit such that, as the amount of a liquid as used per unit mass of the gelation inhibitor increases, such a liquid in which the gelation inhibitor is mixed can more and more act as one of means for liquefaction condensation (=a heat-exchange medium).

Hereupon, as the water-soluble gelation inhibitors usable in the case where gelation inhibitors are caused to act in a state dissolved in water, for example, such as hydroquinone and methoquinone are favorably used.

In the case of the above method (1), namely, the method for causing the gelation inhibitor to act in a liquefied (dissolved) state, examples of solvents which can dissolve the above gelation inhibitor include benzene, toluene, xylene, cyclohexane, acetone, methyl ethyl ketone, n-hexane, and heptane, but favorably, as mentioned above, it is preferred to use the same kind of solvent as the dehydrating solvent charged into the reaction system.

That is to say, in the case where a solvent different from the dehydrating solvent is used, for the purpose of separately recovering and then recycling these mixed solvents, it is necessary to multistepwise carry out separation purification treatment, therefore high costs are needed for the recycling, and it costs lower to throw the mixed solvents away after their use. However, even the disposal of the mixed solvents by such throwaway (e.g. incineration treatment, or treatment as wastewater after dilution to not more than environmental regulation values) needs a certain cost and besides, brings about not a little air pollution or water pollution or the like, therefore results in, so to speak, going against making the earth-friendly amenity which is often said today. On the other hand, in the case where the same kind of solvent as the dehydrating solvent is used, recycling at a low cost becomes possible by simple treatment, so it can be said that there is excellence in point of costs and environment.

As mentioned above, in the case where the gelation inhibitor is caused to act in the form dissolved in a solvent (favorably, the dehydrating solvent), it is favorable that the gelation inhibitor is supplied in a manner for it to constantly be present and thus function effectively to the low-boiling-point raw materials (gases or liquefied materials), passing through inside the condenser, so that the generation of the gelled substances can be suppressed.

Though the mixing ratio between the gelation inhibitor and the solvent is not especially limited, the gelation inhibitor is usually mixed favorably in the range of 0.001 to 10 mass parts, more favorably 0.01 to 5 mass parts, per 100 mass parts of the solvent. In the case where the mixing ratio between the gelation inhibitor and the solvent is less than 0.001 mass parts of the gelation inhibitor per 100 mass parts of the solvent, because the amount of the addition of the gelation inhibitor as used is, as prescribed above, a definite amount relative to the raw materials as charged, the amount of the solvent as used (total amount thereof as added) is, as a result, so large that this solvent is gradually refluxed to the initially charged dehydrating solvent to increase the total amount of the solvents by degrees, therefore there occurs a necessity for the control and management of the reaction system to become complicated, for example, it is necessary to adjust such as quantity of heat, as applied to the reaction system, in order for the distillation amount (distillation rate) of the water as a reaction product not to greatly vary. In addition, in the case where a solvent different from the dehydrating solvent is used and then separated and recovered, the costs of this recovery increase, so that the production costs pile up. On the other hand, in the case where the mixing ratio between the gelation inhibitor and the solvent is more than 10 mass parts of the gelation inhibitor per 100 mass parts of the solvent, the amount of the solvent as used (total amount thereof as added) is inversely so small that: the amount of the addition per unit time is restricted, and the frequency of the contact with the low-boiling-point raw materials therefore relatively decreases, and the low-boiling-point raw materials are therefore liquefied as they have not yet contacted, and it is therefore difficult to effectively suppress the formation of the gelled substances. Therefore, for securing the amount of the addition as needed per unit time, it becomes necessary to use the gelation inhibitor in a large amount not less than is prescribed above relative to the raw materials as charged, thus resulting in the rise of the production costs.

Next, explanations are made about another implementation mode (B) with respect to the gelation inhibition.

In the case where the esterification reaction is carried out in the dehydrating solvent, it is favorable that a gelation inhibitor solution containing the gelation inhibitor and a portion of the below-mentioned condensed liquid residue is caused to act on the below-mentioned distillate when the esterification reaction is carried out while there is carried out a process including the following steps in which: water as a reaction product being formed during the esterification reaction is distillated together with the dehydrating solvent; and then the distillate containing this water as a reaction product is liquefied by condensation; and then the water as a reaction product is removed by separation from the condensed liquid as liquefied by condensation; and then the condensed liquid residue (containing the dehydrating solvent) left as a result of the above removal by separation of the water as a reaction product is returned to the reaction tank. Such a mode may be referred to as implementation mode (B).

The implementation mode (B) can suppress the amount of the condensed liquid residue (increasing in the reaction tank) to the utmost, and also can constantly supply the gelation inhibitor solution (cause it to fall from the column top portion of the condenser) to the distillate in an enough amount (particularly, to the distillate in an amount enough to sufficiently wet the inner surface (above all, of the column top portion) of the condenser where the distillate is liquefied by condensation). Therefore, the implementation mode (B) can constantly effectively inhibit the generation of the gelled substances as formed from the low-boiling-point raw materials being distillated together with water as a reaction product while this water as a reaction product in the reaction tank is distillated from the reaction tank and then separated and thus removed by its condensation liquefaction, so that a high-quality esterified product can be produced with good efficiency and therefore at a low cost.

In the above implementation mode (B), the distillate usually contains the water as a reaction product as formed by the esterification reaction, and besides, the raw materials (particularly, the unsaturated monocarboxylic monomer (a)) being distillated together with the water as a reaction product while this water as a reaction product is distillated from the reaction tank, and further, the dehydrating solvent as added to the reaction tank for the purpose of the azeotropic distillation with the water as a reaction product, if necessary.

In the case where the gelation inhibitor is caused to act on the dehydrating-solvent-containing distillate in the step of distilling off the dehydrating solvent after the end of the esterification reaction, there may be included the above implementation mode (B) and/or the aforementioned implementation mode (A) in which: the water as a reaction product being formed during the esterification reaction is distillated together with the dehydrating solvent, and then the gelation inhibitor is caused to act on the resultant distillate.

The gelation inhibitor solution as used in the above implementation mode (B) is a solution which is caused to act on the distillate, more specifically a solution which is caused to act on the low-boiling-point raw materials in the distillate for the purpose of the gelation inhibition, and contains the gelation inhibitor and a portion of the condensed liquid. Hereupon, the gelation inhibitor may be used either in the intact form or in the solution form. Favorably the gelation inhibitor solution contains the solution-form gelation inhibitor and a portion of the condensed liquid residue.

Herein the term "condensed liquid" means what has come out of an outlet of the condenser. In addition, in the above implementation mode (B), the gelation inhibitor solution may be caused to act on the distillate such as water as a reaction product being formed during the esterification reaction. Therefore, in such a case, the gelation inhibitor solution is contained in the condensed liquid. Because the condensed liquid is further thereafter separated into the condensed liquid residue and the separated water with a water separator, these condensed liquid residue and separated water are both included in the definition of the condensed liquid, and these may be used alone independently of each other.

Herein, in the "portion of the condensed liquid", there are also included the condensed liquid residue, as obtained by separating the condensed liquid, and a portion of the condensed liquid residue besides what is obtained by merely partitioning the condensed liquid.

Herein the "condensed liquid residue" means solvent-side components resultant from the separation with the water separator, and the "separated water" means water-side components resultant from the separation with the water separator, wherein the water separator is a water-separating means. In the solvent-side components, there are included other components, such as the dehydrating solvent as used if necessary, besides the gelation inhibitor solution. Examples of the water-side components include the water as a reaction product and the raw materials.

The above condenser and the above water separator are used in the following way in the process for producing the esterified product according to the present invention. That is to say, in the process for producing the esterified product according to the present invention, the water as a reaction product being formed during the esterification reaction needs to be distilled off from the reaction tank. However, since, as mentioned above, the components other than the water as a reaction product are also contained in the distillate, it is avoided to discharge the distillate directly into the air, from the viewpoint of problems of such as environmental pollution. Therefore, after such water as a reaction product has been distillated from the reaction tank, it is necessary to enable appropriate treatment or recycling of the resultant distillate. Thus, the condenser is used in order that the distillate from the reaction tank may be fed thereinto and then liquefied by condensation. Furthermore, the water separator is used in order that what has come out of an outlet of the condenser may be fed thereinto and then separated into two layers by utilizing differences between their properties, wherein: one of the two layers is the separated water including the water-side components, and the other is the condensed liquid residue including the solvent-side components.

In the implementation mode (B), the gelation inhibitor solution may further include, besides a portion of the condensed liquid as mentioned above, other components, specifically the below-explained gelation inhibitor (including the solution-form one; hereinafter the same), and further, other additives such as acid catalyst being appropriately added for the purpose of replenishment into the reaction tank.

As mentioned above, it is favorable that the gelation inhibitor is dissolved (or mixed, for example, including a case where, because of a supersaturated state, a portion of the gelation inhibitor is contained without being dissolved, and a case where, when at least two gelation inhibitors are used, a portion thereof are contained without being dissolved, and further a case where the gelation inhibitors are mixed together) in an appropriate solvent, favorably the same kind of solvent as the dehydrating solvent.

As to the gelation inhibitor usable in the implementation mode (B), there can be utilized those which are appropriately selected from among conventional already-known various gelation inhibitors without any especial limitation if they can suppress the polymerization reaction taking place in the step of condensing the low-boiling-point raw materials being distilled together with the water as a reaction product. Specific or favorable examples thereof are the same as are aforementioned.

In the implementation mode (B), the amount of the above gelation inhibitor as used is favorably such an amount as can constantly effectively inhibit the gel from forming from the low-boiling-point raw materials being distilled one by one from the distillation initiation of the distillate till the end of the esterification reaction (amount as integrated from the distillation initiation of the distillate till the end of the esterification reaction).

As to the implementation mode (B), in the case where the dehydrating solvent is used in the esterification reaction and distilled and refluxed, the gelation inhibitor is returned to the reaction tank in a state dissolved in the condensed liquid residue side resultant from the separation removal of the water as a reaction product after having achieved the purpose of inhibiting the polymerization of the distillate, therefore the gelation inhibitor gradually accumulates in the reaction tank. As a result, when various products such as cement dispersants are produced by the polymerization of the raw materials including the esterified product as obtained by the esterification reaction, the polymerization is difficult to carry out. Therefore, it is desirable that the amount of the gelation inhibitor as used should be suppressed as much as possible. From the above viewpoint, the amount of the gelation inhibitor as used is favorably in the range of 0.1 to 1,000 mass ppm, more favorably 1 to 500 mass ppm, relative to the total amount of the raw alkoxypolyalkylene glycol and the raw unsaturated monocarboxylic monomer (a) as used. In the case where the amount of the gelation inhibitor as used is smaller than 0.1 mass ppm relative to the total amount of the raw materials as used, such a small amount is an amount insufficient to cause the polymerization inhibitability to constantly effectively work on the low-boiling-point raw materials being distilled one by one from the distillation initiation of the distillate (containing such as water as a reaction product) till the end of the esterification reaction, therefore the gelled substances may form. On the other hand, in the case where the amount of the gelation inhibitor as used is larger than 1,000 mass ppm relative to the total amount of the raw materials as used, such a large amount is too sufficient an amount to cause the polymerization inhibitability to effectively work, and it cannot be expected that any further effect rewarding such an excessive addition is displayed, so this case is uneconomical, and further, when various products such as cement dispersants are produced by the polymerization of the raw materials including the resultant esterified product, the polymerization is difficult to carry out. Incidentally, in the case where the amount of the gelation inhibitor as used is added all at once, it is difficult to effectively inhibit the gelled substances from forming from the low-boiling-point raw materials being distilled one by one from the distillation initiation of the distillate (containing the water as a reaction product) till the end of the esterification reaction. Therefore, it is desirable to continuously add the gelation inhibitor in the above-defined range of the amount of the gelation inhibitor as used. Hereupon, it is more desirable to continuously add the gelation inhibitor while making adjustments for the concentration of the gelation inhibitor in the gelation inhibitor solution to constantly be in the below-defined range for the low-boiling-point raw materials being distilled one by one.

In the implementation mode (B), the solvent usable in the case of using the gelation inhibitor in the solution form is not especially limited, but examples thereof include benzene, toluene, xylene, cyclohexane, acetone, methyl ethyl ketone, n-hexane, and heptane. In addition, in the case where the dehydrating solvent is used in the esterification reaction and distilled and refluxed, the solvent component as used for the gelation inhibitor solution is also returned to the reaction tank in a state contained in the condensed liquid residue side, and is therefore desired to be able to effectively act as the dehydrating solvent in the esterification reaction tank. Particularly in the case where a solvent different from the dehydrating solvent as charged in the reaction tank is used, the point of the azeotropic distillation between the dehydrating solvent (including the above different solvent) and the water as a reaction product (and the distillation rate involved therein) varies with the passage of time due to the gradual increase of the amount (concentration) of the above different solvent in the reaction tank, therefore there become intricate or complicated the control and management of such as quantity of heat as applied into the reaction tank. Furthermore, facilities increases with the increase of the number of the raw materials, so that there become intricate or complicated such as management of the safety and quality and management of the stock. From the viewpoint of such, it is preferred to use the same kind of solvent as the dehydrating solvent as charged in the reaction tank.

Hereupon, the main purpose of the use of the solvent is to form the gelation inhibitor into a solution, and to thus facilitate the mixing with a portion of the condensed liquid so as not to need to furnish such as stirrer (e.g. stirring tank) for the mixing with a portion of the condensed liquid. In addition, in the case where the dehydrating solvent is used in the esterification reaction and distilled and refluxed, it is preferred, for as much as possible suppressing the increase in the amount of the condensed liquid residue as returned into the reaction tank, that the mixing ratio of a portion of the condensed liquid (favorably the condensed liquid residue) as used for the gelation inhibitor solution is high. Therefore, it is desirable that the amount of the solvent as used for the gelation inhibitor solution should be suppressed as much as possible. From such a viewpoint, the concentration of the gelation inhibitor in the above solution is favorably in the range of 10 mass ppm to the saturated concentration, more favorably 100 mass ppm to the saturated concentration, still more favorably 200 mass ppm to the saturated concentration, particularly favorably 200 mass ppm to a concentration corresponding to 95% of the saturated concentration, relative to the entirety of the above solution (wherein the saturated concentration varies with such as types of the gelation inhibitor and of the solvent, temperature, and pressure and therefore does not settle into a definite one, so its specific numerical value is not defined herein). The use of the saturated solution makes it possible that the amount of the solvent as used for the gelation inhibitor solution is lessened as much as possible. Furthermore, for making constant the concentration of the gelation inhibitor as caused to fall from the condenser, a little lower than the saturated concentration is preferable to the saturated concentration which varies with the temperature. Therefore, it is favorable to use the gelation inhibitor in not more than the concentration corresponding to 95% of the saturated concentration. In the case where the above concentration of the gelation inhibitor is less than 10 mass ppm relative to the entirety of the gelation inhibitor solution, the mixing ratio of a portion of the condensed liquid as used for the gelation inhibitor solution is so low that, when the dehydrating solvent is used in the esterification reaction and distilled and refluxed, the amount of the condensed liquid residue as returned into the reaction tank increases. Or there become needed such as: a large reservoir in which the gradually increasing condensed liquid residue can be reserved till the end of the esterification reaction; or an apparatus or means for discharging a portion of the condensed liquid residue out of the system with the passage of time. Furthermore, the amount of the solvent as used also increases to result in the rise of the costs.

As to the flow rates of the gelation inhibitor and a portion of the condensed liquid which are used for the gelation inhibitor solution, they are different according to such as: the concentration of the gelation inhibitor in the gelation inhibitor solution; the size of the reaction apparatus (e.g. reaction tank, piping, condenser); and the amount of the distillate; and therefore cannot definitely be specified. However, if the amount of the gelation inhibitor is reduced to instead use a sufficient amount of condensed liquid, a sufficient amount of gelation inhibitor solution can be caused to act on the distillate. Furthermore, in the case where the dehydrating solvent is used in the esterification reaction and distilled and refluxed, the above flow rates may be determined (specified) appropriately for the use mode in a manner for it to be possible to suppress the increase in the amount of the solvent in the reaction tank as much as possible.

The flow rate of the gelation inhibitor per 1 m in diameter (inner diameter) of the condenser per 1 minute is favorably in the range of 0.01 to 40 liters/minute·m, more favorably 0.1 to 15 liters/minute·m, still more favorably 0.1 to 5 liters/minute·m. In addition, the flow rate of a portion of the condensed liquid per 1 m in diameter (inner diameter) of the condenser per 1 minute is favorably in the range of 1 to 1,000 liters/minute·m, more favorably 5 to 500 liters/minute·m, still more favorably 10 to 200 liters/minute·m. In the case where the flow rate of the gelation inhibitor is less than 0.01 liters/minute·m, the concentration of the gelation inhibitor in the solution is so low that it is difficult to constantly work sufficient polymerization inhibitability. On the other hand, in the case where the flow rate of the gelation inhibitor is more than 40 liters/minute·m, the amount of the solvent as newly added increases, and it is therefore difficult to achieve the main concept of the present invention that the amount of the gelation inhibitor is reduced to instead use a sufficient amount of condensed liquid. In addition, in the case where the flow rate of a portion of the condensed liquid is less than 1 liters/minute·m, there are disadvantages in that it is impossible to constantly supply the condensed liquid to the distillate in an enough amount, so that the generation of the gelled substances may be brought about. On the other hand, the case where the flow rate of a portion of the condensed liquid is more than 1,000 liters/minute·m is uneconomical in that: there is obtained no further effect rewarding the supply at such a high flow rate as exceeds the above value, and it is therefore necessary to furnish an apparatus for supplying such a large amount of condensed liquid at a high flow rate (e.g. a large-sized pump, a piping having a great opening diameter or the pressure resistance).

All combinations of the above flow rates are permissible if they are within the above-specified ranges of the flow rates as a result of having determined (specified) the flow rate of the gelation inhibitor and that of a portion of the condensed liquid (favorably a portion of the condensed liquid residue) appropriately for the use mode in the above way. However, favorably for sufficiently displaying the main concept of the present invention, the mixing ratio between the gelation inhibitor solution and a portion of the condensed liquid, which are used for the gelation inhibitor, is the following combination.

A portion of the condensed liquid is mixed favorably in the range of 0.5 to 10,000 mass parts, more favorably 1 to 1,000 mass parts, still more favorably 10 to 1,000 mass parts, particularly favorably 10 to 100 mass parts, per 1 mass part of the gelation inhibitor, because, in the case where a portion of the condensed liquid is less than 0.5 mass parts per 1 mass part of the gelation inhibitor, there are disadvantages in that it is impossible to sufficiently satisfy the above main concept of the present invention, and because, on the other hand, in the case where a portion of the condensed liquid is more than 10,000 mass parts per 1 mass part of the gelation inhibitor, it is difficult to stably mix both. Incidentally, their mixing ratio may be either constant or variable, and it is enough to determine the mixing ratio appropriately so as to satisfy the above main concept of the present invention.

Figure 2:
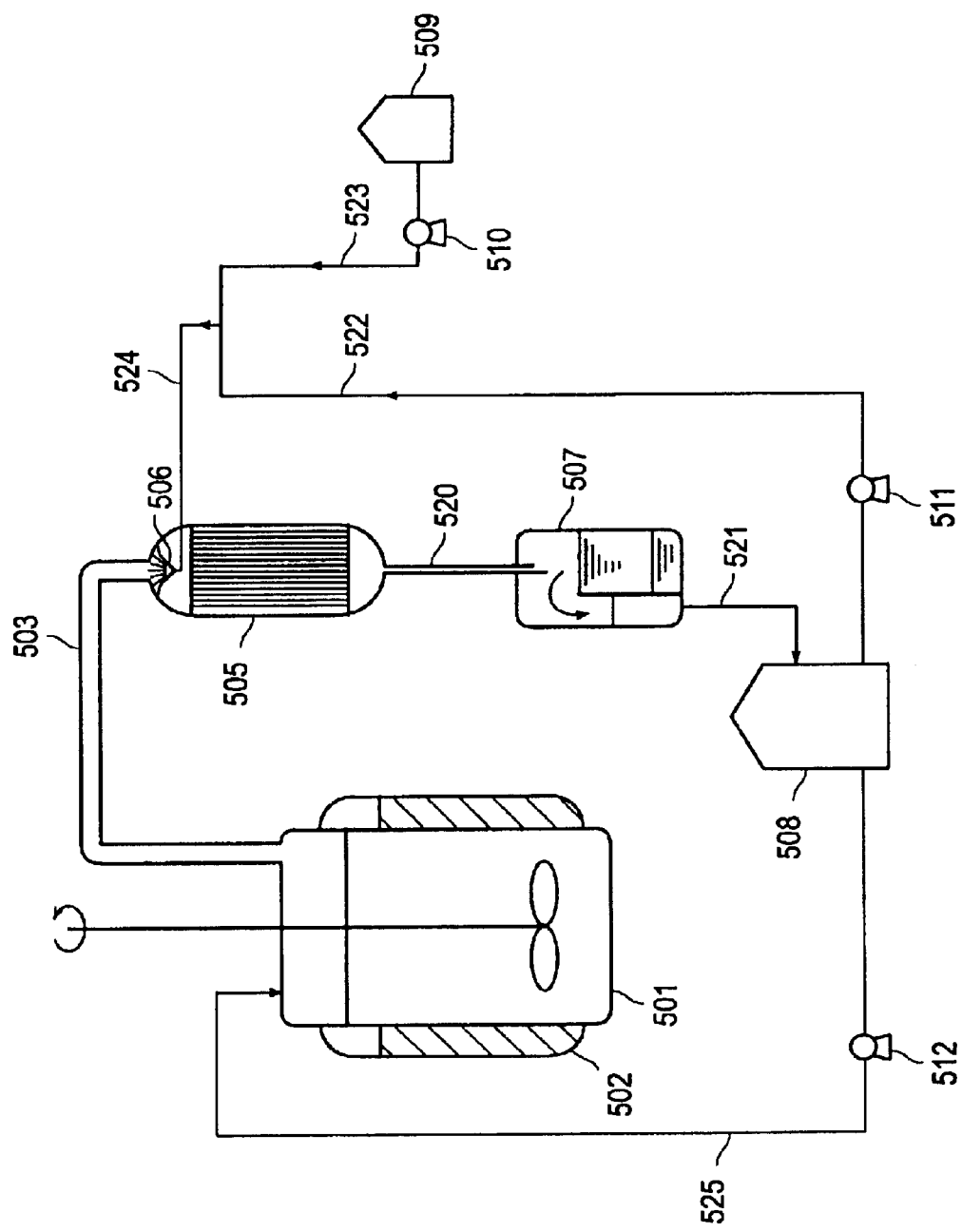
FIG. 2 is a schematic explanatory view showing a mode for carrying out a production apparatus in the present invention, including an apparatus constitution of a representative gelation-inhibitor-supplying mechanism according to the second mode for carrying out the production of an esterified product as used in the present invention.
Figure 3:
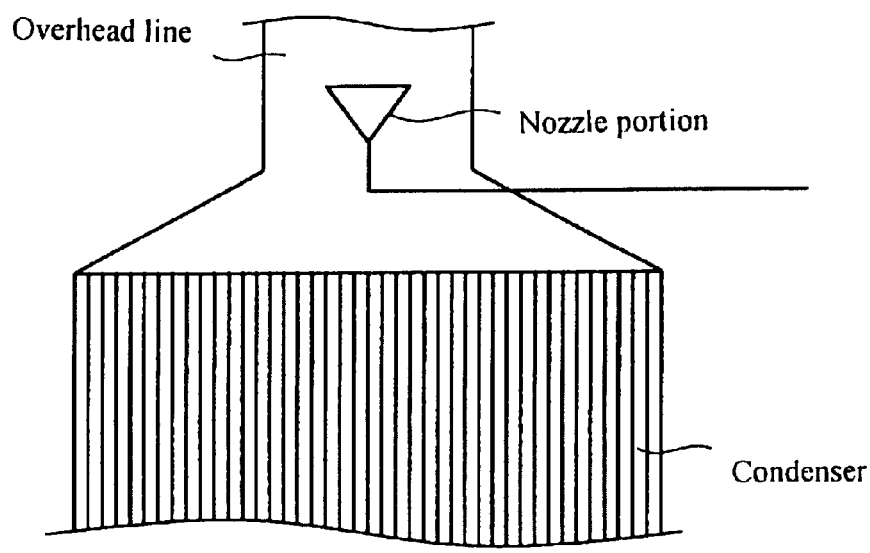
FIG. 3 is a schematic explanatory view showing a state where a nozzle is set in an overhead line just upstream of a condenser.

As to the method for causing the gelation inhibitor solution to act, it can be carried out by appropriately using conventional already-known methods (means) without any especial limitation if they can cause the gelation inhibitor solution to effectively act on the distillate, particularly the distilled low-boiling-point raw materials. It is desirable to enable the gelation inhibitor solution to effectively act, favorably in a region where the gaseous distillate is liquefied by condensation, specifically in such as a heat exchanger, a cooler, or a condenser (herein these may generically be referred to simply as condenser) which is the region where the gaseous distillate is liquefied by condensation, particularly at a gas inlet portion of a column top portion of the condenser where the gaseous distillate starts to liquefy by condensation. For the purpose of realizing it, the region where the gelation inhibitor solution is present is not limited to inside the condenser, but it is enough to cause the gelation inhibitor solution to act in the neighborhood of the column top of the condenser, specifically for example, on the column top of the condenser or in a distillation route just upstream of the condenser. It can be said to be desirable that the inner surface of the condenser can thereby be kept constantly wet. Specific examples thereof include: (1) a method in which the inner surface of the condenser is kept constantly wet by atomizing, jetting, spraying, spouting out, throwing up, or letting fall the gelation inhibitor solution onto the inner surface of the gas inlet portion of the column top portion of the condenser (because on this inner surface there occurs the first-time condensation liquefaction and at the same time there also occurs the gelation of the low-boiling-point raw materials) from a nozzle portion as upward set in the central portion of the column top portion of the condenser; and (2) a method in which the inner surface of the condenser is kept constantly wet by setting a nozzle portion in the distillation route just upstream of the condenser (route as formed by the below-mentioned piping 503 of FIG. 2: overhead line) (see FIG. 3), and atomizing (or jetting) therefrom the gelation inhibitor solution to make it move on the inner surface of the overhead line and then reach the inside of the condenser. However, there is no limitation thereto. Furthermore, in the case where the dehydrating solvent is used in the esterification reaction and distillated and refluxed, the gelation inhibitor is desired to be used in the form dissolved in the same kind of solvent as the dehydrating solvent so that, when the distillate liquefies by condensation, the gelation inhibitor can rapidly contact with the liquefied distillate to phase-dissolve or disperse into the dehydrating solvent containing the gelling low-boiling-point raw materials.

In addition, the method for refluxing a portion of the condensed liquid in order to use it for the gelation inhibitor solution is not especially limited, either, but can be carried out by appropriately using conventional already-known methods (means). Specific examples thereof are as follows.

Figure 4:
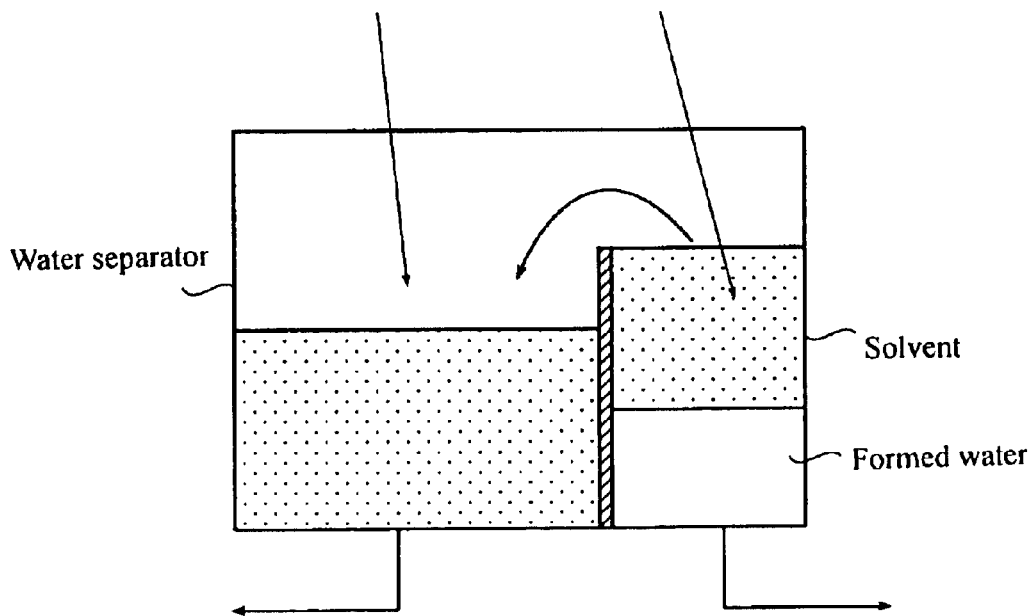
FIG. 4 is a schematic explanatory view of a water separator additionally playing the role of a reservoir.

(1) In the case where the dehydrating solvent is used in the esterification reaction and distillated and refluxed, it is possible, for example, that: when the condensed liquid residue is returned to the reaction tank, a portion of the condensed liquid residue is extracted, and then either supplied directly to the above nozzle portion to therein be formed into the gelation inhibitor solution, or mixed with the gelation inhibitor along the way of the supply to the above nozzle portion to thus be formed into the gelation inhibitor solution. For specific example, as shown in the below-mentioned FIG. 2, a reservoir (e.g. tank) in which the condensed liquid residue is temporarily reserved if necessary is set on a route through which the condensed liquid residue is returned to the reaction tank (favorably the flange portion between the reaction tank and the vapor-rising line), and a portion of the condensed liquid residue is extracted from this reservoir and then caused to flow into a route for the supply of the gelation inhibitor, merely whereby the mixed gelation inhibitor solution can easily be formed. Therefore there is not needed any apparatus for bothering to stir-mix both. Hereupon the merit by setting the reservoir is that: also when the amount of the condensed liquid residue as extracted for the gelation inhibitor solution is increased by a definite amount or by degrees, convenient for its adjustment is the reservoir, and further it is possible to easily adjust the reflux while the amount of the condensed liquid residue being returned to the reaction tank is kept constant or prevented as much as possible from increasing over a period of from the beginning till end of the reaction. Incidentally, even if the reservoir such as reservoir tank is not newly set, for example, the water separator functions in a way such that: the condensed liquid having been liquefied by condensation in the condenser is reserved in one of rooms to be separated into two layers, namely a water phase and a solvent phase, wherein the water phase which is the lower layer portion is gradually extracted from a lower portion of this room through a piping, and wherein the solvent phase which is the upper layer portion overflows a partition to be reserved in the neighbor other room. If this room in which only the solvent phase is reserved is enlarged, it is also possible for the water separator itself to serve as the reservoir, too (see FIG. 4).

The reservoir is not necessarily needed. The reasons therefor are as follows. When compared with the conventional use of the gelation inhibitor alone, for example, because the gelation inhibitor solution containing the condensed liquid residue is used, it has become possible that a great gelation inhibition effect is displayed by the gelation inhibitor as used in an amount almost as large as conventional or smaller. Therefore, the increase of the amount of the solvent in the reaction tank is suppressed to an amount almost as large as conventional or smaller. Particularly in the case where the esterification time is short, there are merits in that the lowering of the reaction temperature is little and in that the influence on the reaction-ending time is also little, therefore it is also economically more advantageous not to set the reservoir. In addition, in the case where the amount of the solvent being returned into the reaction tank has increased to become large, a portion of the solvent may be extracted out of the system without being returned. Also in this case, the amount of the solvent being extracted out of the system is not large, and the cost for its treatment is also low, therefore this case is economically more advantageous than bothering to set the reservoir and does not give any influence on the product performance, either. Thus, it can be said to be important to appropriately judge whether to set the reservoir in consideration of the influence on the performance and further the effect to the cost.

(2) In the case where the esterification reaction is carried out without any dehydrating solvent, the distillate is intrinsically only the water as a reaction product (containing the low-boiling-point raw materials in a slight amount), therefore a portion of the distillate is not refluxed to the reaction tank. Accordingly, it is possible, for example, that: there is extracted the entirety or a portion of the condensed liquid residue left as a result of the removal by separation of the water as a reaction product (containing the low-boiling-point raw materials) from the condensed liquid after the gelation inhibitor solution has been caused to act on the distillate, and then the extracted condensed liquid residue is either supplied directly to the above nozzle portion to therein be formed into the gelation inhibitor solution, or mixed with the gelation inhibitor along the way of the supply to the above nozzle portion to thus be formed into the gelation inhibitor solution. Incidentally, in the case where a portion of the condensed liquid residue is utilized, the rest of the condensed liquid residue may, for example, be extracted out of the system.

Incidentally, the above-explained methods for causing the action and for causing the reflux are, merely, representative examples, and the present invention is not limited thereto.

In the present invention, it is favorable to carry out the gelation inhibition in the above way, but further as to the step of distilling off the solvent, it is favorably carried out in the following mode.

In the step of distilling off the solvent, as to the apparatus mechanism in the course of from the distillation of the dehydrating solvent off the solution containing the esterified product and the dehydrating solvent in the system till the removal of the dehydrating solvent out of the system by the condensation liquefaction, conventional already-known apparatus mechanisms can be used in appropriate combinations with each other without any limitation if a means (apparatus mechanism) for causing the gelation inhibitor to act is set in the above course. For example, in the above esterification step, there may be utilized a portion of the apparatus mechanism as used for circulating the dehydrating solvent (as contained in the reaction system) during the esterification reaction in a manner such that the dehydrating solvent is distillated from the reaction system and then liquefied by condensation and then returned to the reaction system (such an apparatus mechanism is herein referred to simply as solvent-circulating apparatus). This example can also achieve the simplification and miniaturization of the apparatus facilities, and therefore can be said to be one of desirable implementation modes. Specifically, for such as the condenser which is an apparatus for liquefying the gaseous distillate by condensation, there can be utilized the above solvent-circulating apparatus as it is. For such as the water separator which is a liquid-liquid separation apparatus as an apparatus for the separation removal of the distillate liquefied by condensation, there can be utilized the above solvent-circulating apparatus by appropriately modifying its use mode. That is to say, depending on the composition of the distillate components, a water phase portion or the entirety of the liquid distillate being transported to the above water separator can be removed out of the system by utilizing such as a transportation route for removal of water out of the system and a pump as a transportation apparatus for the above removal, and besides, such as components having relatively high volatility may selectively be removed out of the system, or the entirety of the liquid distillate may be removed out of the system, by suction with a vacuum pump (ejector) as newly equipped to such as the above water separator. Or it is also possible that: the distillate liquefied by condensation is, as it is, taken from such as the condenser via a separately laid transportation route out of the system (to such as a disposer for wastes or a recycling treatment apparatus) and then appropriately treated (e.g. disposed of or recycled). In addition, these apparatuses are desired to also appropriately be provided with appropriate control mechanisms. Incidentally, it is also a matter of course that, in place of the above-exemplified apparatus mechanism, there can appropriately be adopted a method involving such as combination or replacement with conventional already-known other means and apparatuses therefor, unless deviating from the intrinsic object to distillate the dehydrating solvent from the system and then remove it out of the system by condensation liquefaction.

In the step of distilling off the solvent, there is no especial limitation on the method for distilling off the dehydrating solvent from the solution containing the esterified product and the dehydrating solvent in the system after (the above partial neutralization step as carried out, if necessary, after) the end of the esterification reaction. As mentioned above, water may be used to distillate the dehydrating solvent by its azeotropic distillation with the water to thus remove the dehydrating solvent, or another appropriate additive may be added to effectively remove the dehydrating solvent, and besides, it is also possible to remove the dehydrating solvent by distillating it without any additives (nor water). However, since the utilization of the acid catalyst is extremely useful for the esterification reaction (namely, this usefulness can be said to be extremely high also considering that the partial neutralization must thereafter be carried out), the method in which water is used to distillate the dehydrating solvent by its azeotropic distillation with the water to thus remove the dehydrating solvent can be said to be one of favorable implementation modes. Incidentally, in the case where the partial neutralization treatment of the acid catalyst has been carried out before the above step of distilling off the solvent, neither active acid catalyst nor alkali is present (these are in the form of salts as a result of the neutralization) in the solution containing the esterified product and the dehydrating solvent in the system, therefore no hydrolysis reaction takes place even if water is added and the temperature is raised. Thus, in order to distilling off the dehydrating solvent, its azeotropic distillation with water can be carried out. Incidentally, this azeotropic distillation with water enables the removal of the dehydrating solvent with good efficiency at a still lower temperature.

In the step of distilling off the solvent, as to conditions for distillating the dehydrating solvent from the solution in the system, there is no especial limitation if under them the dehydrating solvent in the system can favorably be distillated (vaporized). The temperature in the system (liquid temperature in the system (under ordinary pressure)) during the distillation of the solvent is, for example, (1) in the case of using water, usually in the range of 80 to 120° C., favorably 90 to 110° C., and (2) in the case of not using water, usually in the range of 80 to 160° C., favorably 90 to 150° C. In both cases (1) and (2) above, when the temperature is lower than the above-defined temperature, there are disadvantages, for example, in that the temperature is not a sufficient temperature (quantity of heat) to vaporize the dehydrating solvent, therefore a long time is needed for distilling off the dehydrating solvent. On the other hand, when the temperature is higher than the above-defined temperature, there are disadvantages in that: there is danger of the polymerization, and besides, a large quantity of heat is consumed by the vaporization of a large quantity of the low-boiling-point raw materials. In addition, as to the pressure in the system (apparatus), the distillation may be carried out either under ordinary pressure or under reduced pressure, but under ordinary pressure desirably from the viewpoint of facilities. In addition, as to the apparatus system for carrying out the distillation of the solvent from the solution containing the dehydrating solvent, the apparatus system (reaction tank) as used for the esterification reaction is favorably used as it is. In other words, in the case where the contents are separately transferred into another apparatus after the esterification reaction, there are disadvantages in that: the facilities and the management costs increase, and besides, it is necessary to prevent such as the esterified product from being deteriorated by such as external factors (e.g. heat, light, transportation temperature, transportation pressure, the presence of active atmospheric gas) or from fixing into the transportation route during the transportation, or otherwise, impurities from eluting or mingling from such as the apparatus during the transportation, therefore excessive costs occur.

Incidentally, in the case where the esterification reaction is carried out in the presence of the polymerization inhibitor for inhibiting the polymerization of the unsaturated monocarboxylic monomer (a) in the esterification step, this polymerization inhibitor effectively functions still after the esterification reaction (and further after the partial neutralization treatment), therefore it is unnecessary to newly replenish the polymerization inhibitor into the solution in the system in the present step of distilling off the solvent. However, in the case where the partial neutralization treatment is carried out with an aqueous alkali solution having a thin concentration, a comparatively large amount of water is present in the solution in the system. Therefore, for example, only in the case where the polymerization inhibitor as used in the step of carrying out the esterification reaction is either difficult to dissolve into water or insoluble in water, there is a possibility that the unsaturated monocarboxylic monomer (a) may dissolve into water to polymerize in the solution in the system. Thus, from the viewpoint of preventing this, it is desirable to: add a water-soluble polymerization inhibitor to the solution in the system and then raise the temperature to the above-defined temperature.

In addition, the above water-soluble polymerization inhibitor is not especially limited, but examples thereof include: hydroquinone, methoquinone, catechol, and their derivatives (e.g. p-t-butylcatechol); and hydroquinone monomethyl ether. Of these, hydroquinone and methoquinone are favorable. In addition, these water-soluble polymerization inhibitors may be used either alone respectively or in combinations with each other.

The amount of the above water-soluble polymerization inhibitor as added is in the range of 0.001 to 1 mass %, favorably 0.001 to 0.1 mass %, relative to the total amount of the raw alkoxypolyalkylene glycol and the raw unsaturated monocarboxylic monomer (a) as used. In the case where the amount of the water-soluble polymerization inhibitor as added is smaller than 0.001 mass %, there are disadvantages in that the polymerization inhibitability may insufficiently be displayed. In the case where the amount of the water-soluble polymerization inhibitor as added is larger than 1 mass %, there are uneconomical disadvantages in that there is not obtained any polymerization inhibitability rewarding the excessive addition.

(Specific Modes of Process for Producing Esterified Product)

The process, applicable to the present invention, for producing the esterified product is explained with reference to FIG. 1.

FIG. 1 is a schematic view of a representative apparatus constitution used for the process, applicable to the present invention, for producing the esterified product.

Incidentally, hereinafter, the raw alkoxypolyalkylene glycol may be referred to simply as alcohol, and the raw unsaturated monocarboxylic monomer may be referred to simply as (meth)acrylic acid.

As is shown in FIG. 1, the apparatus constitution according to the present implementation mode is, first of all, provided with a reaction tank 101 having an external jacket 102 for which a heat medium such as pressurized steam is usable as a heat-exchange means for raising the temperature to a predetermined one to carry out the esterification reaction and thereafter dropping the temperature to a predetermined one to carry out the neutralization and thereafter raising the temperature to a predetermined one to distill off the dehydrating solvent (e.g. direct heating types such as internal heaters, indirect heat-exchanging types such as external jackets). Hereupon, the inner material of the reaction tank is not especially limited, but publicly known materials are usable. However, examples thereof include SUS-made ones and, favorably for the corrosion resistance, SUS 304, SUS 316 and SUS 316L, more favorably SUS 316 and SUS 316L. Or the inside of the reaction tank may, for example, be processed by glass-lining to make it inactivate upon the raw materials and the resulting products. To the reaction tank 101, there are connected the following: a stainless steel (e.g. SUS 316)-made raw-material-storing tank 103 for the raw alcohol; a raw-material-storing tank 105 for the raw (meth) acrylic acid; a catalyst-storing tank 107 for the acid catalyst; a polymerization-inhibitor-storing tank 109 in which there is stored the polymerization inhibitor for inhibiting the polymerization inside the reaction system (reaction tank 101) during the esterification reaction; a water-soluble-polymerization-inhibitor-storing tank 110 in which there is stored the water-soluble polymerization inhibitor for inhibiting the polymerization in the solution inside the system (reaction tank 101) in the step of distilling off the dehydrating solvent after the end of the esterification reaction; and a carbon steel (e.g. high carbon steel)-made neutralizing-agent-storing tank 111 in which there is stored the neutralizing agent (aqueous neutralizing agent solution) for treating the aforementioned catalyst by neutralization after the esterification reaction; via pipings 113, 115, 117, 119, 120 and 121 respectively. In addition, the (meth)acrylic acid easily polymerize, for example, methacrylic acid polymerizes even due to such as long-term preservation or heat, therefore a very small amount of polymerization inhibitor (e.g. 0.1% hydroquinone) is added thereto, and besides, methacrylic acid comes to easily polymerize also due to crystallization. Therefore, in the case of preservation in the raw-material-storing tank 105, benzene may be added to inhibit the crystallization, and besides, as shown in FIG. 1, in order to heat-retain the raw (meth)acrylic acid constantly in the range of 30 to 40° C., a circulation route 151 having an external jacket 150 (heat-retaining means) using a pump 116 is formed, whereby the raw (meth)acrylic acid is circulated to heat-retain it constantly in the range of 30 to 40° C. so as not to polymerize. As to the raw-material-storing tank 105 for the (meth)acrylic acid, the piping 115, the pump 116, and the circulation route 151, there are used those of which the inside is processed by lining with corrosion-resistant materials such as synthetic resins for the purpose of inhibiting the corrosion from being caused by the (meth)acrylic acid having the corrosiveness. Similarly, also as to the catalyst-storing tank 107 and its piping 107, there are used those of which the inside is processed by lining with acid-resistant materials such as synthetic resins for the purpose of inhibiting the corrosion from being caused by the acid catalyst. In addition, to a lower portion of the above reaction tank 101, there is connected a piping 153 for recovering the esterified product as synthesized in the reaction tank 101 by the esterification reaction (or, for such as cement dispersants, a polymer as obtained by further polymerizing the esterified product as a monomer component in the reaction tank 101). Furthermore, in the above reaction tank 101, a temperature sensor (not drawn) for measuring the reaction temperature is equipped to appropriate portions (several places). This temperature sensor is electrically connected to a main body of a control portion (not drawn) for controlling such as apparatus mechanism (e.g. temperature of the jacket 102 as equipped to the reaction tank 101) necessary for keeping the reaction temperature at a defined one.

Furthermore, in the apparatus constitution according to the present implementation mode, a circulation system for liquefying the distillate by condensation while causing the gelation inhibitor to act on the distillate (wherein the distillate is resultant from the azeotropic distillation of water as a reaction product (being formed in the reaction system (reaction tank 101) during the esterification reaction) with the dehydrating solvent), and then separating and removing the water as a reaction product (water phase) from the condense-liquefied distillate, and then refluxing the residual condensate (solvent phase mainly including the dehydrating solvent) at a predetermined solvent-circulating rate to return it to the reaction tank 101 is formed as (an apparatus constitution of) a mechanism for making the distillate containing the above water as a reaction product, and then liquefying the distillate by condensation while inhibiting the generation of the gelled substances, and then separating and removing the water as a reaction product, and then returning the residual distillate at the above solvent-circulating rate. In detail, an upper portion of the reaction tank 101 and a head top portion of a tower shell-and-tube circular-tube-shaped condenser 125 of a counter-flow (or parallel-flow) contact type are connected together through a piping 123. In addition, a lower bottom portion of the condenser 125 and an upper portion of an SUS-made water separator 127 are connected together through a piping 129. The inside of the water separator 127 is equipped with a partition 131 to form two rooms 133 and 134 as partitioned off by the partition 131. Of them, a lower portion of the room 133 on the side where the distillate as liquefied by condensation with the condenser 125 is reserved is connected through a piping 137 to a tank 135 for treating the water as a reaction product. In addition, to this treating tank 135, there is connected a piping 139 for wastewater. In addition, a lower portion of the other room 134 of the water separator 127 and the reaction tank 101 are connected together through a piping 141. In addition, to this piping 141, there is joined (connected) a piping 145 which is connected to a dehydrating-solventstoring tank 143 for storing the dehydrating solvent which does the azeotropic distillation with the water as a reaction product in the reaction tank 101. On the forward side of such a junction (on the water separator 127 side of it), there is set a circulation pump 142 on the route of the piping 141. In addition, on the backward side of the above junction (on the reaction tank 101 side of it), there is set a flow meter 144 on the route of the piping 141. And this flow meter 144 is electrically connected to a main body of a flow-rate-measuring system (not drawn) for integrating the measured flow rate to calculate the solvent-circulating rate. Furthermore, the head top portion of the condenser 125 is equipped with an atomizing nozzle 126, and this atomizing nozzle 126 is connected through a piping 149 to a gelation-inhibitor-storing tank 147 for storing the gelation inhibitor for inhibiting the gelation of the distillate.

Usable as the condenser in the present invention are publicly known ones, for example, those which are made of: SUS such as SUS 304, SUS 316 and SUS 316L; and carbon steel (CS). However, usable favorably for more reducing the generation of the gel are condensers of which the inner surfaces are mirror-finished or processed by glass-lining. However, usable favorably in consideration of costs needed for the processing and maintenance are condensers made of SUS such as SUS 304, SUS 316 and SUS 316L, more favorably SUS 316 and SUS 316L. Even if such condensers are used, the formation of the gel can effectively be inhibited. In addition, though depending on such as volume of the reaction tank, yet the heat transfer surface area of the condenser as favorably used in the present invention is, for example, in the range of 50 to 500 m$^2$, favorably 100 to 200 m$^2$, for the reaction tank of 30 m$^3$. Examples of the cooling medium as used for the condenser in the present invention include water and oils.

In addition, a portion of these (apparatus constitutions of) circulation mechanisms as mentioned above, namely, (apparatus constitutions of) mechanisms for making the distillate containing the water as a reaction product (being formed in the reaction system (reaction tank 101) during the esterification reaction), and then liquefying the distillate by condensation while inhibiting the generation of the gelled substances, and then separating and removing the water as a reaction product, and then refluxing the residual distillate, may be utilized also as (apparatus constitutions of) mechanisms for making the distillate containing the dehydrating solvent from the solution containing the esterified product (which is a product formed in the system (reaction tank 101)) after the esterification reaction, and then liquefying the distillate by condensation while inhibiting the generation of the gelled substances, and then removing the distillate containing the dehydrating solvent out of the system, and there is formed a route (getting-out route) for liquefying the distillate by condensation while causing the water-soluble polymerization inhibitor to act on the distillate (wherein the distillate is resultant from the azeotropic distillation of the dehydrating solvent with water), and then separating the condense-liquefied distillate into a water phase and a solvent phase, and then removing them individually by their respective appropriate methods. Specifically, in the (apparatus constitutions of the) circulation mechanisms as mentioned above, to the atomizing nozzle 126 as equipped to the head top portion of the condenser 125, there is newly connected through a piping 161 a water-soluble-gelation-inhibitor-storing tank 159 for storing an aqueous solution in which there is dissolved the water-soluble polymerization inhibitor as utilized for inhibiting the gelation of the distillate containing the dehydrating solvent (hereinafter this aqueous solution may be referred to simply as water-soluble gelation inhibitor). Furthermore, to the water separator 127, there is equipped through a piping 157 a vacuum pump (ejector) 155 for removing the dehydrating solvent by vacuum suction.

The process, favorably applicable to the present invention, for producing the esterified product is carried out with an apparatus for producing the esterified product having the above apparatus constitution in the following way.

To begin with, into the reaction tank 101, there are fed (charged) the raw alcohol, the raw (meth)acrylic acid, the acid catalyst, the polymerization inhibitor, and the dehydrating solvent in their respective predetermined amounts, as defined above, from the raw-material-storing tanks 103 and 105, the catalyst-storing tank 107, the polymerization-inhibitor-storing tank 109, and the dehydrating-solvent-storing tank 143 through the pipings 113, 115, 117, 119 and the piping 141 with its intermediary piping 145 to carry out the esterification reaction under the above-defined esterification conditions (reaction temperature, jacket temperature, pressure). The water as a reaction product, being formed one by one by the esterification reaction, is azeotropically distilled with the dehydrating solvent (as charged into the reaction tank 101) to be distillated through the piping 123. The solvent-water azeotrope which is a distillated gas fluid is passed through the condenser 125 to be liquefied by condensation. For the purpose of inhibiting the gelation of the low-boiling-point raw materials as contained in the azeotrope during this condensation liquefaction, the gelation inhibitor is fed from the gelation-inhibitor-storing tank 147 through the piping 149 to the atomizing nozzle 126 (as equipped to the head top portion of the condenser 125) and then continuously dropwise added therefrom in the above-defined amount and thus brought into contact with the azeotrope (which means both the gas fluid and the condense-liquefied material) in a parallel flow. The condense-liquefied azeotrope (containing the dropwise added gelation inhibitor) is reserved from a lower portion of the condenser 125 through the piping 129 into the room 133 of the water separator 127 to be separated into two layers, namely a water phase and a solvent phase. Of them, the water as a reaction product, which is the lower layer portion, is gradually extracted from a lower portion of the room 133 through the piping 137 and then reserved in the tank 135 for treating the water as a reaction product. Then, the reserved water as a reaction product is, if necessary, chemically or biologically treated in the treating tank 135 so as to satisfy the environmental regulation (wastewater regulation) values, and then discharged as wastewater out of the present apparatus system through the piping 139. On the other hand, the solvent phase (containing the dropwise added gelation inhibitor and the low-boiling-point raw materials), which is the upper layer portion, overflows the partition 131 to be reserved in the neighbor room 134. Then, the solvent phase is refluxed at the above-defined solvent-circulating rate from a lower portion of the room 134 through the piping 141 with the pump 142 and thus returned to the reaction tank 101.

Incidentally, in the present invention, the portion where the gelation-inhibitor-storing tank for supplying the gelation inhibitor is set is favorably a portion where the gel is easily formed, but is not especially limited. Examples thereof include, besides the mode as shown in FIG. 1, namely the mode in which the atomizing nozzle 126 for atomizing the gelation inhibitor is equipped to the head top portion of the condenser 125, another mode in which an atomizing nozzle for atomizing the gelation inhibitor is set in at least one place on the piping 123 between the reaction tank 101 and the condenser 125. In the latter mode, examples of the place, where the atomizing nozzle for atomizing the gelation inhibitor is set on the piping 123, include: portions where a gel tends to be formed, such as: a condensation portion (above all, the neighborhood of the column top portion) inside the condenser; a joint portion (flange portion) between the reaction tank and a vapor-rising line; a flange portion (e.g. a flange portion between the vapor line and the column top portion of the condenser); a thermometer as set in such as the reaction tank; and a projecting portion as provided to an observation hatch. Favorable of these are: the condensation portion (above all, the neighborhood of the column top portion) inside the condenser; the flange portion between the reaction tank and the vapor-rising line; and the flange portion between the vapor line and the column top portion of the condenser.

After the end of the esterification reaction (when the esterification conversion has reached not less than the defined value is regarded as the end), the temperature is dropped, specifically, the temperature is dropped by passing a cooling medium through the external jacket 102 of the reaction tank 101 until the internal temperature (liquid temperature) of the reaction tank 101 falls to not higher than the above-defined temperature (90° C.). Thereafter, while the temperature is appropriately adjusted so as to be kept at not higher than the predetermined temperature, an aqueous alkali solution (neutralizing agent) having been diluted to the above-defined concentration with a large amount of water is added from the neutralizing-agent-storing tank 111 through the piping 121 into the reaction tank 101 to partially neutralize the acid catalyst (and a portion of the (meth) acrylic acid).

After the partial neutralization, the water-soluble polymerization inhibitor is added and mixed from the water-soluble polymerization inhibitor tank 110 through the piping 120 into the solution in the reaction tank 101. Under ordinary pressure, the temperature is raised to the above-defined temperature by passing a heat medium (pressurized steam) through the external jacket 102 of the reaction tank 101, so that there are distillated, by azeotropic distillation; the dehydrating solvent and the large amount of water (having been added in the partial neutralization treatment step), and besides, the unreacted low-boiling-point raw materials (e.g. (meth)acrylic acid), out of the reaction tank 101 through the piping 123. The solvent-water azeotrope which is a distillated gas fluid is passed through the condenser 125 to be liquefied by condensation. Also in this case, the gelled substances are generated from the unreacted low-boiling-point raw materials (e.g. (meth)acrylic acid). Hereupon, the dehydrating solvent is gradually removed, therefore what are vaporized grow limited to nothing but the water and the low-boiling-point raw materials. Thus, it is desirable to cause the water-soluble polymerization inhibitor to act. For the purpose of inhibiting the gelation of the unreacted low-boiling-point raw materials as contained in the distillate during the above condensation liquefaction, the water-soluble gelation inhibitor is fed from the water-soluble-gelation-inhibitor-storing tank 159 through the piping 151 to the atomizing nozzle 126 (as equipped to the head top portion of the condenser 125) and then continuously dropwise added therefrom in the above-defined amount and thus brought into contact with the distillate (which means both the gas fluid and the condense-liquefied material) in a parallel flow. The condense-liquefied distillate (containing the dropwise added water-soluble polymerization inhibitor) is reserved from a lower portion of the condenser 125 through the piping 129 into the room 133 of the water separator 127 to be separated into two layers, namely a water phase (containing the dropwise added water-soluble polymerization inhibitor and the low-boiling-point raw materials) and a solvent phase. Of them, the water, which is the lower layer portion, is (in the case where removed without being circulated) gradually extracted from a lower portion of the room 133 through the piping 137 and then reserved in the tank 135 for treating the water. Then, the reserved water as a reaction product is, if necessary, chemically or biologically treated in the treating tank 135 so as to satisfy the environmental regulation (wastewater regulation) values, and then discharged as wastewater out of the present apparatus system through the piping 139 (in addition, in the case where the water, which is the lower layer portion, is circulated, a piping (not drawn) as connected from a lower portion of the room 133 to the reaction tank 101 may be set to reflux the water through this piping). On the other hand, because of the necessity of being removed out of the apparatus system without being refluxed, the solvent phase which is the upper layer portion is discharged out of the apparatus system with the vacuum pump (ejector) 155 as equipped to the above water separator 127. Incidentally, these may be either disposed of as wastes, or chemically treated with an apparatus outside the system and then recycled.

Finally, after the dehydrating solvent has been distilled off from the solution in the system, adjustment water is added into the reaction tank 101 from a water-storing tank (not drawn) (which is connected thereto through a piping (not drawn)) or from a service water pipe (not drawn), thus obtaining an aqueous solution of the desired esterified product. The resultant aqueous solution of the esterified product is recovered (stored) through the piping 153. Incidentally, in the case where the resultant esterified product is used for synthesizing such as cement dispersants, this esterified product may be used as one of monomer components to further polymerize them in the reaction tank 101, thus synthesizing a polymer which can be a main compositional component of the cement dispersants. In this case, it is favorable that (meth)acrylic acid remaining unreacted due to excessive addition is used as the other monomer component as it is without being separated or removed.

The above is an explanation of one mode for carrying out the process, favorably applicable to the present invention, for producing the esterified product with reference to FIG. 1. However, the process, favorably applicable to the present invention, for producing the esterified product is not limited to the above implementation mode, and there is no limitation on such as its production method (means) and apparatus constitution if they can cause the polymerization inhibitor act on the distillate containing the dehydrating solvent in the step of distilling of the dehydrating solvent after the end of the esterification reaction. Thus, such as conventional already-known production methods and apparatus constitutions can be utilized in appropriate combinations with each other.

(Polymer and Uses)

The polymer, as obtained by the production process according to the present invention, can, even as it is, be used as a main component of various uses such as cement dispersants and pigment dispersants, but, if necessary, a polymer salt as obtained by further neutralizing this polymer with an alkaline substance may be used as a main component of various uses such as cement dispersants. Favorable examples of such an alkaline substance include: inorganic substances such as hydroxides, chlorides, and carbonates of monovalent metals and divalent metals; ammonia; and organic amines.

In the present invention, after the neutralization, the pH of the aqueous (meth)acrylic acid (salt) polymer solution is favorably in the range of 3 to 12, although not especially limited. In the case where the pH is more than 12, the solution is strong alkaline. On the other hand, in the case where the pH is less than 3, the solution is in so strong-acidic corrosive condition that, at high temperature, production facilities and storage facilities may be corroded. The above pH is more favorably in the range of 5 to 10, most favorably in the range of 6 to 8.

Examples of the neutralizing agent for the monomers or (meth)acrylic acid (salt) polymer include: alkaline metal hydroxides such as sodium hydroxide and potassium hydroxide; alkaline earth hydroxides such as calcium hydroxide and magnesium hydroxide; ammonia; and organic amines such as monoethanolamine and triethanolamine. These may be used either alone respectively or in combinations with each other. Favorable ones are the alkaline metal hydroxides such as sodium hydroxide and potassium hydroxide, and a more favorable one is sodium hydroxide.

The neutralization may be carried out either before the monomers are supplied to the reactor or while the monomers are polymerized in the reactor. In addition, if the neutralization degree is within the above range in a period of from the initiation of the polymerization till the end of the polymerization, it is unnecessary that the neutralization degree is constant in this period. Specifically, there may be a difference in the neutralization degree between the first half and second half of the polymerization.

The molecular weight of the (meth)acrylic acid (salt) polymer, as obtained by the production process according to the present invention, is in the range of 5,000 to 10,000,000, favorably 10,000 to 5,000,000, more favorably 20,000 to 3,000,000, still more favorably 30,000 to 1,000,000, most favorably 50,000 to 500,000, in terms of weight-average molecular weight. In the case where the weight-average molecular weight of this polymer is less than 5,000 or more than 10,000,000, there may occur problems in that no performance sufficient to dispersants is displayed.

In addition, one of the production processes according to the present invention has been found to enable the production of a (meth)acrylic acid (salt) polymer containing only a small amount of oligomer portions, because the redox polymerization initiator is used in this process. The use of the redox polymerization initiator can give a high polymerization conversion of the monomers and keep the polymerization degree high, and therefore can lessen the oligomer portions when compared with conventional ones. This means that a polymer having a uniform molecular weight has been obtained and, taking it into consideration that the properties of the resultant polymer vary due to the difference of the weight-average molecular weight of the polymer, then it is extremely advantageous that particularly a polymer having a demanded molecular weight is obtained with a uniform composition. If, of polymers having the constitutional unit (I) as derived from the unsaturated monocarboxylic monomer (a) and the constitutional unit (II) as derived from the unsaturated polyalkylene glycolic monomer (b), those which have a polymerization degree of not higher than trimers are referred to as the "oligomers", then the production process according to the present invention enables the production of a (meth)acrylic acid (salt) polymer having an oligomer content of not more than 20 mass %. Incidentally, the above is a numerical value measured by the method specified in the item herein about the measurement of the molecular weight in terms of weight-average molecular weight.

Because the amount of the hydrogen peroxide is limited into the specific range in the polymerization step of the above process, the (meth)acrylic acid (salt) polymer as produced by this process contains L-ascorbic acid in an amount of not smaller than 0.001 mass %, favorably in the range of 0.001 to 10 mass %, particularly favorably 0.001 to 1 mass %, in the case of having used the L-ascorbic acid as a reducing agent. Even if products are preserved for a long period of time, the reducing action of this L-ascorbic acid can inhibit the products from being deteriorated and colored by the oxidation.

That is to say, the (meth)acrylic acid (salt) polymer, according to the present invention, is a polymer comprising a constitutional unit (I) as derived from the unsaturated monocarboxylic monomer (a) of the aforementioned general formula (1) and a constitutional unit (II) as derived from the unsaturated polyalkylene glycolic monomer (b) of the aforementioned general formula (2) and is characterized by containing L-ascorbic acid in an amount of not smaller than 0.001 mass % relative to the polymer.

Although the process for producing this (meth)acrylic acid (salt) polymer is not especially limited, yet this polymer can favorably be produced by the production process according to the present invention. Furthermore, in the case of the above monomer composition, a water-soluble (meth)acrylic acid (salt) polymer can be obtained and is excellent in uses as such as various dispersants, particularly, cement dispersants and pigment dispersants.

The (meth)acrylic acid (salt) polymer, according to the present invention, is, as it is, usable as the cement dispersant, but may be combined with at lease one conventional publicly-known cement dispersant selected from the group consisting of naphthalenic cement dispersants, aminosulfonic cement dispersants, (meth)acrylic acid (salt) polymer cement dispersants, and lignin cement dispersants. As to their combination composition, it greatly differs according to whether the aimed additional function is present or not, and it ranges over various modes from such that the above polymer component is contained either in an amount of 100 mass % (entire amount) or as a main component to such that an appropriate amount of the above polymer component is added as a high additional value component to conventional cement dispersants. Therefore, the combination composition cannot definitely be specified. However, the amount of the (meth)acrylic acid (salt) polymer as combined is usually in the range of 5 to 100 mass %, favorably 50 to 100 mass %, of all components.

In addition, the (meth)acrylic acid (salt) polymer can be combined with such as air-entraining agents, cement humectants, swelling agents, waterproofing agents, retarders, accelerators, water-soluble high-molecular substances, thickeners, flocculants, dry-shrinkage-diminishing agents, strength-enhancing agents, curing promoters, and defoaming agents besides conventional publicly-known cement dispersants.

The cement dispersant which includes the polymer according to the present invention as a main component promotes the dispersion of cement by being combined into a cement composition which at least comprises cement and water. Incidentally, this cement dispersant can, for example, be used for: hydraulic cements, such as portland cement, belite high-content cement, alumina cement, and various mixed cements; or hydraulic materials other than cement, such as gypsum.

(Effects and Advantages of the Invention)

The present invention enables the production, using a conventional reaction apparatus, of a polymer which contains sufficiently high-molecular-polymerized portions in a high ratio and further merely has a low yellowness index. Furthermore, the present invention is excellent in the production efficiency, because the present invention makes it possible to carry out the polymerization with a high polymerization conversion and further in a short time, without deposit of crystals in the neutralization step and without residence of unreacted initiators in large quantities in the resultant polymer.

DETAILED DESCRIPTION OF THE PREFERRED EMBODIMENTS

Hereinafter, the present invention is more specifically illustrated by the following examples of some preferred embodiments. Incidentally, in the below-mentioned Examples, Comparative Examples, and Production Examples, the unit "part(s)" denotes mass part(s), and the measured values were determined by the following measurement methods.

(Measurement Methods)

(1) Yellowness Index

The measurement was carried out by the transmission method with a spectroscopic color difference meter (SE-2000) produced by Nippon Denshoku Kogyo Co., Ltd., and the YI value was determined on the basis of the following equation:

$$YI \text{ value} = \frac{(1.28X - 1.06Z)}{Y} \times 100$$

wherein X, Y, and Z denote values of tristimulus values XYZ in the XYZ color system of the sample.

(2) Electrophoretic Measurement Conditions

The measurement was carried out under the following conditions:

Measurement instrument: Quanta 4000 Capillary Chromatography, produced by Waters Co., Ltd.

Column used: AccuSep, 75 μm×60 cm, produced by Waters Co., Ltd.

Migration buffer used: 20 mmol/g of sodium borate

Voltage: 20.00 KV (3) Amount of Reducing Agent as Contained in Polymer

The amount of L-ascorbic acid as contained in the polymer can, for example, be determined by liquid chromatography (hereinafter referred to as "LC") under the following measurement conditions:

Instrument: Waters LCM1

Detector: Waters 410

Sort of eluent: acetonitrile/0.1N aqueous acetic acid solution=40/60 (mass %)

Flow rate of eluent: 1.0 ml/min

Sorts of columns: Inertsil ODS-2 (3 columns), 4.6×250 mm, produced by GL Science (4) Amount of Oligomer as Contained in Polymer The amount of the oligomer as contained in the polymer can, for example, be determined from a GPC chart, as obtained by GPC under the same conditions as the aforementioned molecular weight measurement conditions, in the following way. That is to say, when a peak corresponding to the molecular weight of the polymer according to the present invention is referred to as peak A, and when a peak being present on the higher molecular weight side next to the above peak A is referred to as peak B, and when all peaks being present on the lower molecular weight side of the above peak A are referred to as peaks C, the respective areas of these peaks are determined to calculate the above amount from the following equation:

$$\text{Amount}(\%) \text{ of oligomer as contained in polymer} = \frac{\text{areas of peaks } C}{(\text{area of peak } A + \text{area of peak } B + \text{areas of peaks } C)} \times 100$$

(5) Method for Measurement of pH of Polymerization System (a) 50 g of the reaction mixture is sampled from the polymerization reaction system into a 50 cc glass container during the polymerization reaction.

(b) The sampled mixture is adjusted to 25° C.

(c) The pH of the mixture of 25° C. is measured with a pH meter (produced by Horiba Seisakusho: Canister LAB pH Meter F-23, electrode: 6366-10D).

Incidentally, unlike the pH measurement method as disclosed in WO 01/14438, the pH measurement in the present invention is a method of measurement involving the sampling from the polymerization reaction liquid during the actual polymerization reaction and is excellent in that the pH in the reaction system can actually be measured on-line.

(6) Measurement of Molecular Weight

The weight-average molecular weight (Mw) of the (meth) acrylic acid polymer was measured by GPC (gel permeation chromatography) under the following measurement conditions:

Analytic software: Millennium 32 Ver. 3.21, produced by Waters Co., Ltd.

Detector: 410 Differential Refractive Index Detector, produced by Waters Co., Ltd.

Columns: the following products of TOSOH Corporation:
TSKguardcolumn SWXL
TSKgel G4000 SWXL
TSKgel G3000 SWXL
TSKgel G2000 SWXL Flow rate: 0.8 ml/minute Column temperature: 40° C.

Eluent used: as prepared by adjusting the pH of a mixture solution of 6,001 g of acetonitrile, 10,999 g of water, and 115.6 g of sodium acetate trihydrate to 6.0 with acetic acid.

Standard samples: respective 0.1 weight % solutions of polyethylene glycols having their respective molecular weights of: 272,500; 219,300; 107,000; 50,000; 24,000; 12,600; 7,100; 4,250; 1,470; are prepared with the above eluent and then injected in an amount of 100 μL.

Calibration curve: a calibration curve is drawn by approximating the measurement results of the above standard samples with a cubic equation.

Unknown sample to be measured: a 0.5 weight % solution of the unknown sample to be measured is prepared with the above eluent and then injected in an amount of 100 μL.

PRODUCTION EXAMPLE 1

An amount of 16,500 parts of methoxypoly(n=25) ethylene glycol, 4,740 parts of methacrylic acid (K value= 70), 235 parts of p-toluenesulfonic acid monohydrate, 5 parts of phenothiazine, and 1,060 parts of cyclohexane were charged into an externally jacketed glass reaction tank (capacity: 30 liters) as equipped with a thermometer, a stirrer, a formed-water separator, and a reflux condenser. Then, an esterification reaction was carried out at a reaction temperature of 120° C. while, during this esterification reaction, making the operations of: measuring the flow rate (volumetric quantity) of the refluxed solvent with a flow meter as set on a route for returning from the circulation system (including the formed-water separator and the reflux condenser) to the reaction vessel; and setting the temperature of the jacket (as fitted to the reaction vessel) at 135° C. (appropriately making its fine adjustment, if necessary) for the solvent-circulating rate to be 5 cycles/hour. After it had been confirmed that the esterification conversion had reached 99% in about 20 hours, 135 parts of a 49% aqueous sodium hydroxide solution and 4,890 parts of water were added to neutralize the p-toluenesulfonic acid, and then 8 parts of hydroquinone was added, and the temperature was raised to distil off the cyclohexane by azeotropic distillation with water. Thereafter, adjustment water was added to obtain a 80% aqueous esterified product solution. As to the resultant aqueous esterified product solution, its impurities were quantified by capillary electrophoresis under the electrophoretic measurement conditions. Only peaks due to the aimed esterified product, the catalyst (PTS), and the raw material (MAA) were seen, and no peaks due to the impurities were seen. In other words, no impurities were detected from the resultant aqueous esterified product solution.

The yellowness index of the raw monomer is shown in Table 1.

PRODUCTION EXAMPLE 2

An amount of 16,500 parts of methoxypoly(n=25) ethylene glycol, 4,740 parts of methacrylic acid (K value=70), 235 parts of p-toluenesulfonic acid monohydrate, 5 parts of phenothiazine, and 1,060 parts of cyclohexane were charged into an SUS reaction tank (capacity: 30 liters) as equipped with a thermometer, a stirrer, a formed-water separator, and a reflux condenser. Then, an esterification reaction was carried out at a reaction temperature of 120° C. while, during this esterification reaction, making the operations of: measuring the flow rate (volumetric quantity) of the refluxed solvent with a flow meter as set on a route for returning from the circulation system (including the formed-water separator and the reflux condenser) to the reaction vessel; and setting the temperature of the jacket (as fitted to the reaction vessel) at 135° C. (appropriately making its fine adjustment, if necessary) for the solvent-circulating rate to be 5 cycles/hour. After it had been confirmed that the esterification conversion had reached 99% in about 20 hours, 267 parts of a 49% aqueous sodium hydroxide solution and 6,527 parts of water were added to neutralize the p-toluenesulfonic acid, and then 8 parts of hydroquinone was added, and the temperature was raised to distil off the cyclohexane by azeotropic distillation with water. Thereafter, water for adjustment and MAA were added to obtain a 75% aqueous esterified product solution.

PRODUCTION EXAMPLE 3

An amount of 16,500 parts of methoxypoly(n=25) ethylene glycol, 4,740 parts of methacrylic acid (K value=70), 235 parts of p-toluenesulfonic acid monohydrate, 5 parts of phenothiazine, and 1,060 parts of cyclohexane were charged into an SUS reaction tank (capacity: 30 liters) as equipped with a thermometer, a stirrer, a formed-water separator, and a reflux condenser. Then, an esterification reaction was carried out at a reaction temperature of 120° C. while, during this esterification reaction, making the operations of: measuring the flow rate (volumetric quantity) of the refluxed solvent with a flow meter as set on a route for returning from the circulation system (including the formed-water separator and the reflux condenser) to the reaction vessel; and setting the temperature of the jacket (as fitted to the reaction vessel) at 135° C. (appropriately making its fine adjustment, if necessary) for the solvent-circulating rate to be 5 cycles/hour. After it had been confirmed that the esterification conversion had reached 99% in about 20 hours, 432 parts of a 49% aqueous sodium hydroxide solution and 6,375 parts of water were added to neutralize the p-toluenesulfonic acid, and then 8 parts of hydroquinone was added, and the temperature was raised to distil off the cyclohexane by azeotropic distillation with water. Thereafter, water for adjustment and MAA were added to obtain a 75% aqueous esterified product solution.

PRODUCTION EXAMPLE 4

An amount of 16,500 parts of methoxypoly(n=25) ethylene glycol, 4,740 parts of methacrylic acid (K value=70), 235 parts of p-toluenesulfonic acid monohydrate, 5 parts of phenothiazine, and 1,060 parts of cyclohexane were charged into an SUS reaction tank (capacity: 30 liters) as equipped with a thermometer, a stirrer, a formed-water separator, and a reflux condenser. Then, an esterification reaction was carried out at a reaction temperature of 120° C. while, during this esterification reaction, making the operations of: measuring the flow rate (volumetric quantity) of the refluxed solvent with a flow meter as set on a route for returning from the circulation system (including the formed-water separator and the reflux condenser) to the reaction vessel; and setting the temperature of the jacket (as fitted to the reaction vessel) at 135° C. (appropriately making its fine adjustment, if necessary) for the solvent-circulating rate to be 5 cycles/hour. After it had been confirmed that the esterification conversion had reached 99% in about 20 hours, 597 parts of a 49% aqueous sodium hydroxide solution and 6,223 parts of water were added to neutralize the p-toluenesulfonic acid, and then 8 parts of hydroquinone was added, and the temperature was raised to distil off the cyclohexane by azeotropic distillation with water. Thereafter, water for adjustment and MAA were added to obtain a 75% aqueous esterified product solution.

PRODUCTION EXAMPLE 5

An amount of 16,500 parts of methoxypoly(n=9)ethylene glycol, 9,450 parts of methacrylic acid (K value=70), 519 parts of p-toluenesulfonic acid monohydrate, 5 parts of phenothiazine, and 1,298 parts of cyclohexane were charged into an externally jacketed glass reaction tank (capacity: 30 liters) as equipped with a thermometer, a stirrer, a formed-water separator, and a reflux condenser. Then, an esterification reaction was carried out at a reaction temperature of 120° C. while, during this esterification reaction, making the operations of: measuring the flow rate (volumetric quantity) of the refluxed solvent with a flow meter as set on a route for returning from the circulation system (including the formed-water separator and the reflux condenser) to the reaction vessel; and setting the temperature of the jacket (as fitted to the reaction vessel) at 135° C. (appropriately making its fine adjustment, if necessary) for the solvent-circulating rate to be 5 cycles/hour. After it had been confirmed that the esterification conversion had reached 99% in about 20 hours, 223 parts of a 49% aqueous sodium hydroxide solution and 19,941 parts of water were added to neutralize the p-toluenesulfonic acid, and then 8 parts of hydroquinone was added, and the temperature was raised to distil off the cyclohexane by azeotropic distillation with water. Thereafter, water for adjustment and MAA were added to obtain a 55% aqueous esterified product solution.

EXAMPLE 1

An amount of 712.5 parts of water was charged into a glass reactor as equipped with a thermometer, a stirrer, dropping funnels, a nitrogen-introducing tube and a reflux condenser. The internal air of the above reactor was then replaced with nitrogen under stirring, and the temperature was then raised to 50° C. under the nitrogen atmosphere.

Next, into the above reactor, there was dropwise added a solution (as prepared by dissolving 11.3 of 3-mercaptopropionic acid into 1,687.5 parts of the 80% aqueous esterified product solution as obtained in Production Example 1) over a period of 4 hours and, at the same time, there were dropwise added an aqueous solution (as prepared by dissolving 9.6 parts of hydrogen peroxide into 300 parts of water) and an aqueous solution (as prepared by dissolving 12.5 parts of L-ascorbic acid into 300 parts of water) over a period of 5 hours. After the end of these dropwise additions, the reaction mixture liquid was maintained at 50° C. for 1 hour. Thereafter, the pH of this reaction mixture liquid was adjusted with a 30% aqueous sodium hydroxide solution so as to be pH=7, thus obtaining a (meth)acrylic acid (salt) polymer (1A) having a weight-average molecular weight of 26,900. The amount of the polymerization initiator as used in Example 1 is such that: the amount of the hydrogen peroxide as used is 8 mol %, and the amount of the L-ascorbic acid as used is 2 mol %.

In Table 1 there are shown: the ratio of the redox polymerization initiator as used; the reaction temperature; and the results of such as yellowness index.

In addition, during the polymerization reaction, the reaction product was sometimes sampled to measure its pH. The results were as shown in Table 2. In addition, the final product was measured by: the amount of residual methacrylic acid (MAA); and the amount of residual methoxypolyethylene glycol methacrylate (PGM25E); thus obtaining the results as shown in Table 2.

EXAMPLE 2

A (meth)acrylic acid (salt) polymer (2A) having a weight-average molecular weight of 25,900 was obtained in the same way as of Example 1 except that: the hydrogen peroxide was used in an amount of 4.8 parts, and the L-ascorbic acid was used in an amount of 6.2 parts. The amount of the polymerization initiator as used in Example 2 is such that: the amount of the hydrogen peroxide as used is 4 mol %, and the amount of the L-ascorbic acid as used is 1 mol %.

In Table 1 there are shown: the ratio of the redox polymerization initiator as used; the reaction temperature; and the results of such as yellowness index.

EXAMPLE 3

A (meth)acrylic acid (salt) polymer (3A) having a weight-average molecular weight of 24,000 was obtained in the same way as of Example 1 except that: the hydrogen peroxide was used in an amount of 2.4 parts, and the L-ascorbic acid was used in an amount of 3.1 parts. The amount of the polymerization initiator as used in Example 3 is such that: the amount of the hydrogen peroxide as used is 2 mol %, and the amount of the L-ascorbic acid as used is 0.5 mol %.

In Table 1 there are shown: the ratio of the redox polymerization initiator as used; the reaction temperature; and the results of such as yellowness index.

In addition, during the polymerization reaction, the reaction product was sometimes sampled to measure its pH. The results were as shown in Table 2. In addition, the final product was measured by: the amount of residual methacrylic acid (MAA); and the amount of residual methoxypolyethylene glycol methacrylate (PGM25E); thus obtaining the results as shown in Table 2.

EXAMPLE 4

A (meth)acrylic acid (salt) polymer (4A) having a weight-average molecular weight of 22,000 was obtained in the same way as of Example 2 except that the polymerization temperature and the maintained temperature were changed to 80° C. The amount of the polymerization initiator as used in Example 4 is such that: the amount of the hydrogen peroxide as used is 4 mol %, and the amount of the L-ascorbic acid as used is 1 mol %.

In Table 1 there are shown: the ratio of the redox polymerization initiator as used; the reaction temperature; and the results of such as yellowness index.

EXAMPLE 5

A (meth)acrylic acid (salt) polymer (5A) having a weight-average molecular weight of 22,100 was obtained in the same way as of Example 3 except that the polymerization temperature and the maintained temperature were changed to 80° C. The amount of the polymerization initiator as used in Example 5 is such that: the amount of the hydrogen peroxide as used is 2 mol %, and the amount of the L-ascorbic acid as used is 0.5 mol %.

In Table 1 there are shown: the ratio of the redox polymerization initiator as used; the reaction temperature; and the results of such as yellowness index.

Comparative Example 1

An amount of 8,200 parts of water was charged into an externally jacketed glass reaction tank (capacity: 30 liters) as equipped with a thermometer, a stirrer, a formed-water separator, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 94 parts of 3-mercaptopropionic acid into 13,100 parts of the 80% aqueous esterified product solution as obtained in Production Example 1) over a period of 4 hours and, at the same time, there was dropwise added an aqueous solution (as prepared by dissolving 125 parts of ammonium persulfate into 1,000 parts of water) over a period of 5 hours. After the end of these dropwise additions, the reaction mixture liquid was maintained at 80° C. for 1 hour. Thereafter, the pH of this reaction mixture liquid was adjusted with sodium hydroxide so as to be pH=7, thus obtaining a (meth)acrylic acid (salt) polymer (1B) having a weight-average molecular weight of 23,800 in terms of polyethylene glycol by gel permeation chromatography.

In Table 1 there are shown: the ratio of the redox polymerization initiator as used; the reaction temperature; and the results of such as yellowness index.

In addition, during the polymerization reaction, the reaction product was sometimes sampled to measure its pH. The results were as shown in Table 2. In addition, the final product was measured by: the amount of residual methacrylic acid (MAA); and the amount of residual methoxypolyethylene glycol methacrylate (PGM25E); thus obtaining the results as shown in Table 2.

Comparative Example 2

An amount of 40 g of an aqueous solution, as prepared by diluting an aqueous solution of the (meth)acrylic acid (salt) polymer (1B) (as produced by the process of Comparative Example 1) with ion-exchanged water to adjust its solid content to 40 mass %, was placed into a glass sample tube of 50 ml in capacity, to which 0.37 g (corresponding to 8 mol % of all monomers before the polymerization for obtaining the polymer (1B)) of an aqueous hydrogen peroxide solution (30%) was then added. Thereafter, stirring was carried out at room temperature for 4 hours, and then the yellowness index was measured with the color difference meter. As a result, the YI value was 33.11. Thus, in the case where the redox polymerization initiator being a combination of hydrogen peroxide and the reducing agent was not used, but where only the hydrogen peroxide was post-added after the polymerization, the coloring could not be decreased.

However, the polymerization did not proceed. Therefore, the aimed polymer could not be obtained.

Comparative Example 6

The same procedure as of Example 2 was carried out except that the hydrogen peroxide was used in an amount of 38.4 parts (corresponding to 50 mol % of the total mols of all monomers). However, foaming occurred violently during the polymerization. Therefore, the polymerization could not successfully be carried out.

Comparative Example 7

The same procedure as of Example 2 was carried out except that the L-ascorbic acid was used in an amount of 148.8 parts (corresponding to 24 mol % of the total mols of all monomers and to 600 mol % of the hydrogen peroxide). However, during the preservation of the products, there was seen an unfavorable phenomenon such that crystals derived from the L-ascorbic acid became deposited.

TABLE 1

|  | Amount of hydrogen peroxide as combined (mol %) | Amount of reducing agent as combined (mol %) | Temperature (° C.) | Yield (nonvolatiles) (%) | Oligomer content (%) | Yellowness index (YI value) |
|---|---|---|---|---|---|---|
| Example 1 | 8 | 2 | 50 | 40.7 | 0.97 | 3.10 |
| Example 2 | 4 | 1 | 50 | 40 | 1.18 | 5.13 |
| Example 3 | 2 | 0.5 | 50 | 40 | 1.23 | .78 |
| Example 4 | 4 | 1 | 80 | 40 | 1.23 | 4.71 |
| Example 5 | 2 | 0.5 | 80 | 40 | 1.26 | 8.36 |
| Comparative Example 1 | — | — | 80 | 40 | 0.84 | 39.1 |
| Production Example 1 | — | — | — | 40 | — | 10.6 |

Comparative Example 3

The same procedure as of Comparative Example 2 was carried out except that the stirring was carried out at 50° C. for 6 hours. Then, the yellowness index was measured with the color difference meter. As a result, the YI value was 24.03. Thus, in the case where the redox polymerization initiator being a combination of hydrogen peroxide and the reducing agent was not used, but where only the hydrogen peroxide was post-added after the polymerization, the coloring could not be decreased.

Comparative Example 4

The same procedure as of Example 2 was carried out except that the L-ascorbic acid was not used at all. As a result, there could be obtained a (meth)acrylic acid (salt) polymer (4B) having a weight-average molecular weight of 30,500. Unreacted methacrylic acid was quantified by high performance liquid chromatographic measurement. As a result, it was found that: 98.8 weight % of methacrylic acid as added had been consumed, and the residual 1.2 weight % remained unreacted. Similarly, methacrylic acid in the polymer as obtained in Example 2 was quantified. As a result, no residual methacrylic acid was detected.

Comparative Example 5

The same procedure as of Example 2 was carried out except that the hydrogen peroxide was not used at all.

(Results 1)
(1) The results of Examples 1 to 3 suggest that: as the amount of hydrogen peroxide as combined becomes larger, the yellowness index as indicated by the YI value becomes smaller, so the degree of coloring depends on the amount of hydrogen peroxide as combined. Incidentally, the yellowness index of Comparative Example 1 is an extremely high value of 39.1 when compared with those of Examples 1 to 5, but the YI value of the 80% aqueous esterified product solution as obtained in Production Example 1 is 10.6, and also the yellowness indexes of Examples 1 to 5 in which the same raw materials were used are extremely low values of 3.10 to 8.36, therefore it can be said that the above deterioration of the yellowness index is caused not by the raw compounds, but by differences in production process.
(2) In the comparisons between Examples 2 and 4 and between Examples 3 and 5, the yellowness index as indicated by the YI value varied only a little whether the temperature during the polymerization is 50° C. or 80° C., therefore there was a tendency for the degree of coloring not to depend on the reaction temperature so much.
(3) After the neutralization, the deposit of salt was not seen in Examples 1 to 5, but was seen in Comparative Example 1.

EXAMPLE 6

An amount of 446 parts of water was charged into a glass reaction tank (capacity: 3 liters) as equipped with a thermometer, a stirrer, droppers, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 6.0 parts of 3-mercaptopropionic acid into 900 parts of the 75% aqueous esterified product solution as obtained in Production Example 2) over a period of 4 hours and, at the same time, there was dropwise added an aqueous solution (as prepared by dissolving 7.76 parts of ammonium persulfate into 142.24 parts of water) over a period of 5 hours. After the end of these dropwise additions, the reaction mixture liquid was maintained at 80° C. for 1 hour. Thereafter, the pH of this reaction mixture liquid was adjusted with a 30% aqueous sodium hydroxide solution so as to be pH=7, thus obtaining a (meth)acrylic acid (salt) polymer (6A) having a weight-average molecular weight of 22,900 in terms of polyethylene glycol by gel permeation chromatography.

During the polymerization reaction, the reaction product was sometimes sampled to measure its pH. The results were as shown in Table 2. In addition, the final product was measured by: the weight-average molecular weight Mw; the peak top average molecular weight Mp; Mw−Mp; the amount of residual methacrylic acid (MAA); and the amount of residual methoxypolyethylene glycol methacrylate (PGM25E); thus obtaining the results as shown in Table 2.

EXAMPLE 7

An amount of 444 parts of water was charged into a glass reaction tank (capacity: 3 liters) as equipped with a thermometer, a stirrer, droppers, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 5.99 parts of 3-mercaptopropionic acid into 900 parts of the 75% aqueous esterified product solution as obtained in Production Example 3) over a period of 4 hours and, at the same time, there was dropwise added an aqueous solution (as prepared by dissolving 7.76 parts of ammonium persulfate into 142.24 parts of water) over a period of 5 hours. After the end of these dropwise additions, the reaction mixture liquid was maintained at 80° C. for 1 hour. Thereafter, the pH of this reaction mixture liquid was adjusted with a 30% aqueous sodium hydroxide solution so as to be pH=7, thus obtaining a (meth)acrylic acid (salt) polymer (7A) having a weight-average molecular weight of 22,300 in terms of polyethylene glycol by gel permeation chromatography.

During the polymerization reaction, the reaction product was sometimes sampled to measure its pH. The results were as shown in Table 2. In addition, the final product was measured by: the weight-average molecular weight Mw; the peak top average molecular weight Mp; Mw−Mp; the amount of residual methacrylic acid (MAA); and the amount of residual methoxypolyethylene glycol methacrylate (PGM25E); thus obtaining the results as shown in Table 2.

EXAMPLE 8

An amount of 443 parts of water was charged into a glass reaction tank (capacity: 3 liters) as equipped with a thermometer, a stirrer, droppers, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 5.63 parts of 3-mercaptopropionic acid into 900 parts of the 75% aqueous esterified product solution as obtained in Production Example 3) over a period of 4 hours and, at the same time, there was dropwise added an aqueous solution (as prepared by dissolving 7.76 parts of ammonium persulfate into 142.24 parts of water) over a period of 5 hours. After the end of these dropwise additions, the reaction mixture liquid was maintained at 80° C. for 1 hour. Thereafter, the pH of this reaction mixture liquid was adjusted with a 30% aqueous sodium hydroxide solution so as to be pH=7, thus obtaining a (meth)acrylic acid (salt) polymer (8A) having a weight-average molecular weight of 23,500 in terms of polyethylene glycol by gel permeation chromatography.

During the polymerization reaction, the reaction product was sometimes sampled to measure its pH. The results were as shown in Table 2. In addition, the final product was measured by: the weight-average molecular weight Mw; the peak top average molecular weight Mp; Mw−Mp; the amount of residual methacrylic acid (MAA); and the amount of residual methoxypolyethylene glycol methacrylate (PGM25E); thus obtaining the results as shown in Table 2.

EXAMPLE 9

An amount of 300 parts of water was charged into a glass reaction tank (capacity: 3 liters) as equipped with a thermometer, a stirrer, droppers, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 7.5 parts of 3-mercaptopropionic acid into 900 parts of the 75% aqueous esterified product solution as obtained in Production Example 2) over a period of 4 hours and, at the same time, there were dropwise added an aqueous solution (as prepared by dissolving 4.82 parts of hydrogen peroxide into 145.18 parts of water) and an aqueous solution (as prepared by dissolving 6.24 parts of L-ascorbic acid into 143.76 parts of water) over a period of 5 hours. After the end of these dropwise additions, the reaction mixture liquid was maintained at 80° C. for 1 hour. Thereafter, the pH of this reaction mixture liquid was adjusted with a 30% aqueous sodium hydroxide solution so as to be pH=7, thus obtaining a (meth)acrylic acid (salt) polymer (9A) having a weight-average molecular weight of 21,100 in terms of polyethylene glycol by gel permeation chromatography.

During the polymerization reaction, the reaction product was sometimes sampled to measure its pH. The results were as shown in Table 2. In addition, the final product was measured by: the weight-average molecular weight Mw; the peak top average molecular weight Mp; Mw−Mp; the amount of residual methacrylic acid (MAA); and the amount of residual methoxypolyethylene glycol methacrylate (PGM25E); thus obtaining the results as shown in Table 2.

EXAMPLE 10

An amount of 300 parts of water was charged into a glass reaction tank (capacity: 3 liters) as equipped with a thermometer, a stirrer, droppers, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 7.21 parts of 3-mercaptopropionic acid into 900 parts of the 75% aqueous esterified product solution as obtained in Production Example 3) over a period of 4 hours and, at the same time, there were dropwise added an aqueous solution (as prepared by dissolving 4.82 parts of hydrogen peroxide into 145.18 parts of water) and an aqueous solution (as prepared by dissolving 6.24 parts of L-ascorbic acid into 143.76 parts of water) over a period of 5 hours. After the end of these dropwise additions, the reaction mixture liquid was maintained at 80° C. for 1 hour. Thereafter, the pH of this reaction mixture liquid was adjusted with a 30% aqueous sodium hydroxide solution so as to be pH=7, thus obtaining a (meth)acrylic acid (salt) polymer (10A) having a weight-average molecular weight of 22,200 in terms of polyethylene glycol by gel permeation chromatography.

During the polymerization reaction, the reaction product was sometimes sampled to measure its pH. The results were as shown in Table 2. In addition, the final product was measured by: the weight-average molecular weight Mw; the peak top average molecular weight Mp; Mw–Mp; the amount of residual methacrylic acid (MAA); and the amount of residual methoxypolyethylene glycol methacrylate (PGM25E); thus obtaining the results as shown in Table 2.

EXAMPLE 11

An amount of 300 parts of water was charged into a glass reaction tank (capacity: 3 liters) as equipped with a thermometer, a stirrer, droppers, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 7.28 parts of 3-mercaptopropionic acid into 900 parts of the 75% aqueous esterified product solution as obtained in Production Example 4) over a period of 4 hours and, at the same time, there were dropwise added an aqueous solution (as prepared by dissolving 4.82 parts of hydrogen peroxide into 145.18 parts of water) and an aqueous solution (as prepared by dissolving 6.24 parts of L-ascorbic acid into 143.76 parts of water) over a period of 5 hours. After the end of these dropwise additions, the reaction mixture liquid was maintained at 80° C. for 1 hour. Thereafter, the pH of this reaction mixture liquid was adjusted with a 30% aqueous sodium hydroxide solution so as to be pH=7, thus obtaining a (meth)acrylic acid (salt) polymer (11 A) having a weight-average molecular weight of 22,200 in terms of polyethylene glycol by gel permeation chromatography.

During the polymerization reaction, the reaction product was sometimes sampled to measure its pH. The results were as shown in Table 2. In addition, the final product was measured by: the weight-average molecular weight Mw; the peak top average molecular weight Mp; Mw–Mp; the amount of residual methacrylic acid (MAA); and the amount of residual methoxypolyethylene glycol methacrylate (PGM25E); thus obtaining the results as shown in Table 2.

Comparative Example 8

A (meth)acrylic acid (salt) polymer was produced in accordance with the method as disclosed in WO 01/14438. That is to say, 382 parts of water was charged into a glass reaction tank (capacity: 3 liters) as equipped with a thermometer, a stirrer, droppers, and a reflux condenser. The internal air of the above reactor was then replaced with nitrogen under stirring, and the temperature was then raised to 80° C. under the nitrogen atmosphere. Next, into the above reactor, there was dropwise added a solution (as prepared by dissolving 2.8 parts of 3-mercaptopropionic acid into 900 parts of the 55% aqueous esterified product solution as obtained in Production Example 5) over a period of 90 minutes and, at the same time, there was dropwise added an aqueous solution (as prepared by dissolving 2.52 parts of ammonium persulfate into 18.48 parts of water) over a period of 120 minutes. After the end of these dropwise additions, the reaction mixture liquid was maintained at 80° C. for 1 hour. Thereafter, the pH of this reaction mixture liquid was adjusted with a 30% aqueous sodium hydroxide solution so as to be pH=7, thus obtaining a (meth)acrylic acid (salt) polymer (8B) having a weight-average molecular weight of 43,500 in terms of polyethylene glycol by gel permeation chromatography.

During the polymerization reaction, the reaction product was sometimes sampled to measure its pH. The results were as shown in Table 2. In addition, the final product was measured by: the weight-average molecular weight Mw; the peak top average molecular weight Mp; Mw–Mp; the amount of residual methacrylic acid (MAA); and the amount of residual methoxypolyethylene glycol methacrylate (PGM25E); thus obtaining the results as shown in Table 2.

TABLE 2

| Neutralization of MAA | 1 | 1 | 1 | — | 5 | 10 | 15 | 5 | 10 | 15 |
|---|---|---|---|---|---|---|---|---|---|---|
| Sampling time (minutes) | Example 1 | Example 3 | Comparative Example 1 | Comparative Example 8 | Example 6 | Example 7 | Example 8 | Example 9 | Example 10 | Example 11 |
| pH during polymerization | | | | | | | | | | |
| 85 | 3.43 | 3.28 | 3.11 | 2.72 | 3.69 | 3.94 | 4.15 | 3.31 | 4.07 | 4.8 |
| 60 | 3.2 | 3.58 | 2.46 | 2.65 | 3.96 | 4.57 | 4.52 | 3.78 | 4.21 | 4.71 |
| 180 | 3.52 | 4.14 | 2.46 | 2.12 | 4.26 | 4.83 | 5.01 | 4.22 | 4.6 | 5.06 |
| 300 | 3.31 | 4.09 | 2.39 | | 4.1 | 4.83 | 5.11 | 4.33 | 4.88 | 5.21 |
| 360 | 3.25 | 4.06 | 2.36 | | 4.03 | 4.83 | 5.16 | 4.52 | 5.14 | 5.23 |
| Mw | 26900 | 24000 | 23800 | 43100 | 22900 | 22300 | 23500 | 21100 | 22200 | 22200 |
| Mp | | | | 32000 | 17600 | 17700 | 18000 | 14900 | 15000 | 15300 |
| Mw–Mp | | | | 11100 | 5300 | 4600 | 5500 | 6200 | 7200 | 6900 |
| Residual MAA (%) | 0.39 | 0.13 | 2.19 | 3.21 | 1.6 | 2.11 | 2.02 | | 1.78 | 1.19 |
| Residual PGM25E (%) | 0.43 | 0.18 | 0.74 | 0.89 | 0.43 | 0.53 | 0.32 | | 0.57 | 0.34 |

MAA: methacrylic acid
PGM25E: methoxypolyethylene glycol methacrylate (Results 2)

The pH during the polymerization is in the range of 2.36 to 3.11 in Comparative Example 1 and in the range of 2.12 to 2.72 in Comparative Example 8 (corresponding to the method as disclosed in WO 01/14438). Thus, in these comparative examples, the pH during the polymerization is in the low pH ranges respectively. On the other hand, the pH during the polymerization is in the range of 3.20 to 5.23 in Examples 1 and 3 and in Examples 6 to 11 in which the neutralization ratio of methacrylic acid during the polymerization is set in the range of 5 to 15%. Thus, in these examples, the pH during the polymerization is in the higher pH ranges respectively than in Comparative Examples 1 and 8.

In Comparative Examples 1 and 8, the pH of the polymerization system is so low as to unfavorably promote the corrosion of the SUS-made polymerization vessel. However, in Examples 1, 3 and 6 to 11, the pH of the polymerization system is so high as to enable the effective suppression of the corrosion.

In addition, in Comparative Examples 1 and 8, the concentrations of the residual MAA and of the residual PGM25E are high, and thus the polymerization conversion is low. On the other hand, in all of Examples 1, 3 and 6 to 11, the concentrations of the residual MAA and of the residual PGM25E are low, and therefrom the polymerization conversion is found to be high.

What is claimed is:

1. A process for producing a (meth)acrylic acid (salt) polymer, which comprises the step of carrying out polymerization of an unsaturated monocarboxylic monomer (a) of a general formula (1) below and an unsaturated polyalkylene glycolic monomer (b) of a general formula (2) below with a polymerization initiator, with the process using a redox polymerization initiator including hydrogen peroxide as the polymerization initiator and L-ascorbic acid as a reducing agent, and wherein the amount of the hydrogen peroxide as used is in the range of 0.5 to 10 mol.% relative to the total of the monomers, wherein the general formula (1) is:

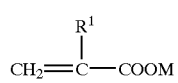  (1)

where: $R^1$ denotes a hydrogen atom or a methyl group; and M denotes a hydrogen atom, a monovalent metal, a divalent metal, an ammonium group, or an organic amine group; and wherein the general formula (2) is:

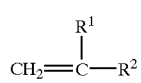  (2)

where: $R^1$ denotes hydrogen or a methyl group; $R^2$ denotes —COO($R^3$O)$_m R^4$ wherein $R^3$O denotes at least one kind of oxyalkylene group having 2 to 18 carbon atoms and, in the case of at least two kinds, their form of addition may be either block addition or random addition, and wherein $R^4$ denotes hydrogen or an alkyl group having 1 to 22 carbon atoms; and m is a molar-number-average degree of addition polymerization of the oxyalkylene group and denotes an integer of 1 to 300.

2. A process according to claim 1, wherein the amount of the reducing agent as used is in the range of 0.1 to 500 mol % relative to the hydrogen peroxide.

3. A process according to claim 1, wherein the polymerization is carried out in the temperature range of 0 to 95° C.

4. A process according to claim 1, wherein the unsaturated polyalkylene glycolic monomer (b) is subjected to the polymerization in the form of an esterification reaction product as obtained by a process including the step of carrying out an esterification reaction of "p" parts by weight of an alkoxypolyalkylene glycol of a general formula (3) below and "q" parts by weight of the unsaturated monocarboxylic monomer (a) under conditions satisfying a relationship of $[(p/n^{1/2})/q] \times 100 \leq 200$ (where n is a molar-number-average degree of addition polymerization of the oxyalkylene group), wherein the general formula (3) is:

$$R^4O(R^3O)_nH \qquad (3)$$

where: $R^3$ denotes an alkylene group having 2 to 18 carbon atoms; $R^4$ denotes a hydrocarbon group having 1 to 30 carbon atoms; n denotes a molar-number-average degree of addition polymerization of the oxyalkylene group $R^3O$ and is an integer of 1 to 300; and the repeating units $R^3O$ may be either identical with or different from each other and, in the case where the repeating units $R^2O$ are different from each other, their form of addition may be either block addition or random addition.

5. A process according to claim 4, wherein the esterification reaction is carried out in the presence of a dehydrating solvent, and wherein a gelation inhibitor is caused to act on a distillate containing the dehydrating solvent in a step of distilling off the dehydrating solvent after the end of the esterification reaction.

6. A process according to claim 1, wherein the unsaturated monocarboxylic monomer (a), the unsaturated polyalkylene glycolic monomer (b), and another monomer (III) copolymerizable with these monomers are polymerized in the weight ratio range of (a)/(b)/(III)=(1 to 99)/(99 to 1)/(0 to 50).

7. A process according to claim 1, wherein the unsaturated polyalkylene glycolic monomer (b) includes a mixture of: a first esterified product ($a_1$) in which the molar-number-average degree "m" of addition polymerization of the oxyalkylene group in the formula (2) is an integer of 1 to 297; and a second esterified product ($a_2$) in which the molar-number-average degree "m" of addition polymerization of the oxyalkylene group in the formula (2) is an integer of 4 to 300; wherein the molar-number-average degree of addition polymerization in the second esterified product ($a_2$) is larger than that in the first esterified product ($a_1$) by not less than 3.

8. A process according to claim 7, wherein the mass ratio between the first esterified product ($a_1$) and the second esterified product ($a_2$) is in the range of (5:95) to (95:5).

9. A process for producing a (meth)acrylic acid (salt) polymer, which comprises the step of carrying out polymerization of an unsaturated monocarboxylic monomer (a) of a general formula (1) below and an unsaturated polyalkylene glycolic monomer (b) of a general formula (2) below with a polymerization initiator, wherein prior to said polymerization of said monomer (a) and monomer (b), the unsaturated polyalkylene glycolic monomer (b) is an esterification reaction product as obtained by a process including the steps of: carrying out an esterification reaction of "p" parts by weight of an alkoxypolyalkylene glycol of a general formula (3) below and "q" parts by weight of the unsaturated monocarboxylic monomer (a) in the presence of an acid catalyst under conditions satisfying such a relationship of $[(p/n^{1/2})/q] \times 100 \leq 200$ (where n is a molar-number-average degree of addition polymerization of the oxyalkylene group and is an integer of 1 to 110) as allows a portion of the unsaturated monocarboxylic monomer (a) as a starting raw material to remain; and then neutralizing the acid catalyst and 0 to 60 mol % of the residual unsaturated monocarboxylic monomer (a) with a basic substance after the esterification reaction; and the polymerization is carried out under conditions where the pH of the polymerization reaction liquid is in the range of 3.2 to 7.0;

wherein the general formula (1) is:

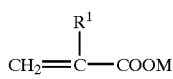 (1)

where: $R^1$ denotes a hydrogen atom or a methyl group; and M denotes a hydrogen atom, a monovalent metal, a divalent metal, an ammonium group, or an organic amine group;

wherein the general formula (2) is:

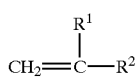 (2)

where: $R^1$ denotes hydrogen or a methyl group; $R^2$ denotes —$COO(R^3O)_mR^4$ wherein $R^3O$ denotes at least one kind of oxyalkylene group having 2 to 18 carbon atoms and, in the case of at least two kinds, their form of addition may be either block addition or random addition, and wherein $R^4$ denotes hydrogen or an alkyl group having 1 to 22 carbon atoms; and m is a molar-number-average degree of addition polymerization of the oxyalkylene group and denotes an integer of 1 to 300; and wherein the general formula (3) is:

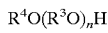 (3)

where: $R^3$ denotes an alkylene group having 2 to 18 carbon atoms; $R^4$ denotes a hydrocarbon group having 1 to 30 carbon atoms; n denotes a molar-number-average degree of addition polymerization of the oxyalkylene group $R^3O$ and is an integer of 1 to 300; and the repeating units $R^3O$ may be either identical with or different from each other and, in the case where the repeating units $R^3O$ are different from each other, their form of addition may be either block addition or random addition.

10. A process according to claim 9, wherein the esterification reaction is carried out in the presence of a dehydrating solvent, and wherein a gelation inhibitor is caused to act on a distillate containing the dehydrating solvent in a step of distilling off the dehydrating solvent after the end of the esterification reaction.

11. A process according to claim 9, wherein the polymerization is carried out in the temperature range of 0 to 95° C.

12. A process according to claim 9, wherein the unsaturated monocarboxylic monomer (a), the unsaturated polyalkylene glycolic monomer (b), and another monomer (III) copolymerizable with these monomers are polymerized in the weight ratio range of (a)/(b)(III)=(1 to 99)/(99 to 1)/(0 to 50).

13. A process according to claim 9, wherein the unsaturated polyalkylene glycolic monomer (b) includes a mixture of: a first esterified product ($a_1$) in which the molar-number-average degree "m" of addition polymerization of the oxyalkylene group in the formula (2) is an integer of 1 to 297; and a second esterified product ($a_2$) in which the molar-number-average degree "m" of addition polymerization of the oxyalkylene group in the formula (2) is an integer of 4 to 300; wherein the molar-number-average degree of addition polymerization in the second esterified product ($a_2$) is larger than that in the first esterified product ($a_1$) by not less than 3.

14. A process according to claim 13, wherein the mass ratio between the first esterified product ($a_1$) and the second esterified product ($a_2$) is in the range of(5:95) to (95:5).

15. A (meth)acrylic acid (salt) polymer, which is obtained by the process as recited in claim 1 wherein said polymer has a yellowness index (YI) of 3.10 to 8.36.

16. A (meth)acrylic acid (salt) polymer, which is obtained by the process as recited in claim 9 wherein said polymer has a yellowness index (YI) of 3.10 to 8.36.

17. A (meth)acrylic acid (salt) polymer, which is a polymer comprising a constitutional unit (I) as derived from an unsaturated monocarboxylic monomer (a) of a general formula (1) below and a constitutional unit (II) as derived from an unsaturated polyalkylene glycolic monomer (b) of a general formula (2) below, with the (meth)acrylic acid (salt) polymer containing L-ascorbic acid in an amount of not smaller than 0.001 mass % relative to the polymer, wherein the general formula (1) is:

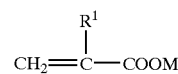 (1)

where: $R^1$ denotes a hydrogen atom or a methyl group; and M denotes a hydrogen atom, a monovalent metal, a divalent metal, an ammonium group, or an organic amine group; and wherein the general formula (2) is:

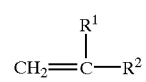 (2)

where: $R^1$ denotes hydrogen or a methyl group; $R^2$ denotes —$COO(R^3O)_mR^4$ wherein $R^3O$ denotes at least one kind of oxyalkylene group having 2 to 18 carbon atoms and, in the case of at least two kinds, their form of addition may be either block addition or random addition, and wherein $R^4$ denotes hydrogen or an alkyl group having 1 to 22 carbon atoms; and m is a molar-number-average degree of addition polymerization of the oxyalkylene group and denotes an integer of 1 to 300, and where said (meth)acrylic acid (salt) polymer has a yellowness index (YI) of 3.10 to 8.36.

18. A process according to claim 1, wherein said polymerization is carried out at pH 3.2 to 7.0.

19. A process according to claim 18, wherein said polymerization is carried out at pH 3.5 to pH 6.5.

20. A process according to claim 1, wherein said polymer has a residual L-ascorbic acid content of not less than 0.001 mass % based on the mass of the polymer.

21. A process according to claim 1, wherein said polymer has an oligomer content of not more than 20 mass % based on the mass of the polymer.

22. A process according to claim 1, wherein said reducing agent is used in an amount of 1 mol % to 200 mol % based on the hydrogen peroxide.

23. A process according to claim 9, wherein said polymerization initiator is a redox polymerization initiator including a mixture of hydrogen peroxide and a reducing agent and where said hydrogen peroxide is included in an amount of 0.01 mol % to 30 mol % based on the total amount of the monomers.

24. A process according to claim 23, wherein said reducing agent is used in an amount of 0.1 mol % to 500 mol % based on the amount of the hydrogen peroxide.

25. A process according to claim 24, wherein said reducing agent is used in an amount of 1 mol % to 200 mol % based on the amount of the hydrogen peroxide.

26. A (meth)acrylic acid (salt) polymer of claim 16, wherein said polymer has a residual monocarboxylic monomer content of 0.13 to 2.11% and a residual unsaturated polyalkylene glycolic monomer content of 0.18% to 0.57%.

27. A (meth)acrylic acid (salt) polymer of claim 17, wherein said polymer is derived from the polymerization of monomer (a) and monomer (b) with a polymerization catalyst, and wherein said polymerization initiator is a redox initiator including a mixture of hydrogen peroxide and a reducing agent.

28. A (meth)acrylic acid (salt) polymer of claim 27, wherein said hydrogen peroxide is used in an amount of 0.01 mol % to 30 mol % based on the total amount of the monomers and said reducing agent is included in an amount of 0.1 mol % to 500 mol % based on the amount of the hydrogen peroxide.

29. A (meth)acrylic acid (salt) polymer of claim 28, wherein said reducing agent is L-ascorbic acid.

* * * * *